United States Patent [19]
Seto et al.

[11] Patent Number: 5,652,660
[45] Date of Patent: Jul. 29, 1997

[54] IMAGE SMOOTHING USING SELECTION AMONG PLURAL PRE-STORED PIXEL PATTERNS AS SMOOTHED DATA

[75] Inventors: Kaoru Seto, Chigasaki; Kiyoshi Kanaiwa, Kawasaki; Michio Itoh, Hachiouji; Hiroshi Mano, Tokyo; Hiromichi Yamada, Yokohama; Atsushi Kashihara, Hachiouji; Takashi Kawana; Hiroshi Atobe, both of Yokohama; Tetsuo Saito, Tokyo, all of Japan

[73] Assignee: Canon Kabushiki Kaisha, Tokyo, Japan

[21] Appl. No.: 430,161

[22] Filed: Apr. 27, 1995

Related U.S. Application Data

[63] Continuation of Ser. No. 858,075, Mar. 26, 1992, abandoned.

[30] Foreign Application Priority Data

Mar. 29, 1991 [JP] Japan .................. 3-065913
May 17, 1991 [JP] Japan .................. 3-113193

[51] Int. Cl.⁶ .................. H04N 1/387; G01D 15/14; G06K 9/46; G06K 9/40
[52] U.S. Cl. .................. 358/300; 358/448; 347/131; 347/133; 382/190; 382/209; 382/254
[58] Field of Search .................. 358/296, 300, 358/443, 444, 447, 448, 453, 457; 395/110, 150, 157; 382/16, 19, 22, 25, 28, 34, 48, 54, 55, 57, 190, 194, 199, 203, 205, 209, 254, 258, 264, 309; 347/129, 131, 133, 224, 251–254; 355/204, 208

[56] References Cited

U.S. PATENT DOCUMENTS

| | | | |
|---|---|---|---|
| 4,437,122 | 3/1984 | Walsh et al. | 358/166 |
| 4,468,808 | 8/1984 | Mori et al. | 382/25 X |
| 4,700,201 | 10/1987 | Sato | 346/108 |
| 4,847,641 | 7/1989 | Tung | 346/154 |
| 4,891,750 | 1/1990 | Pastor et al. | 382/25 X |
| 4,933,689 | 6/1990 | Yoknis | 346/154 |
| 4,989,039 | 1/1991 | Hayashi et al. | 355/208 |
| 5,005,139 | 4/1991 | Tung | 382/54 X |
| 5,050,222 | 9/1991 | Lee | 382/22 X |
| 5,060,276 | 10/1991 | Morris et al. | 382/48 X |
| 5,131,053 | 7/1992 | Bernzott et al. | 382/22 X |
| 5,189,441 | 2/1993 | Fukui et al. | 346/160 |
| 5,222,159 | 6/1993 | Kawamura et al. | 382/48 |
| 5,262,833 | 11/1993 | Fukushima et al. | 355/208 X |
| 5,305,057 | 4/1994 | Hattori et al. | 355/208 X |
| 5,313,308 | 5/1994 | Hasegawa et al. | 358/300 X |

FOREIGN PATENT DOCUMENTS

| | | | |
|---|---|---|---|
| 246457 | 11/1987 | European Pat. Off. | G06K 14/12 |
| 356224 | 2/1990 | European Pat. Off. | B41B 19/00 |
| 61-214666 | 9/1986 | Japan | H04N 1/40 |
| 61-214661 | 9/1986 | Japan | H04N 1/40 |

*Primary Examiner*—Peter S. Wong
*Assistant Examiner*—Eric Frahm
*Attorney, Agent, or Firm*—Fitzpatrick, Cella, Harper & Scinto

[57] ABSTRACT

Binary data (VDO) developed to a dot pattern are sequentially stored in line memories (1–9). A processing circuit (43) is constituted by a logic calculation circuit, and determines an edge portion of an image or a halftone image on the basis of 11×9 pixel data in shift registers (34–43). When the edge portion of an image is determined, data of a pixel of interest is converted to data that can print a smooth edge portion. Changed data (VDOM) is converted again according to the type of toner. The converted signal is supplied to a laser driver of a printer, and a printing operation is performed by scanning a laser. A resolution setting unit (1700) receives a resolution setting command from an external apparatus (1300), and sets a designated resolution in a printer (1200) according to the resolution setting command. The resolution setting unit (1700) divides one pixel into an optimal number of pixel sections on the basis of the designated resolution, and sets a logic circuit for performing optimal smoothing processing for divided data in a smoothing unit (1018). Bit map development based on code data supplied from the external apparatus (1300), and smoothing processing according to a smoothing logic, are performed.

23 Claims, 78 Drawing Sheets

|   | a | b | c | d | e | f | g | h | i | j | k |
|---|---|---|---|---|---|---|---|---|---|---|---|
| 1 | | | | | | | | | | | |
| 2 | | | | | | | | | | | |
| 3 | | | | | | | | | | | |
| 4 | | | | | | | | | | | |
| 5 | | | | | | A | | | | | |
| 6 | | | | | | | | | | | |
| 7 | | | | | | | | | | | |
| 8 | | | | | | | | | | | |
| 9 | | | | | | | | | | | |

- X5 = X2 = 0
- AT LEAST ONE OF Y1 TO Y8, X3, AND X4 IS "0"

THEN

- X1 = 0
- AT LEAST ONE OF Y1 TO Y8, X7, X3, AND X4 IS "0"

THEN

- X8 = X3 = 0
- AT LEAST ONE OF Y1 TO Y8, X1, AND X2 IS "0"

THEN

FIG.28a
FIG.28b
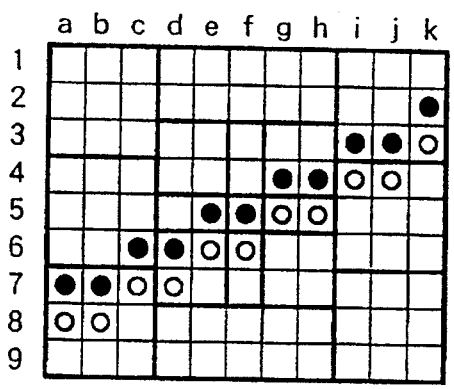
- X4 = X8 = 0
- AT LEAST ONE OF Y1 TO Y8, X1, X2 AND X6 IS "0"
THEN
FIG.28c
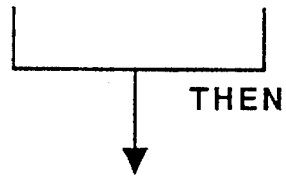

- X1 = X6 = 0
- AT LEAST ONE OF Y1 TO Y8, X4, AND X7 IS "0"

THEN

FIG.36b (diagram showing grid arrangements labeled Y1–Y8, X1–X8, with cells such as 1d 1e 1f 1g 1h / 2d 2e 2f 2g 2h, and central cell 5f)

FIG.36a (11×9 grid with columns a–k and rows 1–9, showing pairs of open/filled circles along a diagonal from g1,h1 down to d9,e9)

- X5 = 0
- AT LEAST ONE OF Y1 TO Y8, X3, X8 AND X7 IS "0"

THEN

- X4 = X7 = 0
- AT LEAST ONE OF Y1 TO Y8, X1, AND X6 IS "0"

THEN

- X4 = X8 = 0
- AT LEAST ONE OF Y1 TO Y8, X1, AND X6 IS "0"

THEN

FIG.38c

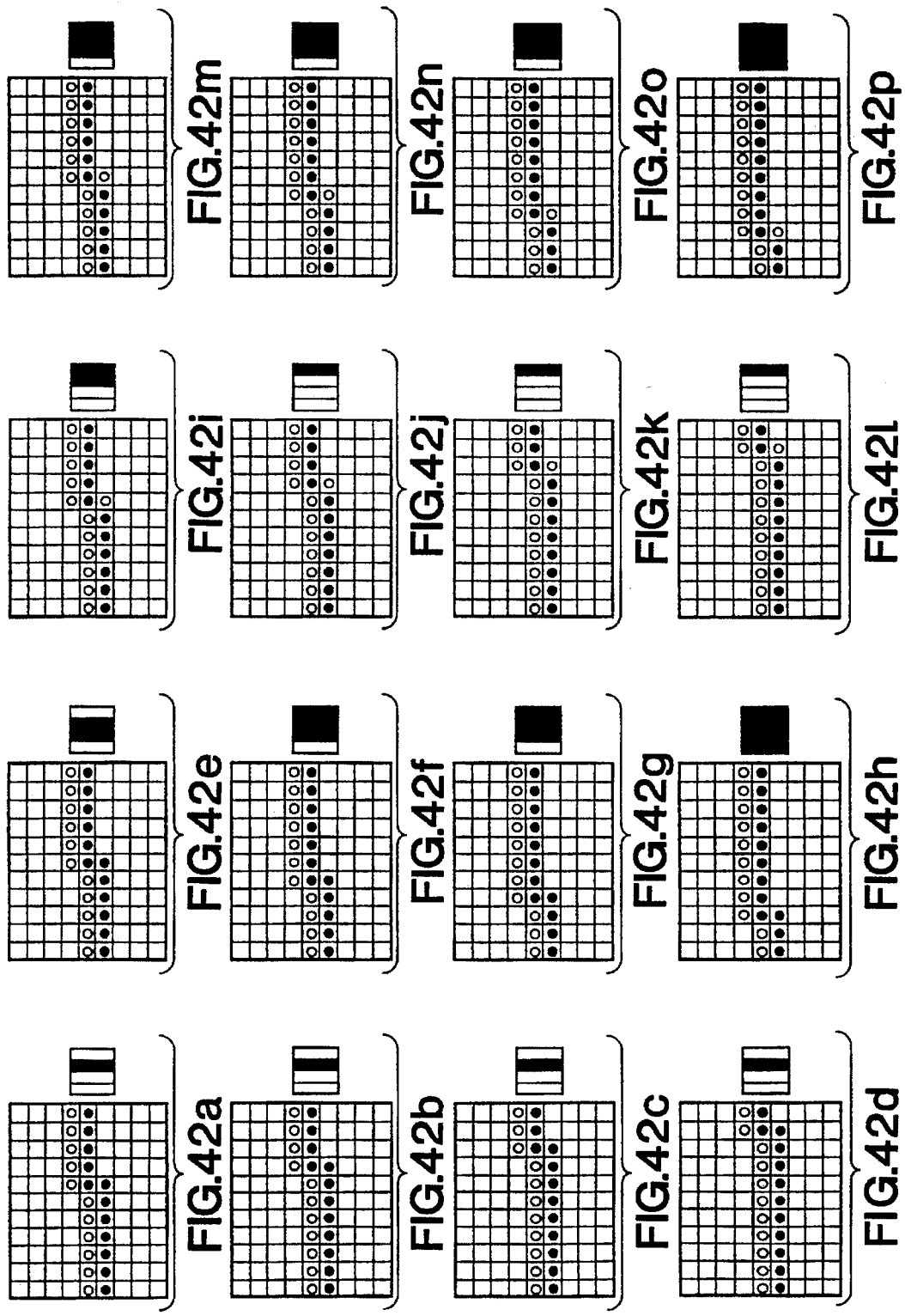

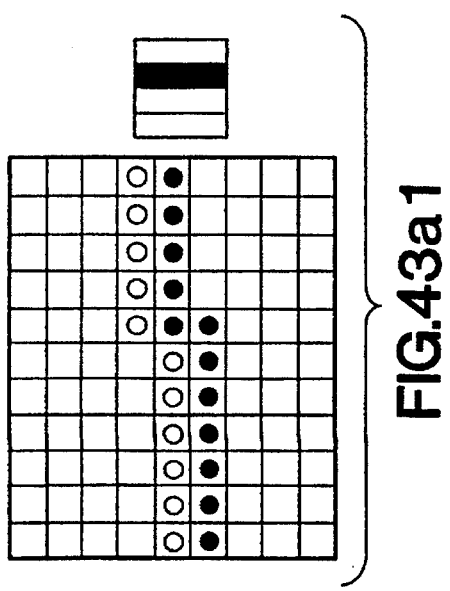
FIG.43a1
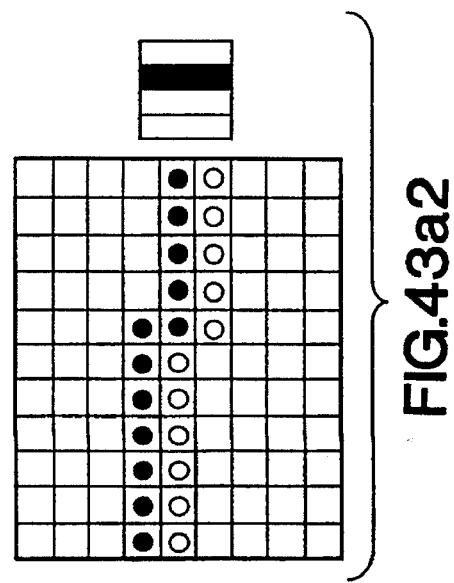
FIG.43a2
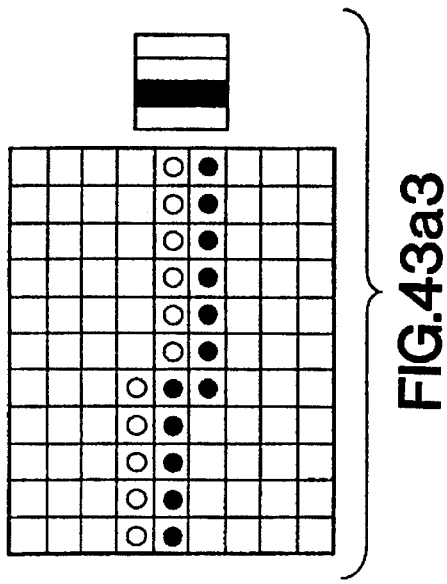
FIG.43a3
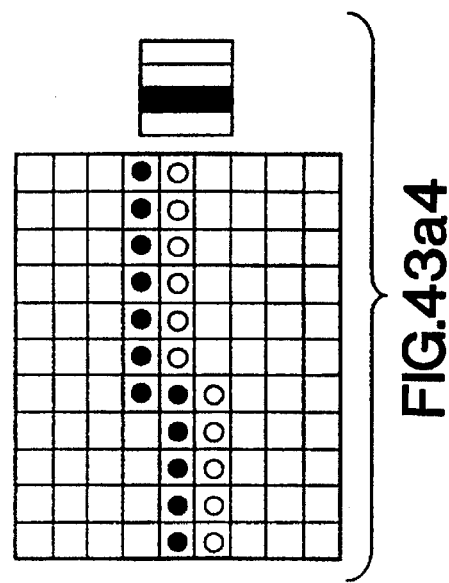
FIG.43a4

FIG.44a
PRIOR ART
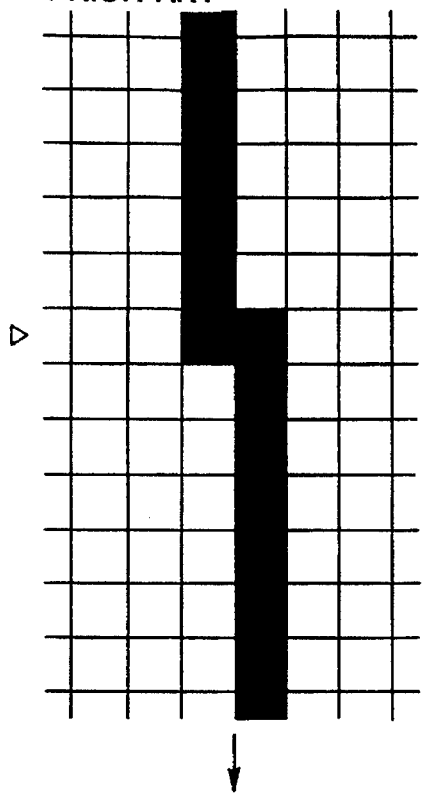
FIG.44c
PRIOR ART
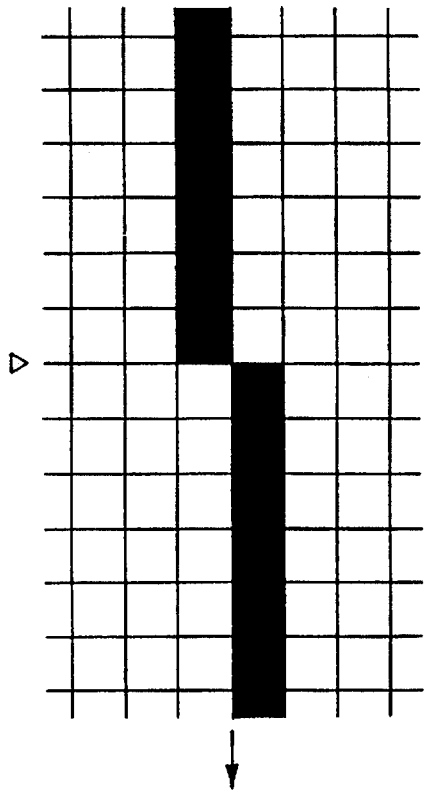
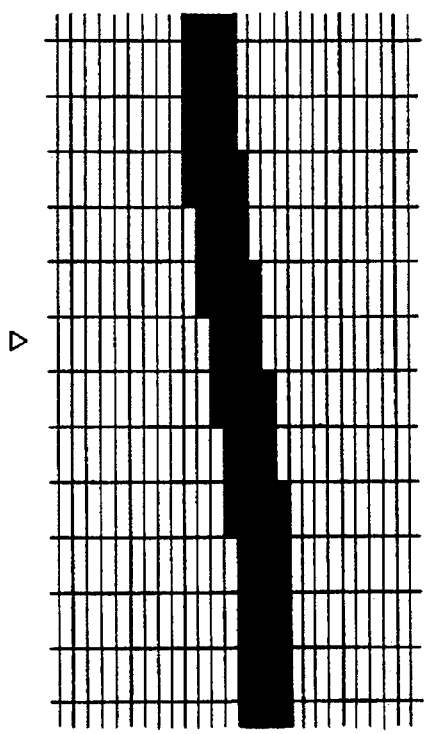
FIG.44b
PRIOR ART
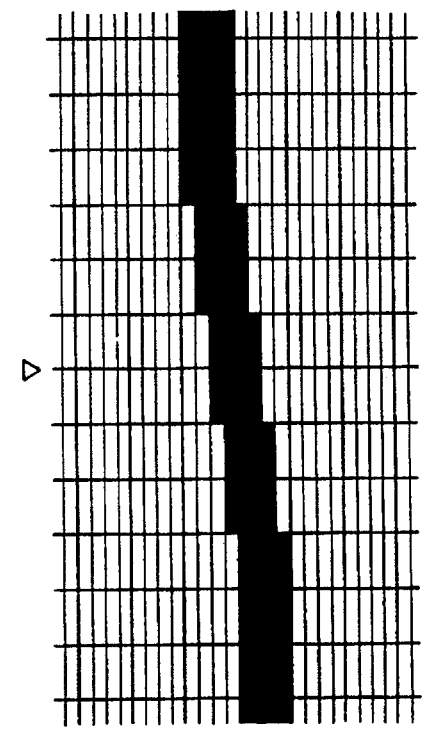
FIG.44d
PRIOR ART

FIG.46a
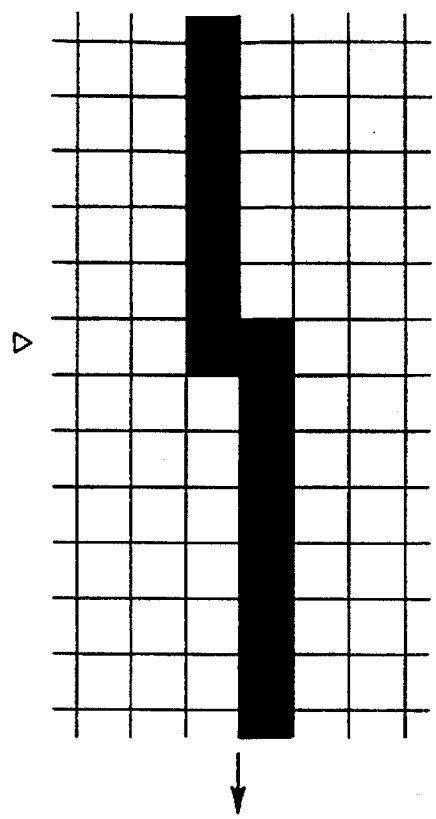
FIG.46c
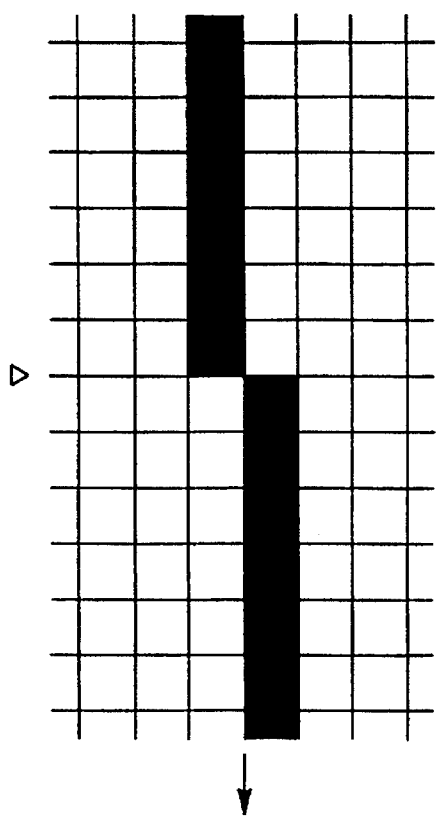
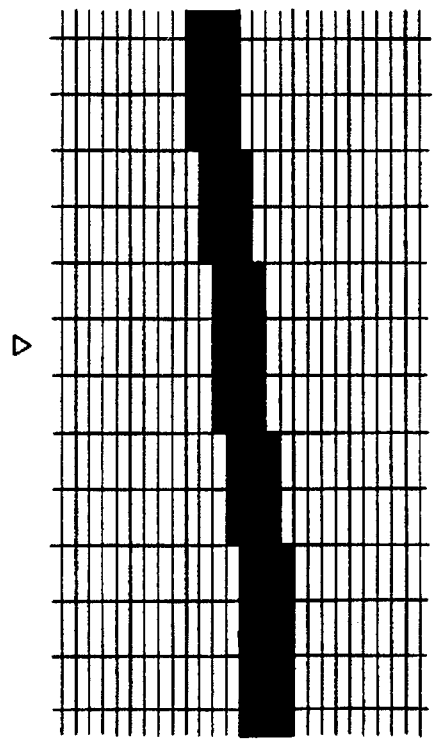
FIG.46b
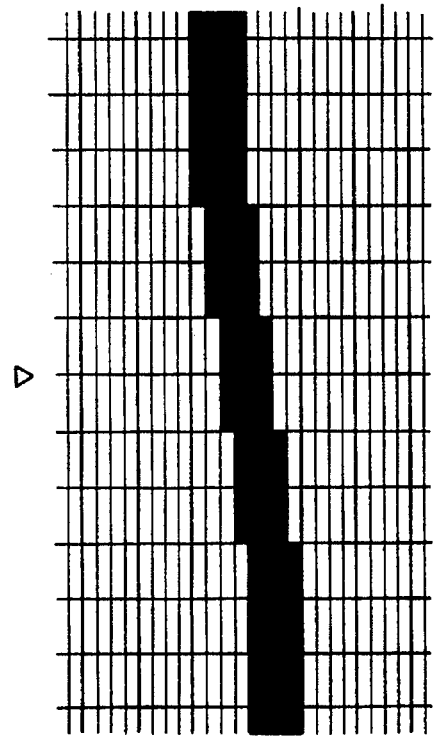
FIG.46d

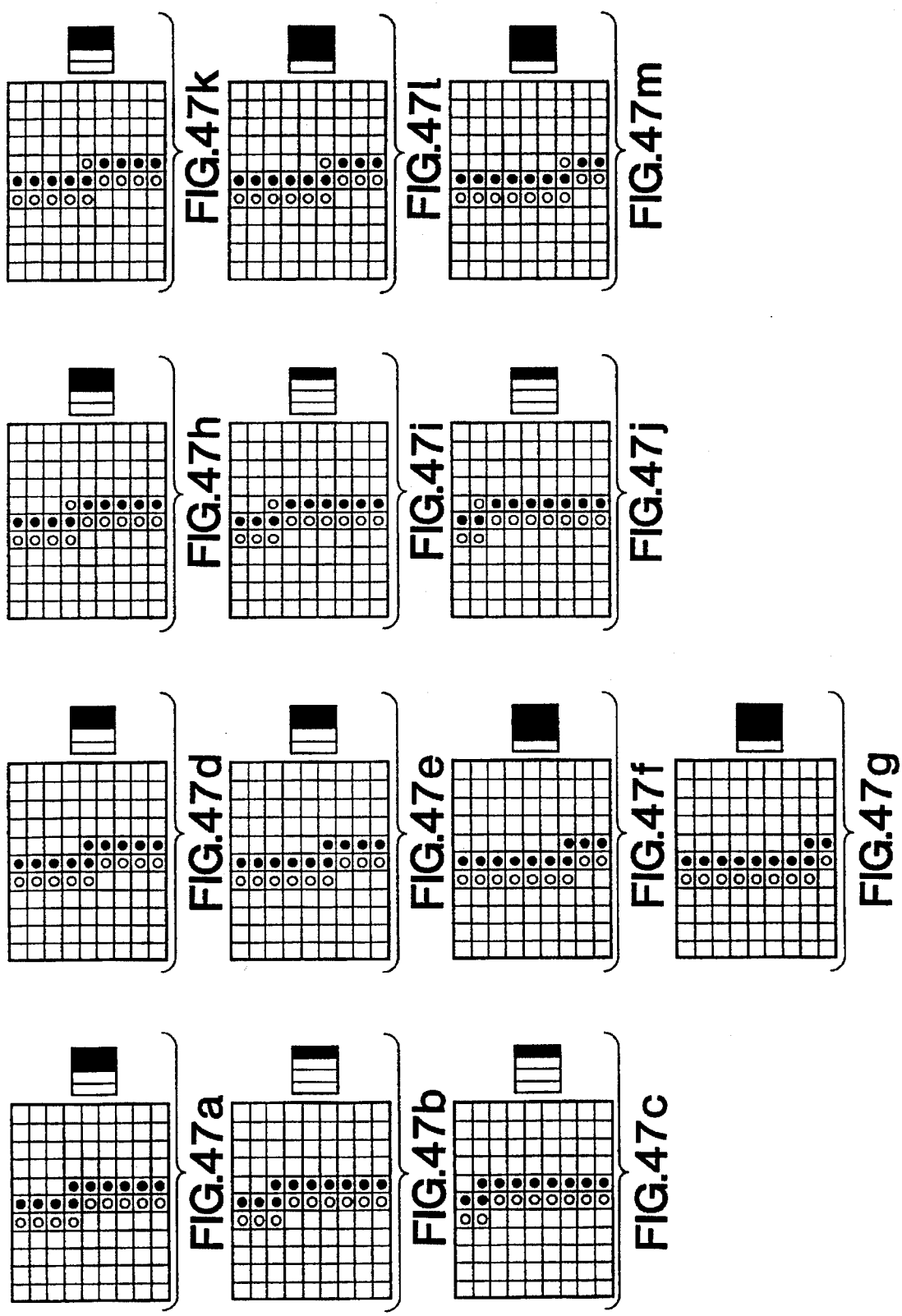

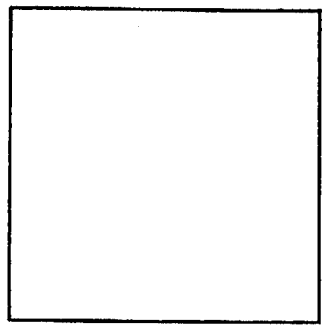
ORIGINAL PIXEL
FIG.53a
PRIOR ART
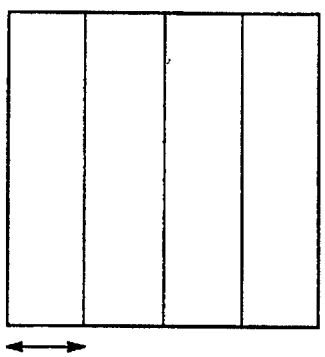 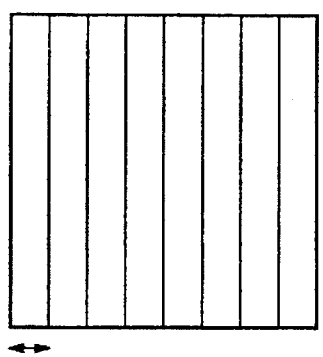 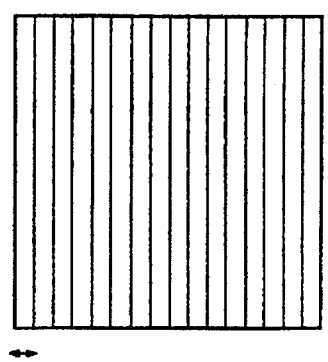
MODULATION PIXEL SIZE
FIG.53b
PRIOR ART
MODULATION PIXEL SIZE
FIG.53c
PRIOR ART
MODULATION PIXEL SIZE
FIG.53d
PRIOR ART

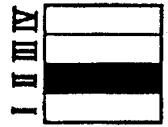
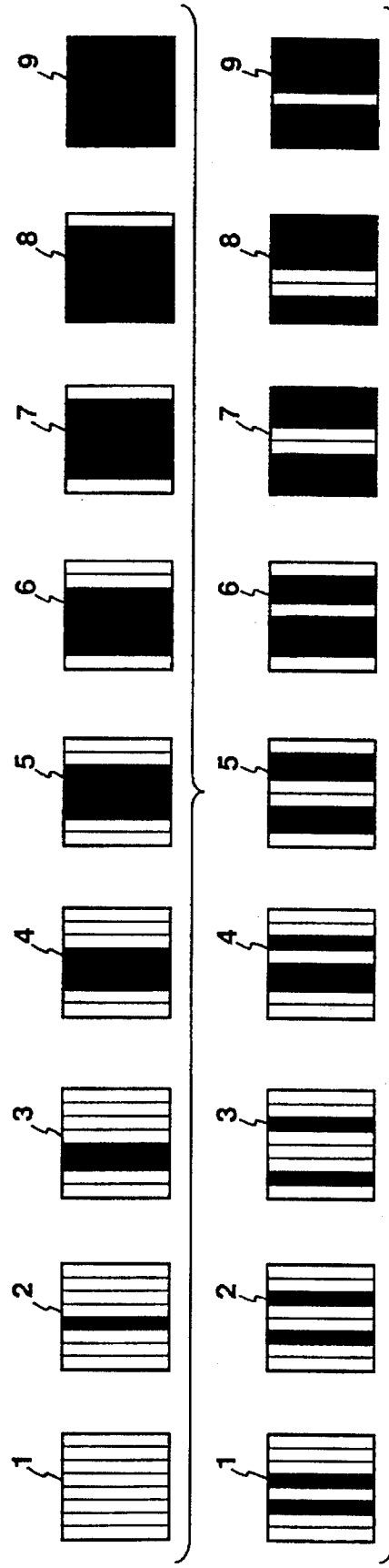
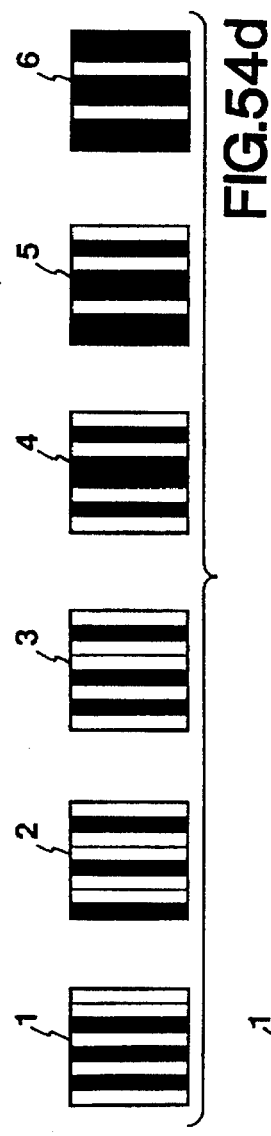

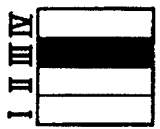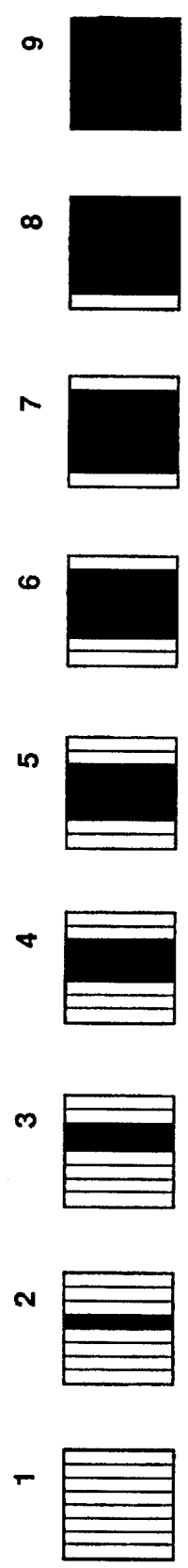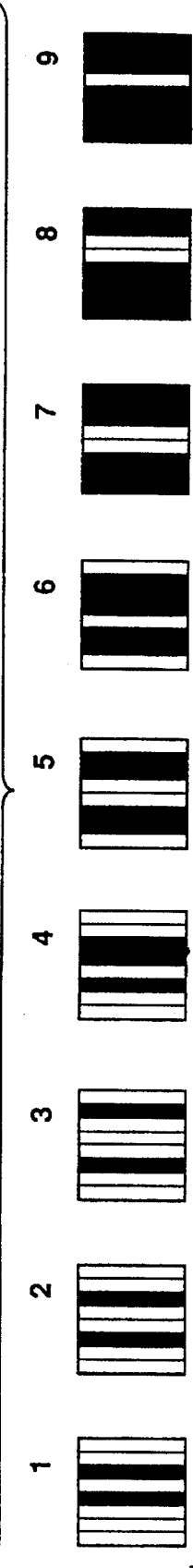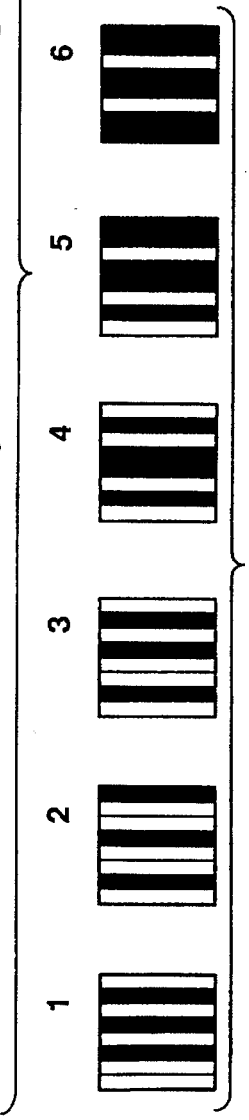
FIG.55a FIG.55b FIG.55c FIG.55d FIG.55e

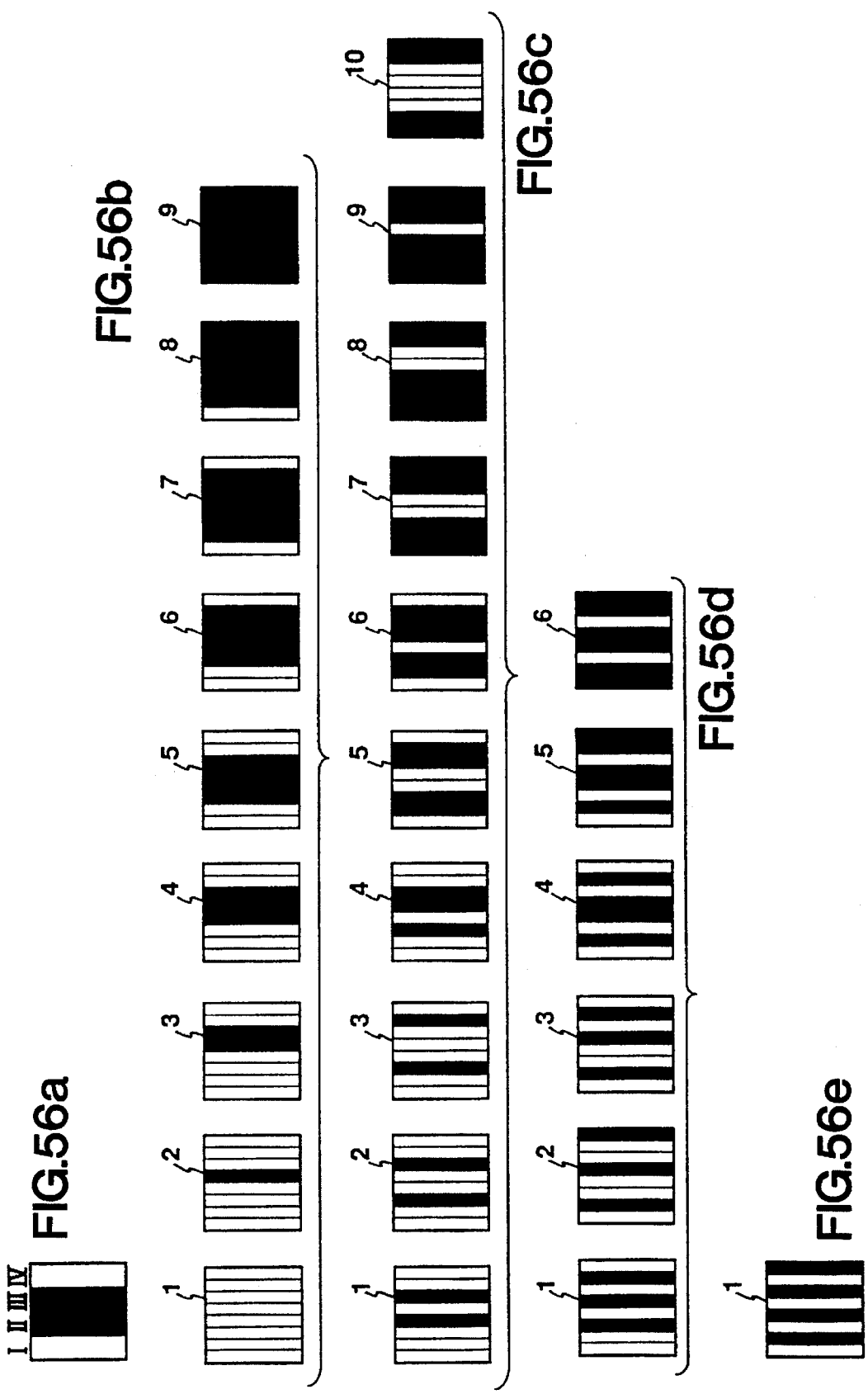

| SB5 | SB4 | SB3 | SB2 | SB1 | SB0 | PLS3 | PLS2 | PLS1 | PM7 | PM6 | PM5 | PM4 | PM3 | PM2 | PM1 | PM0 |
|---|---|---|---|---|---|---|---|---|---|---|---|---|---|---|---|---|
| 0 | 0 | 0 | – | – | – | 0 | 0 | 1 | 0 | 0 | 0 | 0 | 0 | 0 | 0 | 0 |
| | | | | | | 0 | 1 | 0 | 0 | 0 | 0 | 0 | 0 | 0 | 0 | 0 |
| | | | | | | 1 | 0 | 0 | – | – | – | – | – | – | – | – |
| | | | | | | OTHER | | | – | – | – | – | – | – | – | – |
| 0 | 0 | 1 | – | – | – | 0 | 0 | 1 | 0 | 0 | 0 | 0 | 1 | 0 | 0 | 0 |
| | | | | | | 0 | 1 | 0 | 0 | 0 | 0 | 1 | 0 | 0 | 0 | 0 |
| | | | | | | 1 | 0 | 0 | – | – | – | – | – | – | – | – |
| | | | | | | OTHER | | | – | – | – | – | – | – | – | – |
| 0 | 1 | 0 | – | – | – | 0 | 0 | 1 | 0 | 0 | 0 | 0 | 1 | 1 | 0 | 0 |
| | | | | | | 0 | 1 | 0 | 0 | 0 | 1 | 1 | 0 | 0 | 0 | 0 |
| | | | | | | 1 | 0 | 0 | – | – | – | – | – | – | – | – |
| | | | | | | OTHER | | | – | – | – | – | – | – | – | – |
| 0 | 1 | 1 | – | – | – | 0 | 0 | 1 | 0 | 0 | 0 | 1 | 0 | 1 | 0 | 0 |
| | | | | | | 0 | 1 | 0 | 0 | 0 | 1 | 0 | 1 | 0 | 0 | 0 |
| | | | | | | 1 | 0 | 0 | – | – | – | – | – | – | – | – |
| | | | | | | OTHER | | | – | – | – | – | – | – | – | – |
| 1 | 0 | 0 | – | – | – | 0 | 0 | 1 | 0 | 0 | 1 | 0 | 0 | 0 | 1 | 0 |
| | | | | | | 0 | 1 | 0 | 0 | 1 | 0 | 0 | 0 | 1 | 0 | 0 |
| | | | | | | 1 | 0 | 0 | – | – | – | – | – | – | – | – |
| | | | | | | OTHER | | | – | – | – | – | – | – | – | – |
| 1 | 0 | 1 | – | – | – | 0 | 0 | 1 | 0 | 0 | 1 | 0 | 1 | 0 | 1 | 0 |
| | | | | | | 0 | 1 | 0 | 0 | 1 | 0 | 1 | 0 | 1 | 0 | 0 |
| | | | | | | 1 | 0 | 0 | – | – | – | – | – | – | – | – |
| | | | | | | OTHER | | | – | – | – | – | – | – | – | – |
| 1 | 1 | 0 | – | – | – | 0 | 0 | 1 | 0 | 1 | 0 | 1 | 0 | 1 | 0 | 1 |
| | | | | | | 0 | 1 | 0 | 1 | 0 | 1 | 0 | 1 | 0 | 1 | 0 |
| | | | | | | 1 | 0 | 0 | – | – | – | – | – | – | – | – |
| | | | | | | OTHER | | | – | – | – | – | – | – | – | – |
| 1 | 1 | 1 | – | – | – | 0 | 0 | 1 | 1 | 1 | 1 | 1 | 1 | 1 | 1 | 1 |
| | | | | | | 0 | 1 | 0 | 1 | 1 | 1 | 1 | 1 | 1 | 1 | 1 |
| | | | | | | 1 | 0 | 0 | – | – | – | – | – | – | – | – |
| | | | | | | OTHER | | | – | – | – | – | – | – | – | – |

FIG.57

| SB5 | SB4 | SB3 | SB2 | SB1 | SB0 | PLS3 | PLS2 | PLS1 | PM7 | PM6 | PM5 | PM4 | PM3 | PM2 | PM1 | PM0 |
|---|---|---|---|---|---|---|---|---|---|---|---|---|---|---|---|---|
| – | – | – | 0 | 0 | 0 | 0 | 0 | 1 | – | – | – | – | – | – | – | – |
| | | | | | | 0 | 1 | 0 | – | – | – | – | – | – | – | – |
| | | | | | | 1 | 0 | 0 | 0 | 0 | 0 | 0 | 0 | 0 | 0 | 0 |
| | | | | | | OTHER | | | – | – | – | – | – | – | – | – |
| – | – | – | 0 | 0 | 1 | 0 | 0 | 1 | – | – | – | – | – | – | – | – |
| | | | | | | 0 | 1 | 0 | – | – | – | – | – | – | – | – |
| | | | | | | 1 | 0 | 0 | 0 | 0 | 1 | 0 | 0 | 1 | 0 | 0 |
| | | | | | | OTHER | | | – | – | – | – | – | – | – | – |
| – | – | – | 0 | 1 | 0 | 0 | 0 | 1 | – | – | – | – | – | – | – | – |
| | | | | | | 0 | 1 | 0 | – | – | – | – | – | – | – | – |
| | | | | | | 1 | 0 | 0 | 0 | 1 | 1 | 0 | 0 | 1 | 1 | 0 |
| | | | | | | OTHER | | | – | – | – | – | – | – | – | – |
| – | – | – | 0 | 1 | 1 | 0 | 0 | 1 | – | – | – | – | – | – | – | – |
| | | | | | | 0 | 1 | 0 | – | – | – | – | – | – | – | – |
| | | | | | | 1 | 0 | 0 | 0 | 1 | 0 | 1 | 1 | 0 | 1 | 0 |
| | | | | | | OTHER | | | – | – | – | – | – | – | – | – |
| – | – | – | 1 | 0 | 0 | 0 | 0 | 1 | – | – | – | – | – | – | – | – |
| | | | | | | 0 | 1 | 0 | – | – | – | – | – | – | – | – |
| | | | | | | 1 | 0 | 0 | 1 | 1 | 1 | 0 | 0 | 1 | 1 | 1 |
| | | | | | | OTHER | | | – | – | – | – | – | – | – | – |
| – | – | – | 1 | 0 | 1 | 0 | 0 | 1 | – | – | – | – | – | – | – | – |
| | | | | | | 0 | 1 | 0 | – | – | – | – | – | – | – | – |
| | | | | | | 1 | 0 | 0 | 1 | 1 | 0 | 1 | 1 | 0 | 1 | 1 |
| | | | | | | OTHER | | | – | – | – | – | – | – | – | – |
| – | – | – | 1 | 1 | 0 | 0 | 0 | 1 | – | – | – | – | – | – | – | – |
| | | | | | | 0 | 1 | 0 | – | – | – | – | – | – | – | – |
| | | | | | | 1 | 0 | 0 | 0 | 1 | 1 | 1 | 1 | 1 | 1 | 0 |
| | | | | | | OTHER | | | – | – | – | – | – | – | – | – |
| – | – | – | 1 | 1 | 1 | 0 | 0 | 1 | – | – | – | – | – | – | – | – |
| | | | | | | 0 | 1 | 0 | – | – | – | – | – | – | – | – |
| | | | | | | 1 | 0 | 0 | 1 | 1 | 1 | 1 | 1 | 1 | 1 | 1 |
| | | | | | | OTHER | | | – | – | – | – | – | – | – | – |

FIG.58

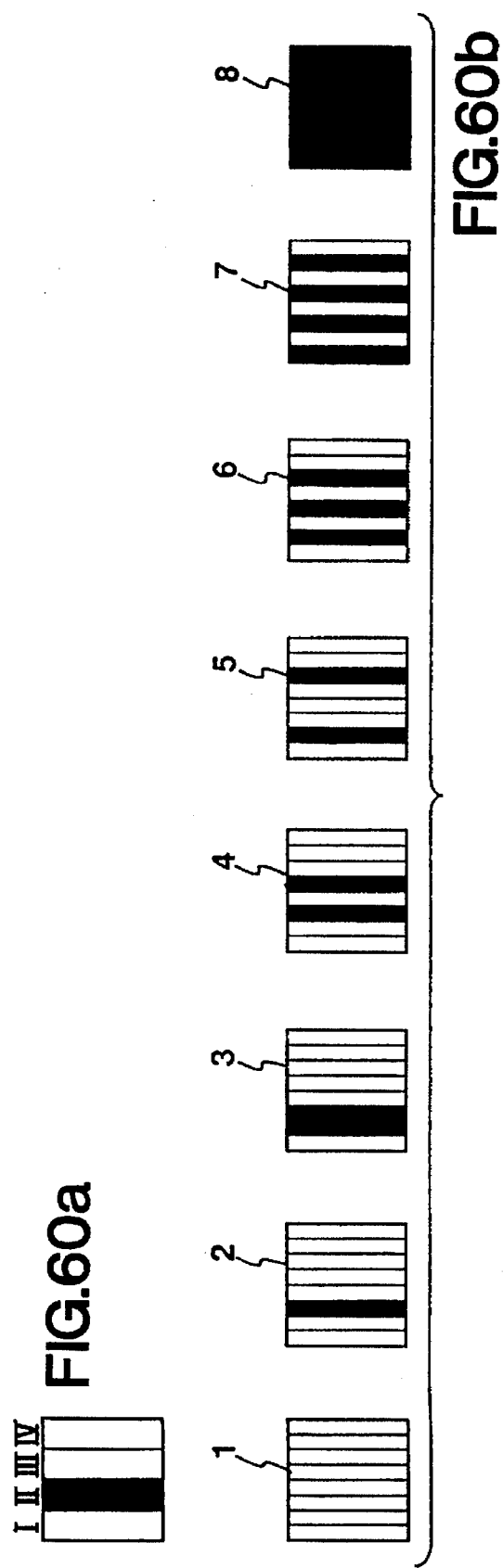

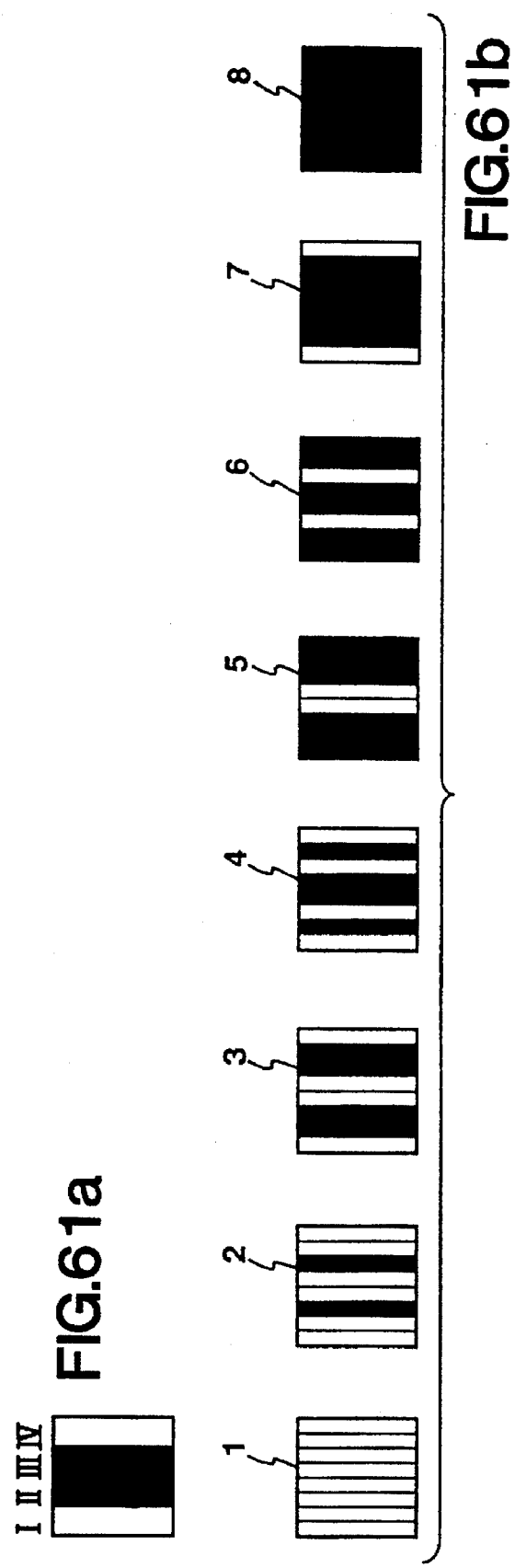

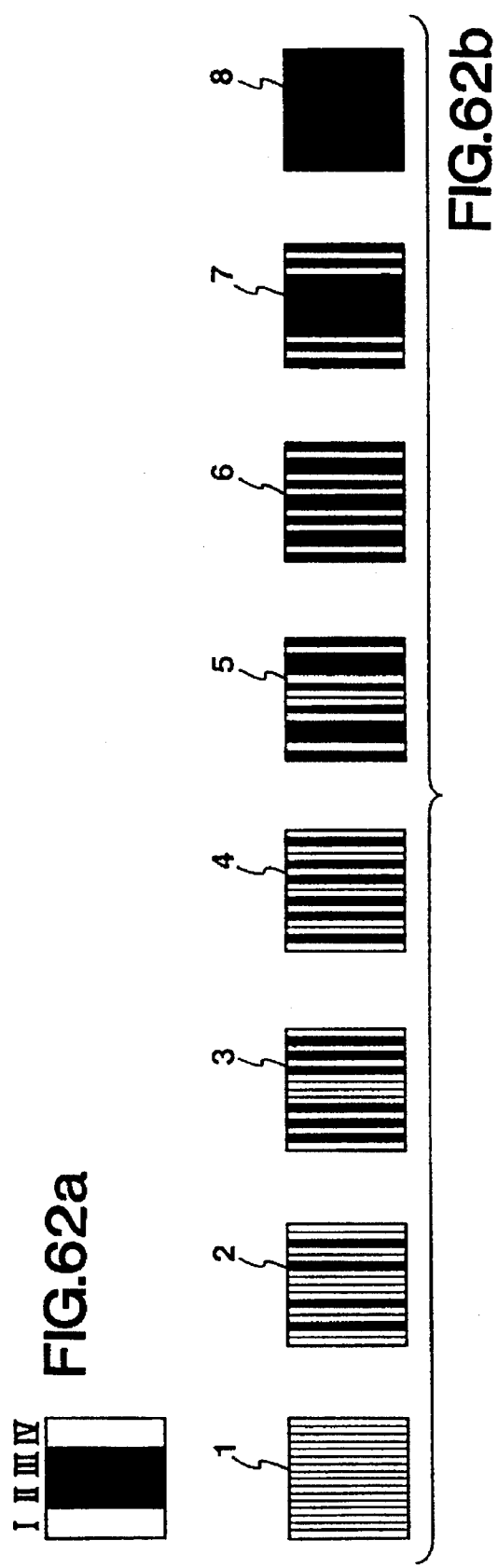
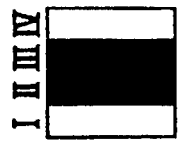
FIG.62a
FIG.62b

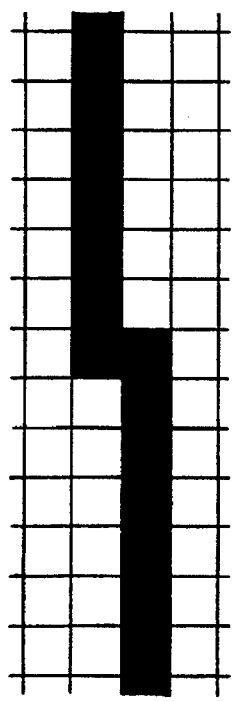
FIG.64a ORIGINAL IMAGE (240 OR 300 dpi)
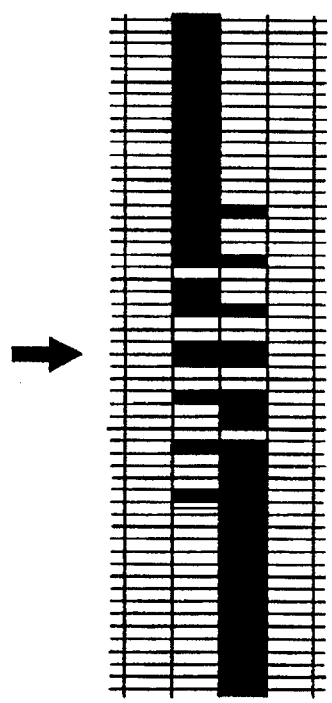
FIG.64b PROCESSED IMAGE
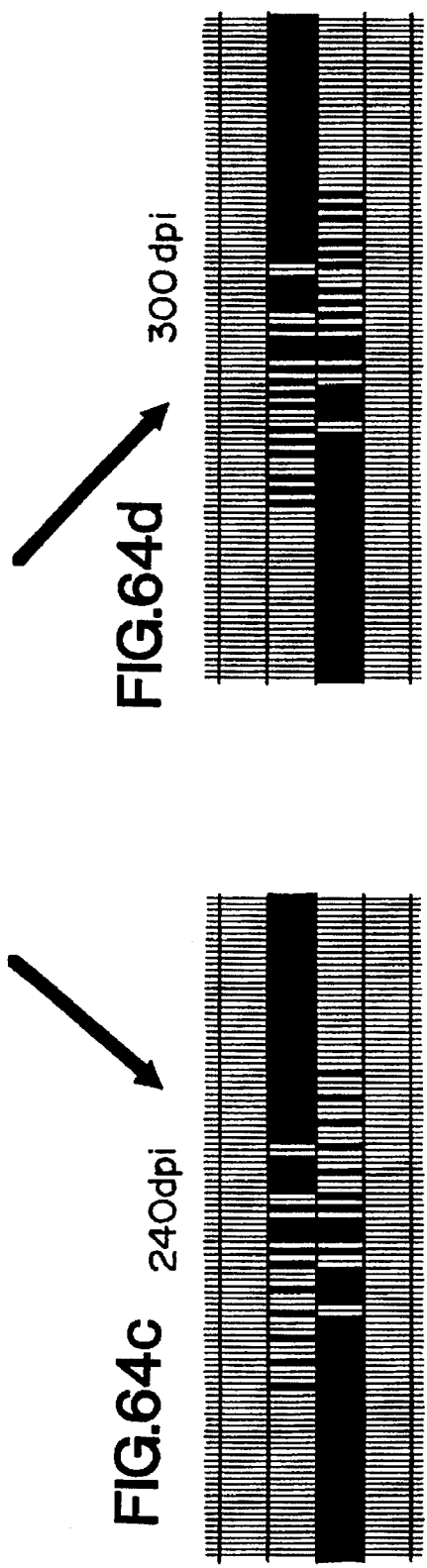
FIG.64d 300 dpi
FIG.64c 240 dpi

300dpi
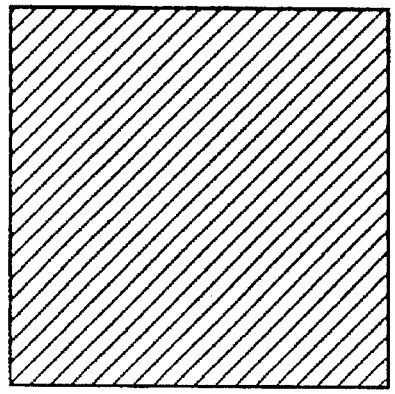  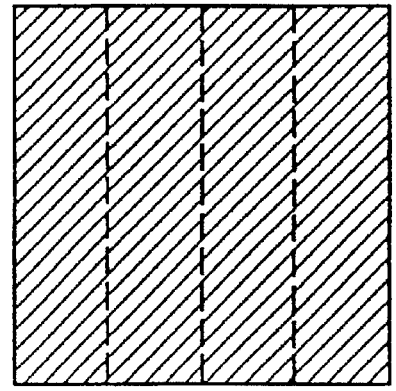
FIG.70a
ONE PIXEL FOUR-DIVISION METHOD
600dpi
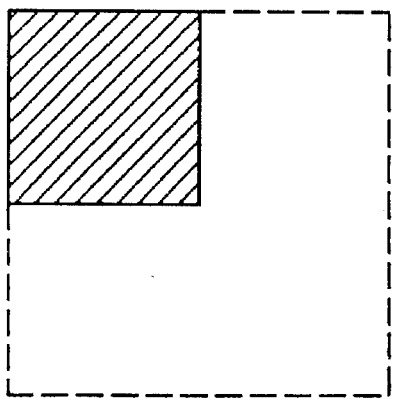  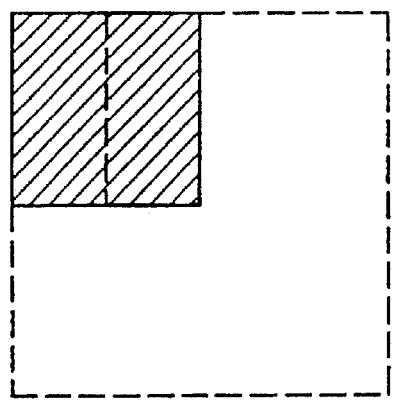
FIG.70b
ONE PIXEL TWO-DIVISION METHOD

IMAGE SMOOTHING USING SELECTION AMONG PLURAL PRE-STORED PIXEL PATTERNS AS SMOOTHED DATA

This application is a continuation-in-part of application Ser. No. 07/858,075, filed Mar. 26, 1992, now abandoned.

BACKGROUND OF THE INVENTION

1. [Field of the Invention]

The present invention relates to an information recording apparatus, which can switch the image dot density, for example, to an information recording apparatus such as a laser beam printer and, more particularly, to an information recording apparatus and an image recording method, in which bit map data representing a character or a figure is printed after smoothing processing, so that the edge of the printed character or figure can be smoothed to improve printing quality.

2. [Description of the Prior Art]

In recent years, laser beam printers has been widely used as output devices for computers. In particular, compact printers having a resolution of about 300 dpi (dots/inch) have become increasingly popular since they are compact and inexpensive.

As shown in FIG. 77, a laser beam printer comprises a printer engine 1801 for actually forming a printing image on a photosensitive drum on the basis of dot data, and transferring the formed image onto an output sheet, and a printer controller 1802, connected to the printer engine 1801, for receiving code data supplied from an external host computer 1803, generating page information consisting of dot data (bit map data) on the basis of the code data, and sequentially transmitting the dot data to the printer engine 1801. The host computer 1803 loads a program from a floppy disk 1804 containing an application software program, starts the application software program, and serves as, e.g., a wordprocessor.

The printing operation process in the printer controller 1802 will be described below with reference to FIG. 78.

In FIG. 78, reference numeral 1114 denotes an image memory for storing bit map data (image data) for one page; 1115, an address generator for generating an address for the image memory 1114; 1116, an output buffer register for converting image data read out from the image memory 1114 into an image signal VIDEO; 1117, a sync clock generator for generating an image clock signal VCLK synchronized with a known beam detect signal (BD signal) as a horizontal sync signal; 1118, a CPU for controlling the overall controller; 1119, a printer I/F as a signal I/O unit with a printer engine 1201; and 1120, a host I/F serving as a signal I/O unit for communication with an external host apparatus such as a personal computer.

In the above arrangement, an operation when the image signal VIDEO is supplied to the printer engine will be described below.

When image data for one page are prepared in the image memory 1114, a printer controller 1802 (1202) sends a print request signal PRINT to the printer engine 1801 (1201). Upon reception of the signal PRINT, the printer engine 1801 starts the printing operation. When the printer engine is ready to receive a vertical sync signal VSYNC, it sends a signal VSREQ to the printer controller 1802. Upon reception of the signal VSREQ, the printer controller 1802 sends the vertical sync signal VSYNC to the printer engine 1801, and counts a predetermined period of time from the signal VSYNC, so that the printing operation can be performed from a predetermined position in the subscanning direction.

Upon completion of the counting of the predetermined period of time, the address generator 1115 sequentially generates addresses from the start address of image data stored in the image memory 1114, thereby reading out the image data. The read-out image data are input to the output buffer register 1116 for each main scanning line. The output buffer register 1116 counts the image clock signal VCLK after the BD signal is input, so that the printing operation is started from the predetermined position in the main scanning direction. Thereafter, the register 1116 supplies data for the corresponding printing line to the printer engine 1801 as the image signal VIDEO synchronized with the signal VCLK. The printer engine 1801 performs the above-mentioned image forming operation.

The operations described above are performed in units of printing pages, so that the printing operation can be always performed at the same position on paper sheets.

However, in recent years, demand has arisen for an increase in resolution of printing output, not excepting by laser beam printers.

Thus, an increase in resolution of the laser beam printer may be proposed. For example, assume that the resolution is increased to 600 dpi, twice the common 300 dpi. In this case, if the increase in resolution is realized by simply increasing the capacity of the image memory needed for the printer controller, a capacity four times that required for 300 dpi is required, resulting in an expensive printer.

In addition, when the same printing speed as that for 300 dpi is to be obtained, the output frequency of image data must be four times that for 300 dpi, and the printer controller must be operated at a speed four times that for 300 dpi.

Thus, a method of converting printing data of a recording pixel into printing data, in which the dot density is higher than the recording dot density only in the main scanning direction, may be proposed. In this method, recording data of a recording pixel and its surrounding pixels are referred to, and smoothing processing is normally performed.

In the smoothing processing, when the resolution of the printer is switched from, e.g., 300 dpi to 600 dpi, proper smoothing processing cannot be performed.

A laser beam printer using the electrophotography technique is also used in an output apparatus of a computer, an output unit of a facsimile apparatus, a so-called digital copying machine for printing image data read by an image scanner, or the like.

The laser beam printer used in these apparatuses performs a printing operation at a resolution of, e.g., 300 dpi.

In this case, as shown in FIG. 4, a character or a figure is drawn and printed by black dots (● marks) and white dots (○ marks), which are printed at positions on a 300-dpi matrix. FIG. 4 shows a dot pattern of English letter "a". At the resolution of 300 dpi, the interval between adjacent dots is about 85μ. It is generally known that a person can perceive up to about 20μ. As compared to this, the edge portion of a character or figure formed by dots looks nonsmooth at the above resolution (about 85μ), and high printing quality cannot be warranted.

In order to solve this problem, the following approaches can be tried.

As the first approach, a method of simply increasing the resolution (e.g., 1,200 dpi) may be adopted. However, in this case, a bit map memory having a capacity 16 times (=4×4) that used at 300 dpi is required to express the identical area, resulting in a very expensive apparatus.

As the second approach, the following method is known. That is, a buffer memory having a small capacity is added without increasing the capacity of the bit map memory, and printing data of a pixel of interest is modulated by referring to dot data around the pixel of interest to be printed, thereby equivalently increasing the resolution in one or both of the main scanning and subscanning directions.

The techniques described in U.S. Pat. Nos. 4,437,122 and 4,700,201 are methods of referring to only a pixel of interest and eight pixels around the pixel of interest, in correcting the pixel of interest to be printed. In the method of this type, since a reference region—of the surrounding pixels which are referred to is narrow, it can be recognized that the pixel of interest is a portion of a curve, but the curvature of the curve to which the pixel of interest belongs, cannot be recognized. In particular, an almost horizontal or vertical edge portion cannot be detected. Therefore, since optimal correction cannot be performed according to the curvature, it is difficult to optimize the smoothing effect.

The technique described in U.S. Pat. No. 4,847,641 refers to a wider region than the above-mentioned two techniques, and can recognize the curvature of a curve to which a pixel of interest belongs. In this technique, however, although the reference region is wide, each of the matching patterns to be matched refers to only a portion of the reference region. Therefore, this technique suffers from the following drawbacks.

As the first drawback, it cannot be identified whether or not a pixel of interest is a portion of a binary halftone image such as a dither image or an image formed by an error diffusion method. For this reason, although the smoothing effect can be provided to a character image, some dots constituting a dither image or halftone pixels formed by the error diffusion method may often be erroneously smoothed. For example, FIG. 9-$a$ partially shows a 4×4 dither image. In FIG. 9-$a$, if a limited region around a pixel of interest 5$f$ is referred to, it is erroneously "recognized" that the pixel of interest is a portion of a character or figure. For this reason, the pixel of interest 5$f$ is undesirably converted from a white pixel into a pixel having non-zero density. Therefore, a halftone image suffers from a local change in image density. As a result, possibility of image deterioration (e.g., formation of a pseudo-edge) is high.

As the second drawback, it cannot be identified whether or not a pixel of interest belongs to a portion of an image in which pixels are crowded (concentrated). For example, FIG. 9-$b$ shows an image constituted by a group of crowded dot lines. In this case, pixels for which the density of dots must be changed to smooth lines are those indicated by "Δ marks" or "x marks" in FIG. 9-$c$. As can be seen from FIG. 9-$c$, a pixel to be changed is adjacent to or in the vicinity of pixels which are changed for a pixel adjacent to the pixel to be changed. As a result, the resolution of the image is decreased. Pixels are complicatedly crowded not only in crowded line images, but also in a small character or a complicated character such as many kanji. In this case, a pixel of interest, which is changed in the smoothing processing, is adjacent to pixels to be changed for an adjacent image. For this reason, a corresponding pixel (a corresponding line or a side of a corresponding character) cannot be clearly identified from adjacent pixels. As a result, the resolution of an image in the corresponding portion is excessively decreased. As a result, a blurred image is formed, or "moiré" noise is generated in an image, resulting in deterioration of image quality. Furthermore, when a pixel is expressed as a halftone pixel within one pixel for the purpose of smoothing in an image crowded portion, density reproduction becomes unstable due to an interaction with adjacent pixels, and is easily influenced by a variation in environment (temperature and humidity). As a result, the smoothing effect varies depending on the environment. For this reason, every time a given character is printed, it may look like another font having a different character pattern.

Of course, the reference region of each matching pattern may be sufficiently widened so as to make it possible to identify whether or not a pixel of interest belongs to a dither image or an image crowded portion. However, the effect of "simplification of a processing circuit" as the object of this technique cannot then be obtained.

As described above, there have been proposed many methods of checking and detecting the kind of feature of a boundary portion, to which a pixel of interest belongs, of an image such as a figure or character.

In contrast to this, as the prior technique about how to change a pixel of interest according to the detected feature of a boundary portion to which the pixel of interest belongs, the following patents are proposed in addition to the above-mentioned prior arts. That is, U.S. Pat. No. 4,933,689, and Japanese Patent Laid-Open Nos. 61-214661 and 61-214666 are known.

However, with the above-mentioned technique, the following problems are posed.

The first problem is associated with to what extent the modulation pixel unit size used when a pixel of interest is changed by a smoothing processing circuit is to be segmented. The modulation pixel size will be described below with reference to FIG. 53-$a$ to 53-$d$. FIG. 53-$a$ shows an original pixel before smoothing. FIG. 53-$b$ shows a case wherein the modulation pixel size for modulation in smoothing processing is set to be ¼ the original pixel. FIG. 53-$c$ shows a case wherein the modulation pixel size for modulation in smoothing processing is set to be ⅛ the original pixel. FIG. 53-$d$ shows a case wherein the modulation pixel size for modulation in smoothing processing is set to be 1/16 the original pixel.

As the modulation pixel unit size is made smaller, finer smoothing processing can be performed. However, the driving frequency of a smoothing processing circuit is increased accordingly. Thus, the smoothing processing circuit must be designed using a Bi-CMOS logic or ECL logic, resulting in an expensive circuit.

When the modulation pixel unit size is large, an image is printed while pixels of modulation pixel units are sufficiently resolved, and a portion subjected to the smoothing processing has, not the desired "blurred" appearance but a "whisker"-like appearance. Thus, a desired smoothing effect is not satisfactory.

The modulation pixel unit size which can satisfy both the above-mentioned contradictory conditions, varies considerably depending on the toner particle size. Commercially available laser beam printers normally employ a toner having a toner particle size of 10 to 12μ (to be referred to as a normal particle size toner hereinafter).

In recent years, in order to increase resolution, printers which employ a toner having a toner particle size of 5 to 6μ (to be referred to as a small particle size toner hereinafter), have been developed or are commercially available. The optimal modulation pixel unit size also varies depending on the laser light-emission response characteristics due to a difference in laser driving circuits, electrophotography process conditions, and the like.

In general, a smoothing processing circuit is often designed as an integrated circuit such as a gate array, such as a CMOS keyboard including 3,000 to 10,000 gates. It is undesirable to develop other gate arrays simply to accommodate differences in toner. On the other hand, when some additional processing functions corresponding to different toners are built in a single gate array, not only is the number of gate keyboards increased, but also a type of logic, with which the integrated circuit can respond to a high frequency, e.g., a Bi-CMOS logic, or ECL logic is required, resulting in an increase in cost. Even for a given toner, the modulation pixel size changes according to a change in laser light-emission rise characteristics or electrophotography process. For this reason, too, it is not practical to prepare different smoothing processing functions corresponding to many conditions in advance.

The second problem is posed when the above-mentioned smoothing processing circuit is applied to a printer engine which can switch the printing dot density. For example, when the printing dot density is switched between 240 dpi and 300 dpi or between 300 dpi and 600 dpi in response to a command, it is difficult to optimize smoothing effects for both printing dot densities. More specifically, even when an algorithm which can improve a smoothing effect for one printing dot density, is used, the smoothing effect for the other printing dot density cannot always be optimized.

The third problem is associated with optimization of smoothing processing for a printer engine which has a function of changing the density of an image to be printed between light and dark levels by, e.g., a method of changing a high voltage to be applied to a developing unit. When the printing dot density is changed, the effect on a portion subjected to smoothing processing is also changed, and as a result, image quality is undesirably deteriorated.

The fourth problem is associated with the influence of use environmental conditions (e.g., temperature, humidity, and the like) of a printer engine on the smoothing effect. When environmental conditions (e.g., temperature, humidity, and the like) are changed, the printing dot density of a printed image is changed, and the effect on a portion subjected to smoothing processing is also changed. As a result, image quality is undesirably deteriorated.

SUMMARY OF THE INVENTION

As a technique for compensating for the drawbacks of the prior arts, the present applicant makes the following proposal.

More specifically, a feature of a dot pattern of a region around a pixel of interest is extracted from the entire region, and a dot pattern of a boundary portion of a figure to which the pixel of interest belongs, is compared with comparison patterns as combinations of a plurality of predetermined features and the dot pattern of the boundary portion. When a coincidence is found between the two patterns, the pixel of interest is changed.

Thus, a wide reference region can be referred to using a simple logic circuit.

This system, allows detection of an almost horizontal or vertical edge portion, and hence, optimal smoothing correction can be performed according to the curvature of an edge portion of a character or figure. Furthermore, a function of identifying a binary halftone image such as a dither image, or of identifying that figures are crowded is added to inhibit smoothing processing for the dither image or a crowded image, thus preventing deterioration of a halftone image.

Only when a predetermined white region is present in a portion around a pixel of interest to be changed, a pixel change operation for smoothing is performed, so that a smoothing effect is not easily influenced by environmental conditions.

In this manner, the object of the present invention is to provide an information recording apparatus, which can compensate for the above-mentioned drawbacks. More specifically, the object of the present invention is to provide an information recording apparatus, which can compensate for the above-mentioned drawbacks by the following arrangements.

In order to solve the first problem, it is an object of the present invention to provide an information recording apparatus, which has two or more different modulation pixel sizes so as to cope with a smoothing circuit corresponding to a plurality of toners having different toner particle sizes.

In order to solve the second problem, it is another object of the present invention to provide an information recording apparatus, which has a plurality of algorithms optimal for different printing dot densities, and can switch the algorithm upon switching of the printing dot density.

In order to solve the third problem, it is still another object of the present invention to provide an information recording apparatus, which has a plurality of algorithms corresponding to densities, and can switch the algorithm according to a change in density.

In order to solve the fourth problem, it is still another object of the present invention to provide an information recording apparatus, which detects the humidity and a temperature, and can select a corresponding one of a plurality of algorithms, which are prepared in advance.

As described above, the present invention provides techniques which are effective for execution of smoothing processing with high image quality.

As a means for achieving the above objects, the present invention comprises the following arrangement.

More specifically, an image recording apparatus, which can switch an image dot density, comprises reference means for referring to an image signal of a recording pixel to be processed, and image signals of pixels around the image signal of the recording pixel, and image processing means for, when a recording operation is performed at a resolution higher than that of an input recording pixel, dividing the image signal of the recording pixel and performing smoothing processing for each of the divided image signals on the basis of a reference result of the reference means.

For example, the image processing means performs different smoothing processing operations for the respective divided image signals. More specifically, conversion means for converting a smoothing processing method upon switching of the resolution of the image recording apparatus is arranged, so that a high-quality image output can be obtained at each resolution.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a view showing a matrix memory in this embodiment;

FIG. 10 is a view showing sections to be changed of a pixel of interest adopted in the first embodiment of the present invention;

FIG. 24 is a view showing a pattern in which the right and left halves of a pattern shown in FIG. 23-a are replaced with each other;

FIG. 28 is a view for explaining the feature extraction algorithm of this embodiment;

FIG. 36 is a view for explaining the feature extraction algorithm of this embodiment;

FIG. 37 is a view for explaining the feature extraction algorithm of this embodiment;

FIG. 38 is a view for explaining the feature extraction algorithm of this embodiment;

FIG. 42 is a view showing a smoothing algorithm of FIG. 41;

FIG. 43 is a view showing modification patterns of FIG. 42-a;

FIG. 44 is a view showing conventional smoothing processing;

FIG. 46 is a view showing a smoothing effect for an almost vertical longitudinal line according to this embodiment;

FIG. 47 is a view showing a smoothing algorithm of FIG. 46;

FIG. 53 is a view for explaining a modulation pixel size of this embodiment;

FIG. 54 is a view showing pulse change patterns of this embodiment;

FIG. 55 is a view showing pulse change patterns;

FIG. 56 is a view showing pulse change patterns;

FIG. 57 is a table showing an operation logic for executing pattern conversion shown in FIG. 59;

FIG. 58 is a table showing an operation logic for executing pattern conversion shown in FIG. 61;

FIGS. 60 through 63 are views showing pattern conversion in this embodiment;

FIG. 64 is a view showing pattern conversion for a printing dot density according to this embodiment;

FIG. 70 is a view for explaining switching of the number of pixel divisions upon switching the resolution according to the embodiment shown in FIG. 65;

DETAILED DESCRIPTION OF THE PREFERRED EMBODIMENTS (Embodiment)

An embodiment of the present invention will be described below with reference to the accompanying drawings.

Figure 1:
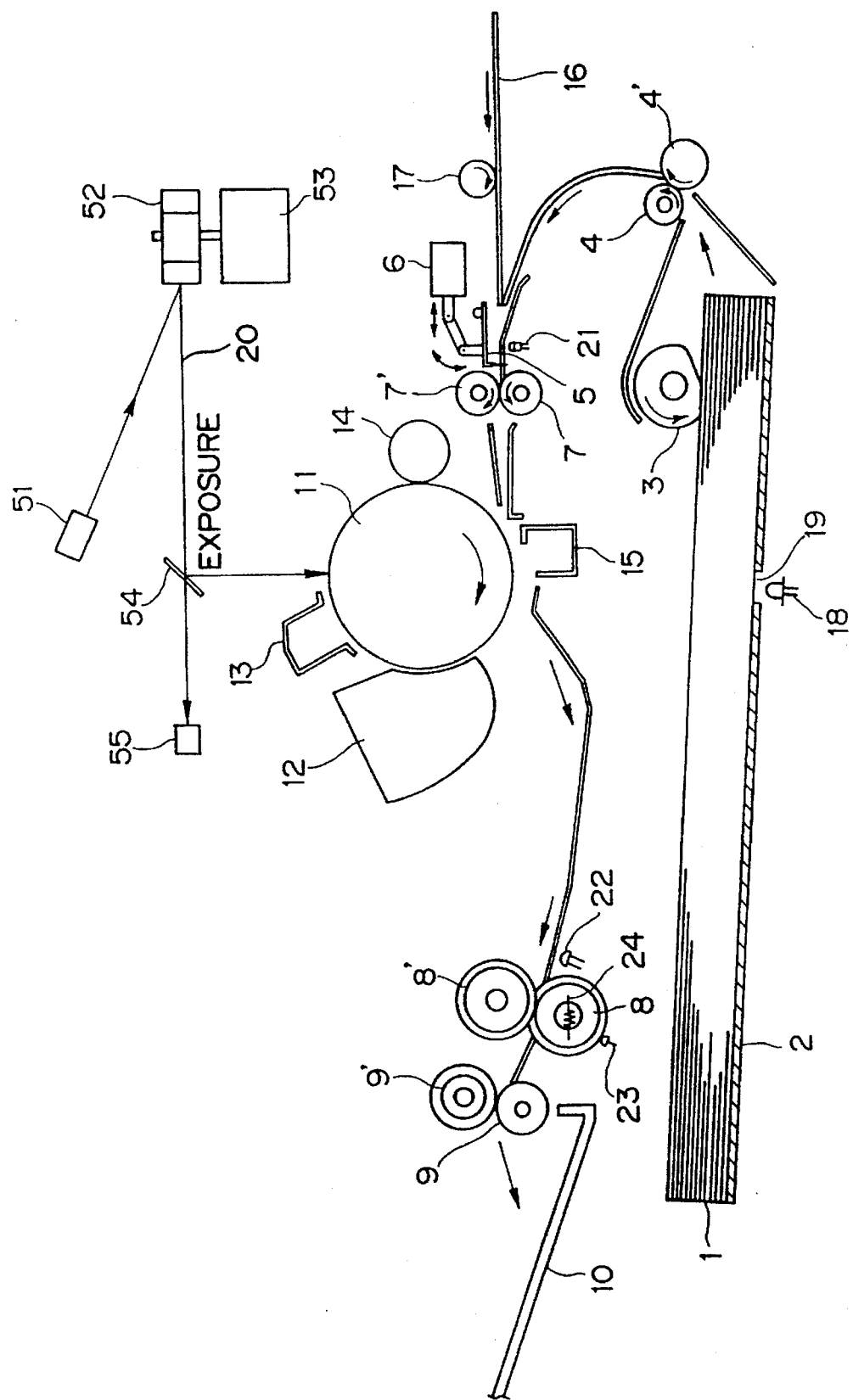
FIG. 1 is a schematic view showing an engine portion of a laser beam printer according to an embodiment of the present invention.
Figure 2:
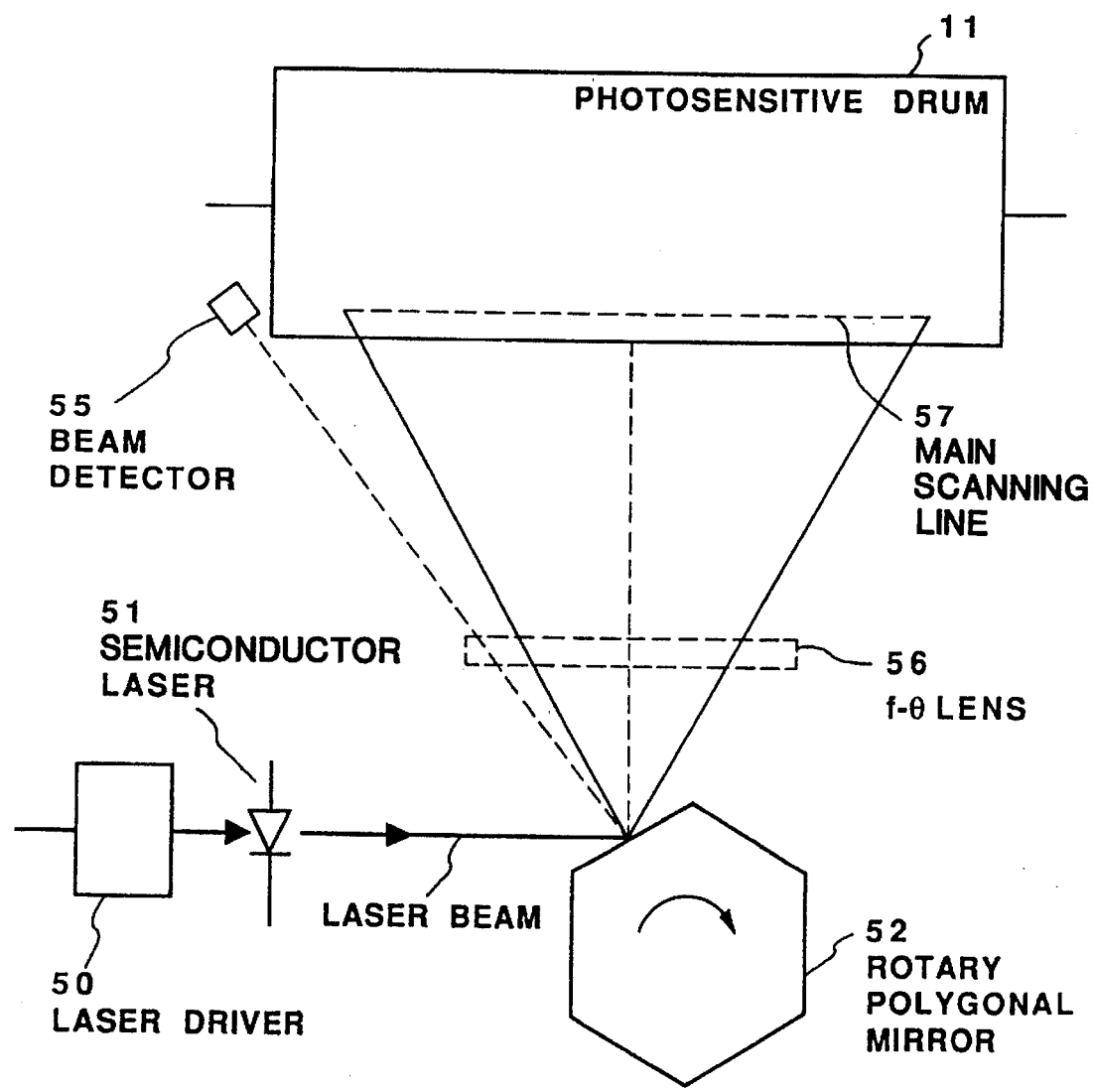
FIG. 2 is a view for partially explaining in detail the engine portion shown in FIG. 1.

FIGS. 1 and 2 show an engine portion of a laser beam printer according to the preferred embodiment of the present invention.

In FIGS. 1 and 2, reference numeral 1 denotes paper sheets as recording media; and 2, a paper cassette for holding the paper sheets 1. Reference numeral 3 denotes a paper feed cam for separating only the uppermost one of the paper sheets 1 stacked on the paper cassette 2, and conveying the leading end portion of the separated paper sheet to the position of paper feed rollers 4 and 4' by a driving means (not shown). The paper feed cam 3 is intermittently rotated in each paper feed operation, and feeds one paper sheet in correspondence with one revolution.

Reference numeral 18 denotes a reflection type photosensor for detecting light reflected by the paper sheet 1 through a hole 19 formed in the bottom portion of the paper cassette 2 so as to detect the presence/absence of paper sheets.

When a paper sheet is conveyed to the paper feed rollers 4 and 4' by the paper feed cam 3, the paper feed rollers 4 and 4' are rotated while gently pressing the paper sheet 1, thereby conveying the paper sheet 1. When the paper sheet 1 is conveyed, and its leading end portion reaches the position of a registration shutter 5, the convey operation of the paper sheet 1 is stopped by the registration shutter, and the paper feed rollers 4 and 4' are kept rotating while slipping on the paper sheet 1, and generating a conveyance torque. In this case, when a registration solenoid 6 is driven to release the registration shutter 5 upward, the paper sheet 1 is fed to convey rollers 7 and 7'. The driving of the registration shutter 5 is synchronized with an output timing of an image formed by focusing a laser beam 20 on a photosensitive drum 11. Note that reference numeral 21 denotes a photosensor for detecting whether or not the paper sheet 1 is present at the position of the registration shutter 5.

Reference numeral 52 denotes a rotary polygonal mirror, which is driven by a motor 53. A laser driver 50 drives a semiconductor laser 51 in correspondence with dot data sent from a character generator (not shown) for generating bit data.

Figure 4:
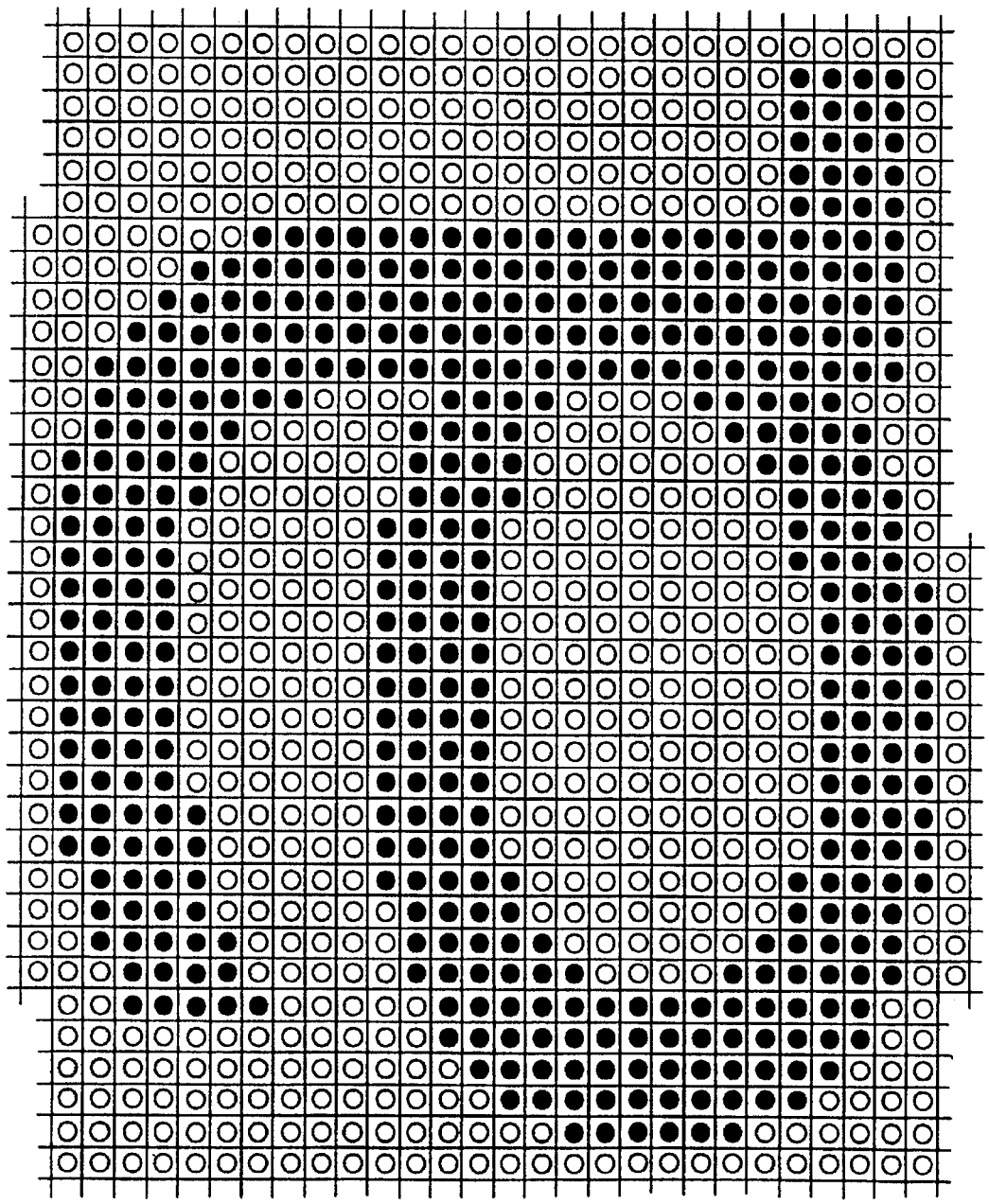
FIG. 4 is a view showing a pattern expressed by dot data in this embodiment.

The character generator (not shown) may generate katakana, hiragana, and kanji bit data as Japanese characters in addition to English letters shown in, e.g., FIG. 4.

The laser beam 20 from the semiconductor laser 51 driven by the laser driver 50 is scanned in the main scanning direction by the polygonal mirror 52. The laser beam 20 scanned in the main scanning direction by the polygonal mirror 52 is radiated on a reflection mirror 54 through an f-θ lens 56 arranged between the polygonal mirror 52 and the reflection mirror 54. The laser beam is reflected by the reflection mirror 54, and is guided onto the photosensitive drum 11. The laser beam is focused on the photosensitive drum 11 while being scanned in the main scanning direction, and forms a latent image on a main scanning line 57.

In this case, when a laser beam printer has a printing dot density of 300 dpi and a printing speed of 8 sheets/min (A4 or letter size), the laser ON time necessary for recording one dot is about 540 nsec (when one pixel is divided into three small pixels, the ON time for one small pixel is 180 nsec). When the laser beam printer has a printing dot density of 300 dpi and a printing speed of 16 sheets/min, the laser ON time necessary for recording one dot is about 270 nsec (when one pixel is divided into three small pixels, the ON time for one small pixel is 90 nsec). When the laser beam printer has a printing dot density of 300 dpi and a printing speed of 4 sheets/min, the laser ON time necessary for recording one dot is about 1,080 nsec (when one pixel is divided into three small pixels, the ON time for one small pixel is 360 nsec).

When the laser beam printer has a printing dot density of 600 dpi and a printing speed of 8 sheets/min, the laser ON time necessary for recording one dot is about 135 nsec (when one pixel is divided into three small pixels, the ON time for one small pixel is 45 nsec). When the laser beam printer has a printing dot density of 600 dpi and a printing speed of 16 sheets/min, the laser ON time necessary for recording one dot is about 68 nsec (when one pixel is divided into three small pixels, the ON time for one small pixel is 23 nsec). When the laser beam printer has a printing dot density of 600 dpi and a printing speed of 4 sheets/min, the laser ON time necessary for recording one dot is about 270 nsec (when one pixel is divided into three small pixels, the ON time for one small pixel is 90 nsec).

Furthermore, when the laser beam printer has a printing dot density of 240 dpi and a printing speed of 8 sheets/min, the laser ON time necessary for recording one dot is about 844 nsec (when one pixel is divided into three small pixels, the ON time for one small pixel is 280 nsec). When the laser beam printer has a printing dot density of 240 dpi and a printing speed of 16 sheets/min, the laser ON time necessary for recording one dot is about 422 nsec (when one pixel is divided into three small pixels, the ON time for one small pixel is 140 nsec). When the laser beam printer has a printing dot density of 240 dpi and a printing speed of 4 sheets/min, the laser ON time necessary for recording one dot is about 1,688 nsec (when one pixel is divided into three small pixels, the ON time for one small pixel is 560 nsec).

The laser ON times corresponding to the modulation pixel unit sizes shown in FIG. 53 is as follows:

<Laser ON time when the modulation pixel unit size is set to be ¼ the original pixel, as shown in FIG. 53-b>

When the printer has a printing dot density of 300 dpi and a printing speed of 8 sheets/min (A4 or letter size), the laser ON time necessary for recording one modulation pixel size is about 135 nsec.

When the printer has a printing dot density of 300 dpi and a printing speed of 16 sheets/min, the laser ON time necessary for recording one modulation pixel size is about 67.5 nsec.

When the printer has a printing dot density of 300 dpi and a printing speed of 4 sheets/min, the laser ON time necessary for recording one modulation pixel size is about 270 nsec.

When the printer has a printing dot density of 600 dpi and a printing speed of 8 sheets/min, the laser ON time necessary for recording one modulation pixel size is about 33.8 nsec.

When the printer has a printing dot density of 600 dpi and a printing speed of 16 sheets/min, the laser ON time necessary for recording one modulation pixel size is about 17.1 nsec.

When the printer has a printing dot density of 600 dpi and a printing speed of 4 sheets/min, the laser ON time necessary for recording one modulation pixel size is about 68 nsec.

When the printer has a printing dot density of 240 dpi and a printing speed of 8 sheets/min, the laser ON time necessary for recording one modulation pixel size is about 211 nsec.

When the printer has a printing dot density of 240 dpi and a printing speed of 16 sheets/min, the laser ON time necessary for recording one modulation pixel size is about 105 nsec.

When the printer has a printing dot density of 240 dpi and a printing speed of 4 sheets/min, the laser ON time necessary for recording one modulation pixel size is about 422 nsec.

<Laser ON time when the modulation pixel unit size is set to be ⅛ the original pixel, as shown in FIG. 53-c>

When the printer has a printing dot density of 300 dpi and a printing speed of 8 sheets/min (A4 or letter size), the laser ON time necessary for recording one modulation pixel size is about 67.5 nsec.

When the printer has a printing dot density of 300 dpi and a printing speed of 16 sheets/min, the laser ON time necessary for recording one modulation pixel size is about 33.8 nsec.

When the printer has a printing dot density of 300 dpi and a printing speed of 4 sheets/min, the laser ON time necessary for recording one modulation pixel size is about 135 nsec.

When the printer has a printing dot density of 600 dpi and a printing speed of 8 sheets/min, the laser ON time necessary for recording one modulation pixel size is about 16.9 nsec.

When the printer has a printing dot density of 600 dpi and a printing speed of 16 sheets/min, the laser ON time necessary for recording one modulation pixel size is about 8.5 nsec.

When the printer has a printing dot density of 600 dpi and a printing speed of 4 sheets/min, the laser ON time necessary for recording one modulation pixel size is about 33.8 nsec.

When the printer has a printing dot density of 240 dpi and a printing speed of 8 sheets/min, the laser ON time necessary for recording one modulation pixel size is about 105 nsec.

When the printer has a printing dot density of 240 dpi and a printing speed of 16 sheets/min, the laser ON time necessary for recording one modulation pixel size is about 52.8 nsec.

When the printer has a printing dot density of 240 dpi and a printing speed of 4 sheets/min, the laser ON time necessary for recording one modulation pixel size is about 211 nsec.

<Laser ON time when the modulation pixel unit size is set to be 1/16 the original pixel, as shown in FIG. 53-d>

When the printer has a printing dot density of 300 dpi and a printing speed of 8 sheets/min (A4 or letter size), the laser ON time necessary for recording one modulation pixel size is about 33.8 nsec.

When the printer has a printing dot density of 300 dpi and a printing speed of 16 sheets/min, the laser ON time necessary for recording one modulation pixel size is about 16.9 nsec.

When the printer has a printing dot density of 300 dpi and a printing speed of 4 sheets/min, the laser ON time necessary for recording one modulation pixel size is about 67.6 nsec.

When the printer has a printing dot density of 600 dpi and a printing speed of 8 sheets/min, the laser ON time necessary for recording one modulation pixel size is about 8.5 nsec.

When the printer has a printing dot density of 600 dpi and a printing speed of 16 sheets/min, the laser ON time necessary for recording one modulation pixel size is about 4.3 nsec.

When the printer has a printing dot density of 600 dpi and a printing speed of 4 sheets/min, the laser ON time necessary for recording one modulation pixel size is about 17 nsec.

When the printer has a printing dot density of 240 dpi and a printing speed of 8 sheets/min, the laser ON time necessary for recording one modulation pixel size is about 52.8 nsec.

When the printer has a printing dot density of 240 dpi and a printing speed of 16 sheets/min, the laser ON time necessary for recording one modulation pixel size is about 26.4 nsec.

When the printer has a printing dot density of 240 dpi and a printing speed of 4 sheets/min, the laser ON time necessary for recording one modulation pixel size is about 105 nsec.

According to the current techniques, the driving performance of the laser driver 50 used in a laser beam printer of this type is limited to the shortest pulse ON time of about 4 nsec (turn-on rise time=about 1 nsec, turn-off fall time= about 1 nsec). Therefore, even if it is attempted to turn on the laser for a time shorter than this shortest time, it cannot be turned on, or the ON time and the ON light amount are unstable if the laser is turned on.

Therefore, the ON pulse width of a laser modulated for smoothing processing has the shortest ON time of about 4 nsec or longer.

A beam detector 55 arranged at the scanning start position of the laser beam 20 detects the laser beam 20 to detect a BD signal as a sync signal for determining an image write timing in the main scanning direction.

Thereafter, the paper sheet 1 obtains a convey torque by the convey rollers 7 and 7' in place of the paper feed rollers 4 and 4', and is fed to the photosensitive drum 11. The surface of the photosensitive drum 11, charged by a charger 13, is exposed by the laser beam 20, thus forming a latent image thereon. The latent image corresponding to a portion exposed by the laser beam is visualized as a toner image by a developing unit 14, and thereafter, the toner image is transferred onto the surface of the paper sheet 1 by a transfer charger 15. Reference numeral 12 denotes a cleaner for cleaning the drum surface after the toner image is transferred onto the paper sheet 1.

The toner image transferred onto the paper sheet 1 is fixed by fixing rollers 8 and 8'. Thereafter, the paper sheet 1 is exhausted onto an exhaust tray 10 by exhaust rollers 9 and 9'.

Reference numeral 16 denotes a paper feed table, which allows a manual feedings of paper sheets one by one therefrom in addition to paper feeding from the paper cassette 2. A paper sheet manually fed to a manual feed roller 17 on the paper feed table 16 is gently pressed by the manual feed roller 17, and is conveyed until its leading end reaches the registration shutter 5 in the same manner as if fed by the paper feed rollers 4 and 4'. When the paper sheet reaches the registration shutter 5, the manual feed roller 17 is pivoted while being in slip contact with the paper sheet. The following conveyance sequence is the same as that in a case wherein a paper sheet is fed from the cassette.

Note that the fixing roller 8 incorporates a fixing heater 24. The surface temperature of the fixing roller 8 is controlled at a predetermined temperature on the basis of a temperature detected by a thermistor 23, which is in slip contact with the surface of the fixing roller 8, thereby fixing the toner image on the paper sheet 1. Reference numeral 22 denotes a photosensor for detecting whether or not a paper sheet is present at the position of the fixing rollers 8 and 8'.

The printer described above is connected to a controller through an interface means, and performs a print sequence upon reception of a print command and an image signal from the controller. Signals exchanged through the interface means will be briefly described below.

Figure 3:
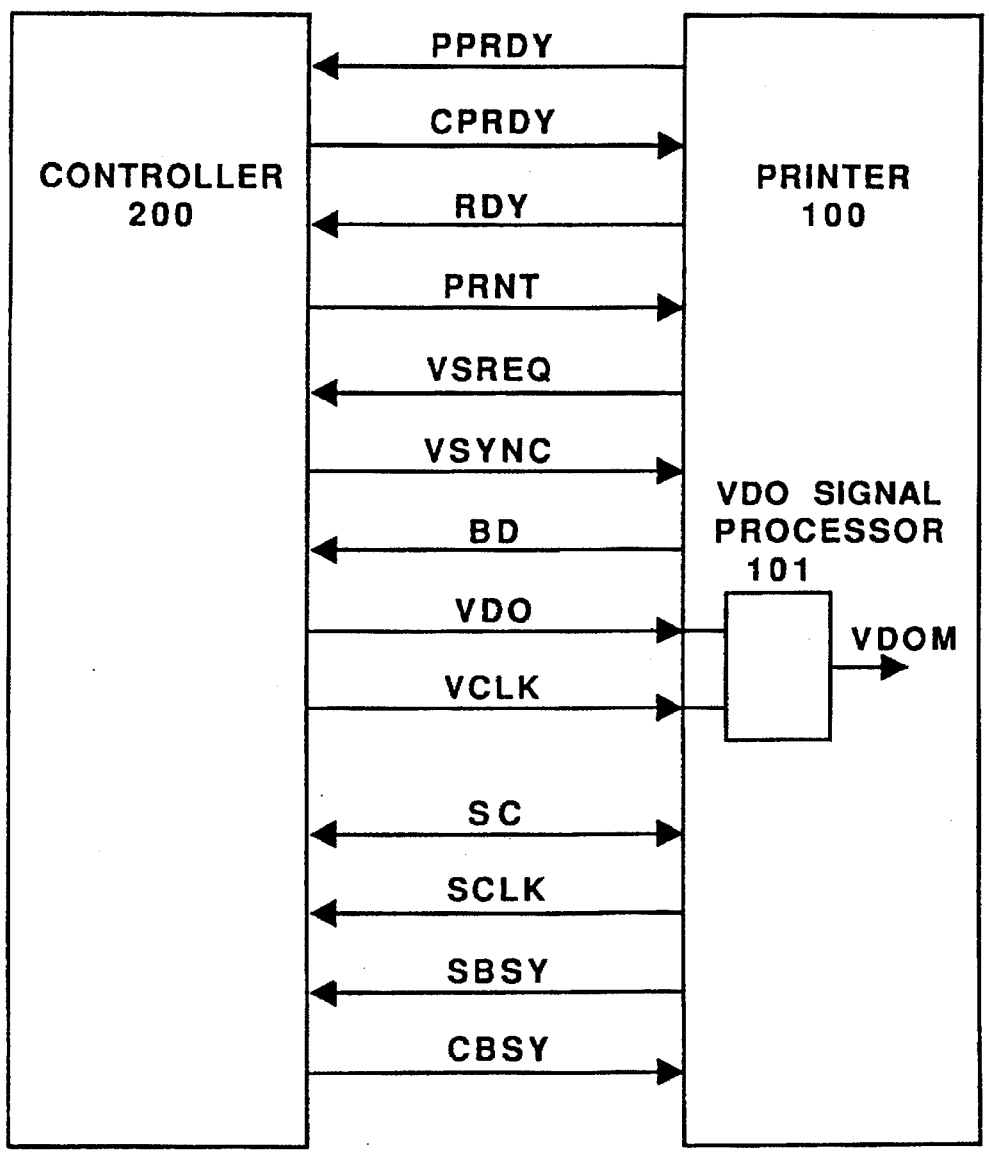
FIG. 3 is a diagram showing interface signals between a printer engine and a controller of this embodiment.

FIG. 3 is a diagram showing interface signals between the printer engine and a controller for generating image data. The interface signals shown in FIG. 3 will be described below.

A PPRDY signal is sent from a printer 100 to a controller 200, and informs that the power switch of the printer 100 is turned on, and the printer is set in an operation ready state.

A CPRDY signal is sent from the controller 200 to the printer 100, and informs that the power switch of the controller 200 is turned on, and the controller 200 is set in an operation ready state.

An RDY signal is sent from the printer 100 to the controller 200, and indicates a state wherein the printer 100 can start or continue a printing operation any time when it receives a PRNT signal (to be described later).

When execution of the printing operation is disabled (e.g., when paper sheets in the paper cassette 2 are used up), the RDY signal goes to "0" level.

A PRNT signal is sent from the controller 200 to the printer 100, and instructs the start or continuation of a printing operation. The printer 100 starts a printing operation upon reception of the PRNT signal.

A VSREQ signal is sent from the printer 100 to the controller 200, and is output after the PRNT signal output as the printing operation start instruction from the controller 200 goes to "1" level when the RDY signal sent from the printer 100 is at "1" level. The VSREQ signal indicates that the printer 100 is ready to receive image data. In this state, a VSYNC signal (to be described later) can be received.

A VSYNC signal is sent from the controller 200 to the printer 100, and is used for establishing synchronization of an output timing of image data in the subscanning direction. A toner image formed on the drum 11 is transferred onto a paper sheet while establishing synchronization in the sub-scanning direction in synchronism with the VSYNC signal.

A BD signal is sent from the printer 100 to the controller 200, and is used for establishing synchronization of an output timing of image data in the main scanning direction.

A toner image formed on the drum 11 is transferred onto a paper sheet while establishing synchronization in the main scanning direction in synchronism with the BD signal. The BD signal indicates that a scanning laser beam is located at a start point of the main scanning operation.

A VDO signal is sent from the controller 200 to the printer 100, and is used for transmitting image data to be printed. The VDO signal is output in synchronism with a VCLK signal (to be described later).

The controller 200 receives code data such as PCL codes transmitted from a host apparatus, and causes an internal character generator to generate character bit signals corresponding to the received code data. The controller 200 also receives vector codes such as postscript codes, and generates figure bit data according to the codes. In addition, the controller 200 generates bit image data read from an image scanner, and transmits the data as the VDO signal to the printer 100.

When the VDO signal is "1", the printer 100 prints out a black image; when it is "0", the printer prints out a white image.

A VCLK signal is sent from the controller 200 to the printer 100, and is a sync signal used upon transmission/reception of the VDO signal.

An SC signal is a bidirectional serial signal for bidirectionally transmitting and receiving a "command" as a signal sent from the controller 200 to the printer 100, and "status" as a signal sent from the printer 100 to the controller 200. An SBSY signal and a CBSY signal (to be described later) are used as sync signals upon transmission or reception of the SC signal.

The "command" is an 8-bit serial signal, and is, e.g., instruction information for instructing, to the controller 200 from the printer 100, whether the paper feed mode is a mode for feeding paper sheets from the cassette or a mode for feeding paper sheets from a manual port.

The "status" is an 8-bit serial signal, and is, e.g., information for informing, from the printer 100 to the controller 200, various states of the printer such as a wait state wherein the temperature of a fixing device in the printer 100 has not reached a printing enable temperature yet, a paper jam state, a state wherein the paper cassette has no paper sheets, and the like.

An SCLK signal is a sync pulse signal used when the printer 100 fetches the "command" or when the controller 200 fetches the "status".

A CSBY signal is a signal used by the controller 200 to occupy the SC signal and the SCLK signal prior to transmission of the "command".

An SBSY signal is a signal used by the printer 100 to occupy the SC signal and the SCLK signal prior to transmission of the "status".

After the VDO signal is input to the printer 100 together with the VCLK signal, the VDO signal is input to a VDO signal processor 101, arranged in the printer 100, for performing signal processing of this embodiment. The VDO signal processor performs signal conversion of the input VDO signal by signal processing (to be described later), and inputs the VDO signal as a converted signal VDOM to a laser driver (not shown), thereby turning on/off the semiconductor laser 51.

The operation of the interface will be described below.

When the power switch of the printer 100 is turned on, and the power switch of the controller 200 is turned on, the printer 100 initializes its internal states, and sets the PPRDY signal to be output to the controller 200 to be "1".

The controller 200 similarly initializes its internal states, and sets the CPRDY signal to be output to the printer 100 to be "1". Thus, the printer 100 and the controller 200 confirm each other's states that their power switches are turned on.

Thereafter, the printer 100 energizes the fixing heater 24 incorporated in the fixing rollers 8 and 8', and when the surface temperature of the fixing roller reaches a fixing temperature, the printer 100 sets the RDY signal to be "1".

After the controller 200 confirms that the RDY signal is "1", if there is data to be printed, the controller 200 sets the PRNT signal to be output to the printer 100 to be "1". When the printer 100 confirms that the PRNT signal is "1", it rotates the photosensitive drum 11 to uniformly initialize the potential on the surface of the photosensitive drum. At the same time, in a cassette paper feed mode, the printer 100 drives the paper feed cam 3 to start a paper feed operation of paper sheets, and conveys the leading end portion of a paper sheet to the position of the registration shutter 5. On the other hand, in a manual feed mode, the printer 100 conveys a paper sheet manually inserted from the paper feed table 16 by the manual feed roller 17 to the position of the registration shutter 5.

Thereafter, when the printer 100 is ready to receive the VDO signals, it sets the VSREQ signal to be "1". After the controller 200 confirms that the VSREQ signal is "1", it sets the VSYNC signal to be "1", and at the same time, sequentially sends the VDO signals in synchronism with the BD signal. When the printer confirms that the VSYNC signal goes to "1", it drives the registration solenoid 6 in synchronism with the VSYNC signal, thereby releasing the registration shutter 5. Thus, the paper sheet 1 is conveyed to the photosensitive drum 11.

According to the VDO signals, the printer 100 turns on the laser beam when an image is to be printed in black, and turns off the laser beam when an image is to be printed in white, thereby forming a latent image on the photosensitive drum 11. Upon rotation of the photosensitive drum 11, the latent image forming portion is moved, and reaches the developing unit 14. The developing unit 14 applies a toner on the latent image, thus forming a toner image on the photosensitive drum 11. The toner image portion on the photosensitive drum 11 is then fed to the position of the transfer charger 15, and the toner image on the drum 11 is transferred onto the paper sheet 1. The paper sheet on which the toner image is transferred is conveyed to the fixing rollers 8 and 8', and the toner image is fixed by the fixing rollers 8 and 8'. Thereafter, the paper sheet is exhausted onto the exhaust tray.

Figure 8:
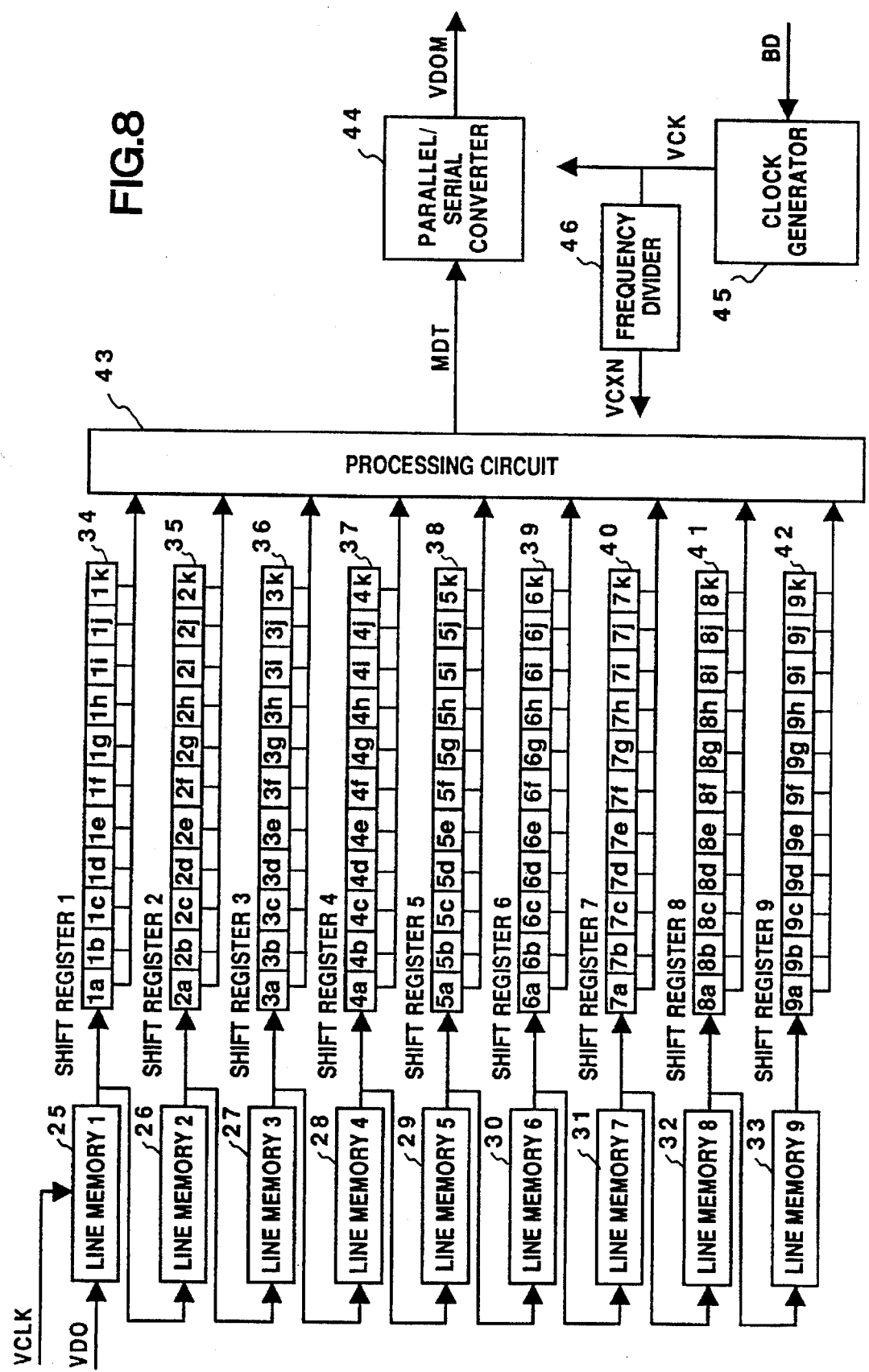
FIG. 8 is a block diagram showing functional blocks according to the first embodiment of the present invention.
Figure 9A:
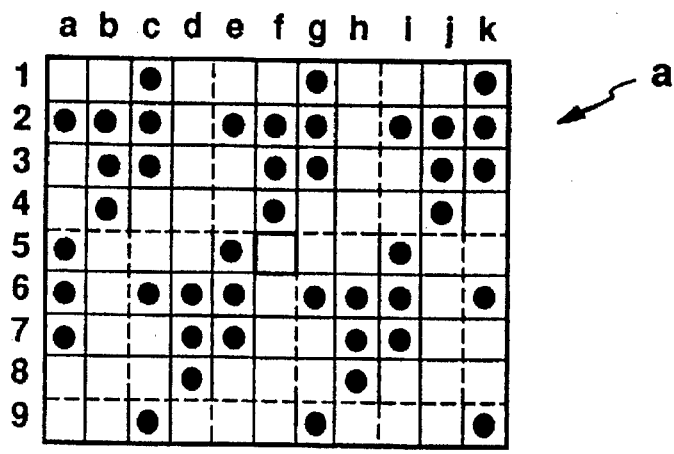
FIG. 9 is a view for explaining the drawbacks of the prior art.
Figure 9B:
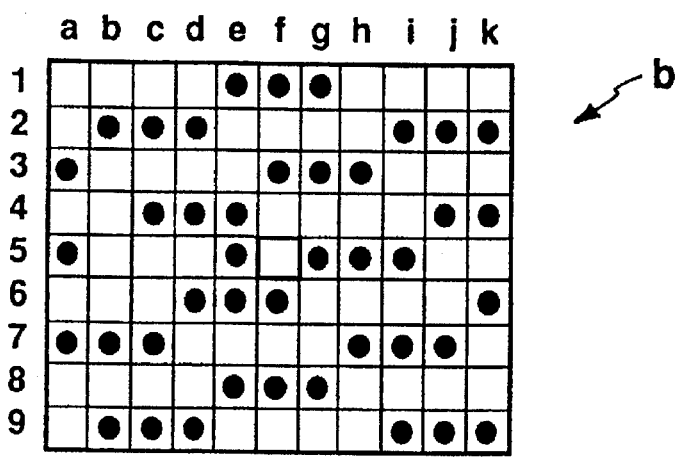
Figure 9C:
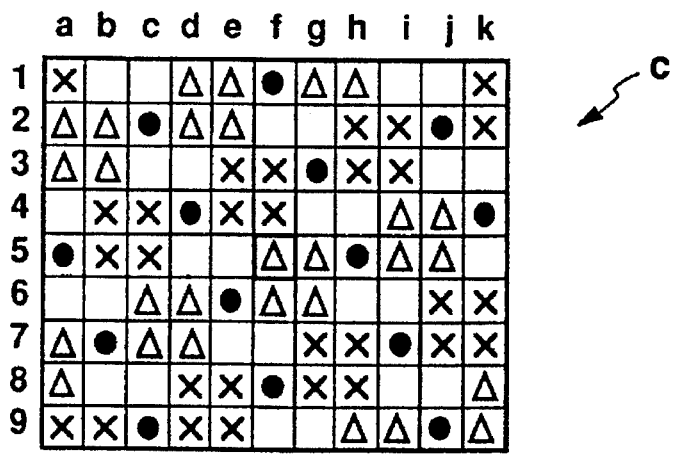

FIG. 8 is a block diagram of the VDO signal processor 101 for performing smoothing processing, which is arranged in an input unit of the printer engine according to the first embodiment of the present invention, applied to a laser beam printer having a printing dot density of 300 dpi.

Figure 5:
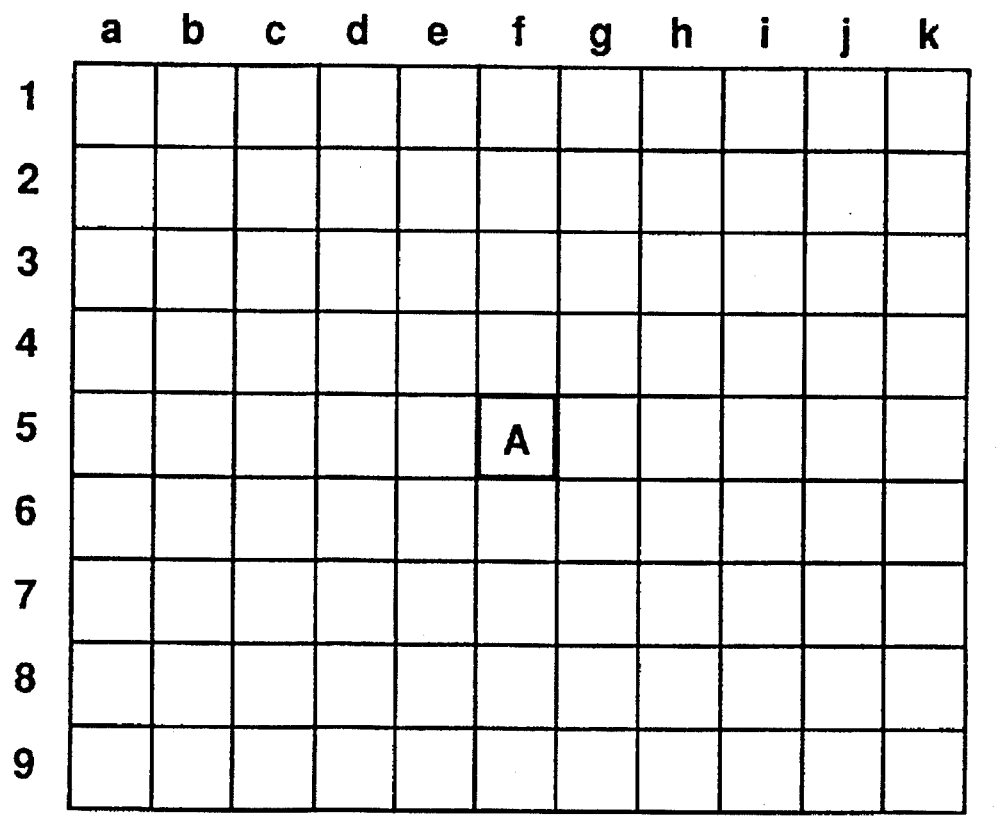

In the first embodiment shown in FIG. 8, as shown in FIG. 5, the feature of pixel data in a surrounding region (11 pixels in the main scanning direction×9 pixels in the subscanning direction) surrounding a pixel A to be printed (to be referred to as a "pixel of interest" hereinafter) is checked with respect to the pixel of interest, and the pixel of interest is changed according to the checking result.

Figure 6:
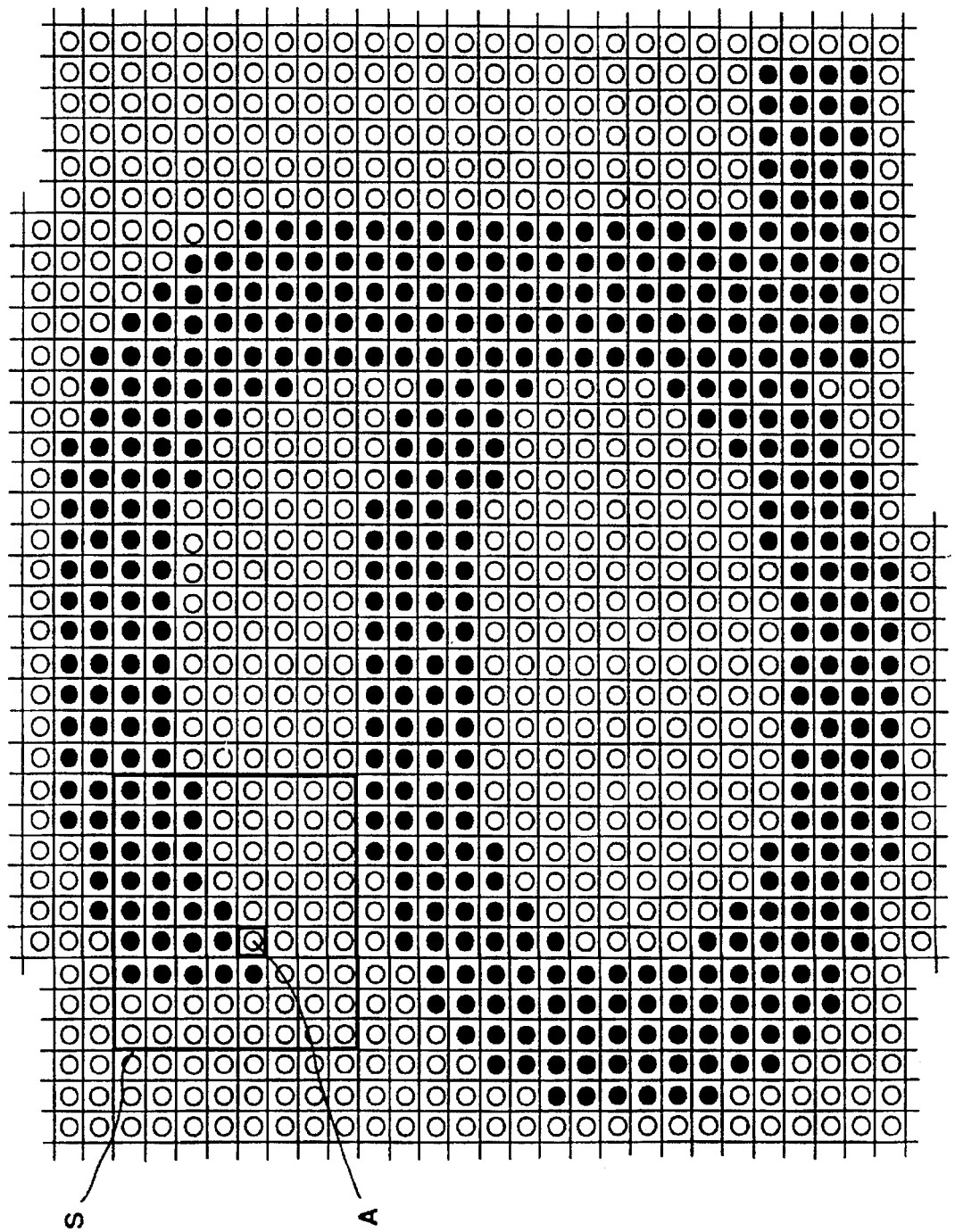
FIG. 6 is a view showing a state wherein image data is stored from the dot pattern shown in FIG. 4 in the matrix memory.
Figure 7:
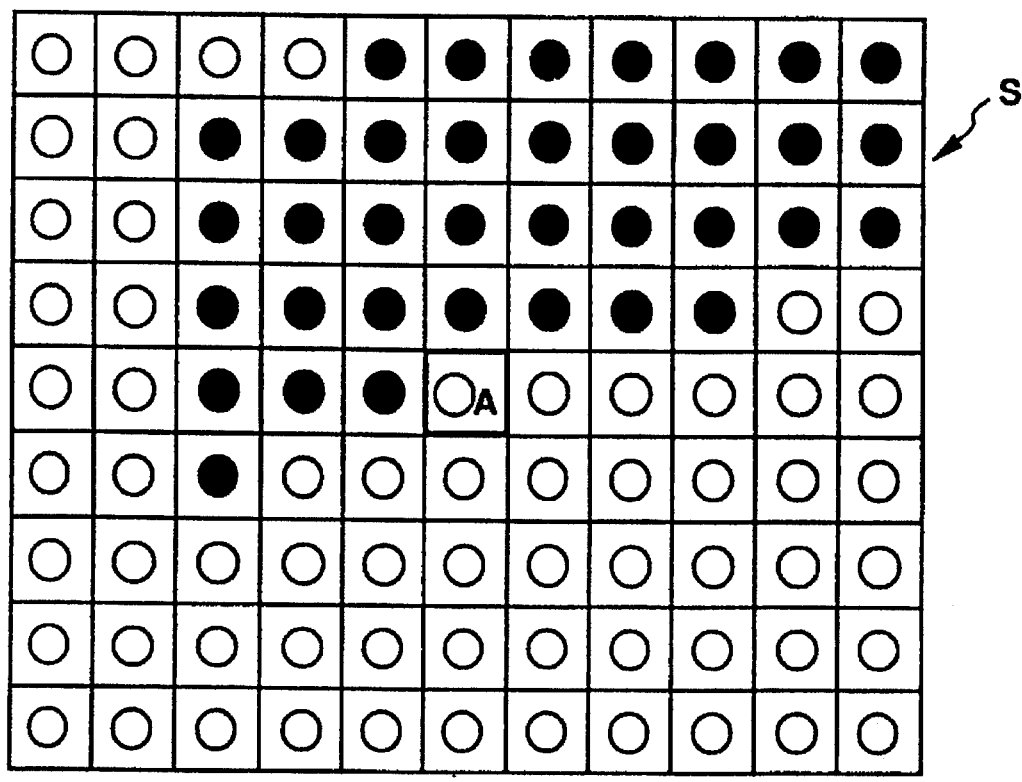
FIG. 7 is a view showing a state wherein image data is stored from the dot pattern shown in FIG. 4 in the matrix memory.

More specifically, when, for example, a pixel of interest A of dot data of an English letter "a" at a resolution of 300 dpi shown in FIG. 6 is to be printed, dot data in a region S (11 pixels in the main scanning direction×9 pixels in the subscanning direction=99 pixels) surrounding the pixel of interest A are stored in a temporary storage means. Thus, the dot data shown in FIG. 7 are stored. Thereafter, the feature of the dot data group in the region S are checked, the data of the pixel of interest A to be printed is changed according to the feature, and the changed pixel is printed. In this case, the data of the pixel of interest is changed to data, so that the edge portion of a figure constituted by a dot group can be smoothly printed.

Figure 10:
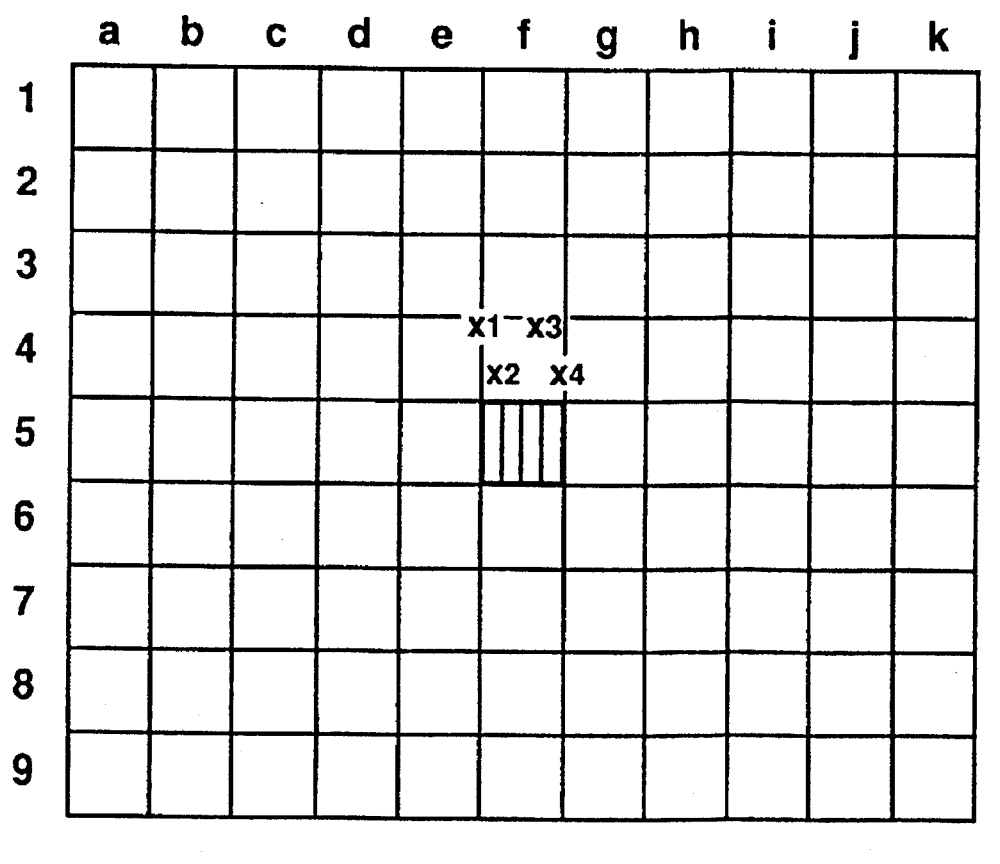

In this embodiment, as shown in FIG. 10, the pixel of interest A is constituted by four small pixel sections (x1, x2, x3, and x4) divided in the main scanning direction. Therefore, the pixel of interest can be equivalently printed at a printing dot density of 1,200 dpi in the main scanning direction×300 dpi in the subscanning direction.

In FIG. 8, reference numerals 25 to 33 denote line memories 1 to 9. The line memories 25 to 33 store dot data having a main scanning length in correspondence with a page to be printed. More specifically, the line memories store input image signals VDO while sequentially shifting them in synchronism with the clock signal VCLK.

The line memories 25 to 33 are coupled in the order of the line memory 1 (25), the line memory 2 (26), the line memory 3 (27), ..., the line memory 9 (33), and store dot data having a main scanning length for 9 lines with respect to the subscanning direction.

Reference numerals 34 to 42 denote shift registers 1 to 9. The shift registers 1 to 9 (34 to 42) respectively correspond to the line memories 1 to 9 (25 to 33), and receive outputs from the corresponding line memories (25 to 33). Each of the shift registers (34 to 42) has an 11-bit arrangement. As shown in FIG. 8, the shift registers constitute a dot-matrix memory (1a to 1k, 2a to 2k, 3a to 3k, ..., 9a to 9k, i.e., 11 dots in the main scanning direction×9 lines in the subscanning direction). Of the matrix memory, a dot 5f at the central portion is defined as a dot of interest.

Reference numeral 43 denotes a processing circuit for detecting the feature of data stored in the dot-matrix memory for smoothing, and changing the pixel of interest 5f as needed. The processing circuit 43 receives the bits (1a to 9k, i.e., a total of 99 bits) from the shift registers 1 to 9, and outputs a parallel signal MDT corresponding to the changed pixel.

The parallel signal MDT is input to a parallel/serial converter 44. The parallel/serial converter 44 converts the input parallel signal MDT into a serial signal VDOM, and causes a laser driver (not shown) to drive the laser 51. In this embodiment, the parallel signal consists of 4 bits (X1, X2, X3, and X4).

Similarly, processing for one main scanning line is sequentially performed.

Reference numeral 45 denotes a clock generator for receiving the BD signal as a main scanning sync signal, and generates a clock signal VCK as a clock signal synchronized with the BD signal. The clock signal VCK has a frequency four times a clock frequency $f_0$ necessary for performing recording at 300 dpi in the main scanning direction. The serial signals VDOM are sequentially output in synchronism with the clock signal VCK from the clock generator 45. Reference numeral 46 denotes a frequency divider for receiving the clock signal VCK, and dividing it with 4 to generate a clock signal VCKN having the frequency $f_0$. The clock signal VCKN is used as a sync clock when the processing circuit 43 fetches dot data from the dot-matrix memory.

In FIG. 8, when image signals VDO at 300 dpi are transmitted from the controller 200 to the printer 100 in synchronism with the image clock signal VCLK, received image dot data are sequentially stored in the line memories 1 to 9 (25 to 33). At the same time, of the dot data stored in the line memories 1 to 9 (25 to 33), dot-matrix data of 11 dots in the main scanning direction×9 dots in the subscanning direction are extracted to the shift registers 1 to 9 (34 to 42).

Thereafter, the processing circuit 43 detects the feature of the dot matrix data extracted to the shift registers 1 to 9 (34 to 42), and generates changed data consisting of four data X1 to X4 obtained by equally dividing the pixel of interest into four sections in the main scanning direction according to the detected feature. The processing circuit 43 then prints the changed data.

Figures 11A, 11B:
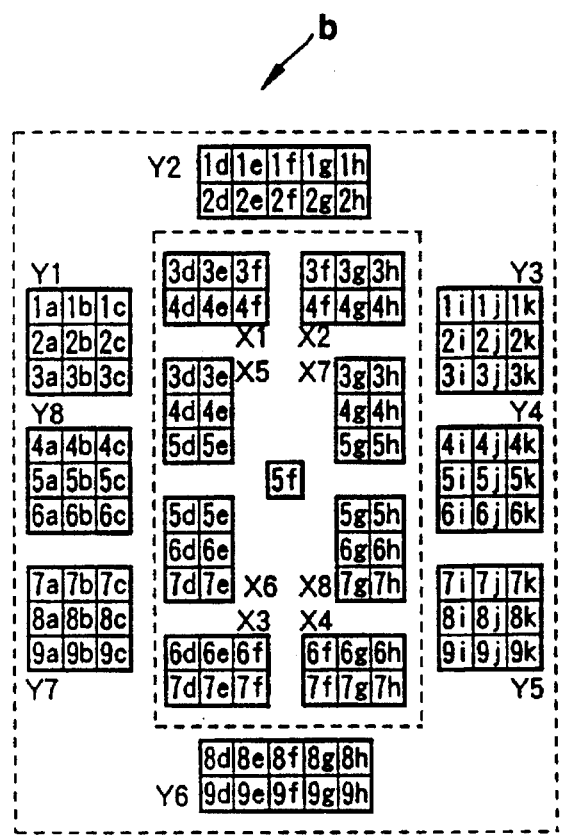
FIG. 11 is a view for explaining a feature extraction algorithm of data applied to the first embodiment.
Figure 12:
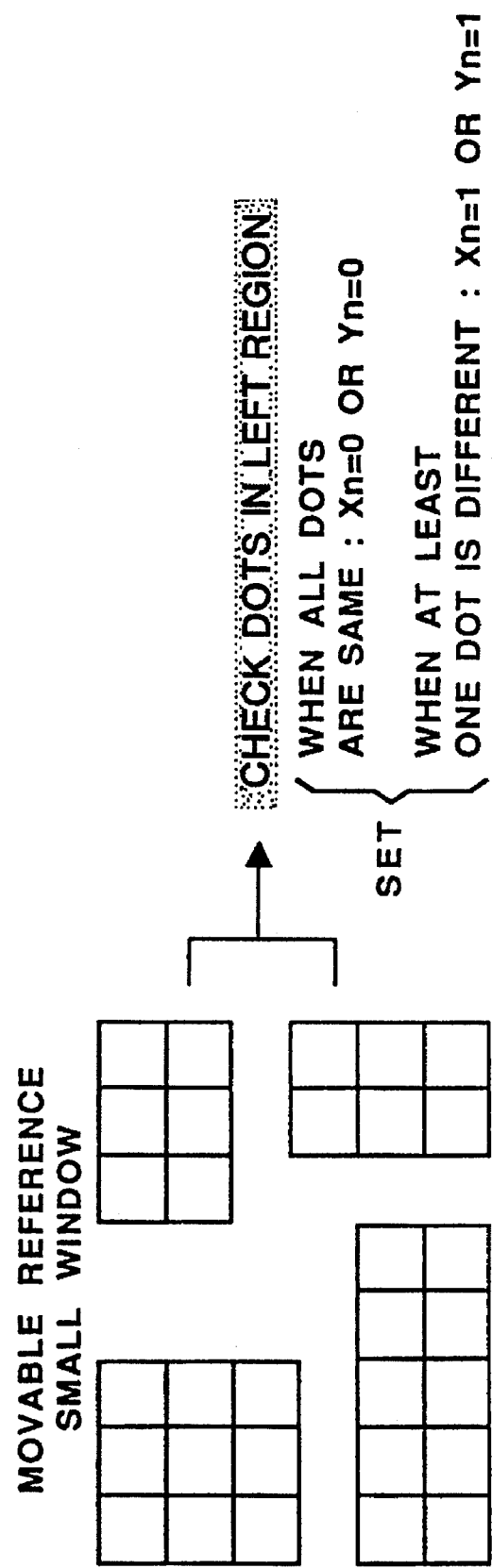
FIG. 12 is a view for explaining the feature extraction algorithm of data applied to the first embodiment.

FIGS. 11 and 12 are views for explaining an algorithm of the processing circuit 43 for extracting the feature of a dot pattern from the entire matrix region of 11 dots in the main scanning direction×9 dots in the subscanning direction, and checking if the dot matrix is one to be subjected to smoothing.

The processing algorithm of the processing circuit 43 will be described below with reference to FIGS. 11 and 12.

FIG. 11-a shows a reference region of 11 dots in the main scanning direction×9 dots in the subscanning direction. In FIG. 11-a, 99 pixels are expressed by a matrix of a, b, c, d, e, f, g, h, i, j, and k in the main scanning direction, and 1, 2, 3, 4, 5, 6, 7, 8, and 9 in the sub-scanning direction. For example, a pixel of interest is expressed by 5f.

The central pixel is selected as a pixel to be changed for smoothing.

FIG. 11-b shows a state wherein the reference region shown in FIG. 11-a is divided into 17 regions X1 to X8, Y1 to Y8, and 5f.

Each of the regions X1 to X8 consists of 6 dots, i.e., the region X1 consists of dots 3d, 3e, 3f, 4d, 4d, and 4f; the region X2 consists of dots 3f, 3g, 3h, 4f, 4g, and 4h; the region X3 consists of dots 6d, 6e, 6f, 7d, 7e, and 7f; the region X4 consists of dots 6f, 6g, 6h, 7f, 7g, and 7h; the region X5 consists of dots 3d, 3e, 4d, 4e, 5d, and 5e; the region X6 consists of dots 5d, 5e, 6d, 6e, 7d, and 7e; the region X7 consists of dots 3g, 3h, 4g, 4h, 5g, and 5h; and the region X8 consists of dots 5g, 5h, 6g, 6h, 7g, and 7h.

Each of the regions Y1 to Y8 except the regions Y2 and Y6 consists of 9 dots, i.e., the region Y1 consists of dots 1a, 1b, 1c, 2a, 2b, 2c, 3a, 3b, and 3c; the region Y3 consists of dots 1i, 1j, 1k, 2i, 2j, 2k, 3i, 3j, and 3k; the region Y4 consists of dots 4i, 4j, 4k, 5i, 5j, 5k, 6i, 6j, and 6k; the region Y5 consists of dots 7i, 7j, 7k, 8i, 8j, 8k, 9i, 9j, and 9k; the region Y7 consists of dots 7a, 7b, 7c, 8a, 8b, 8c, 9a, 9b, and 9c; and the region Y8 consists of dots 4a, 4b, 4c, 5a, 5b, 5c, 6a, 6b, and 6c.

Each of the regions Y2 and Y6 consists of 10 dots, i.e., the region Y2 consists of dots 1d, 1e, 1f, 1g, 1h, 2d, 2e, 2f, 2g, and 2h; and the region Y6 consists of dots 8d, 8e, 8f, 8g, 8h, 9d, 9e, 9f, 9g, and 9h.

In this manner, the reference region can be divided into eight 6-dot regions (X1 to X8), six 9-dot regions (Y1, Y3, Y4, Y5, Y7, and Y8), and two 10-dot regions (Y2 and Y6).

The feature of each region is assumed to be expressed by Xn and Yn.

If all the dots in each region are the same (all the pixels are O <white pixels> or all the pixels are ● <black pixels>), the feature (Xn, Yn) of each region is assumed to be "0". If dots in each region are different from each other (O <white pixels> and ● <black pixels> are mixed), the feature of each region is assumed to be "1".

For example, if all the dots in the region X1 are dots, the feature of the region X1 is X1="0"; if dots in the region X1 include both O and ● dots, the feature of the region X1 is X1="1".

Figure 13:
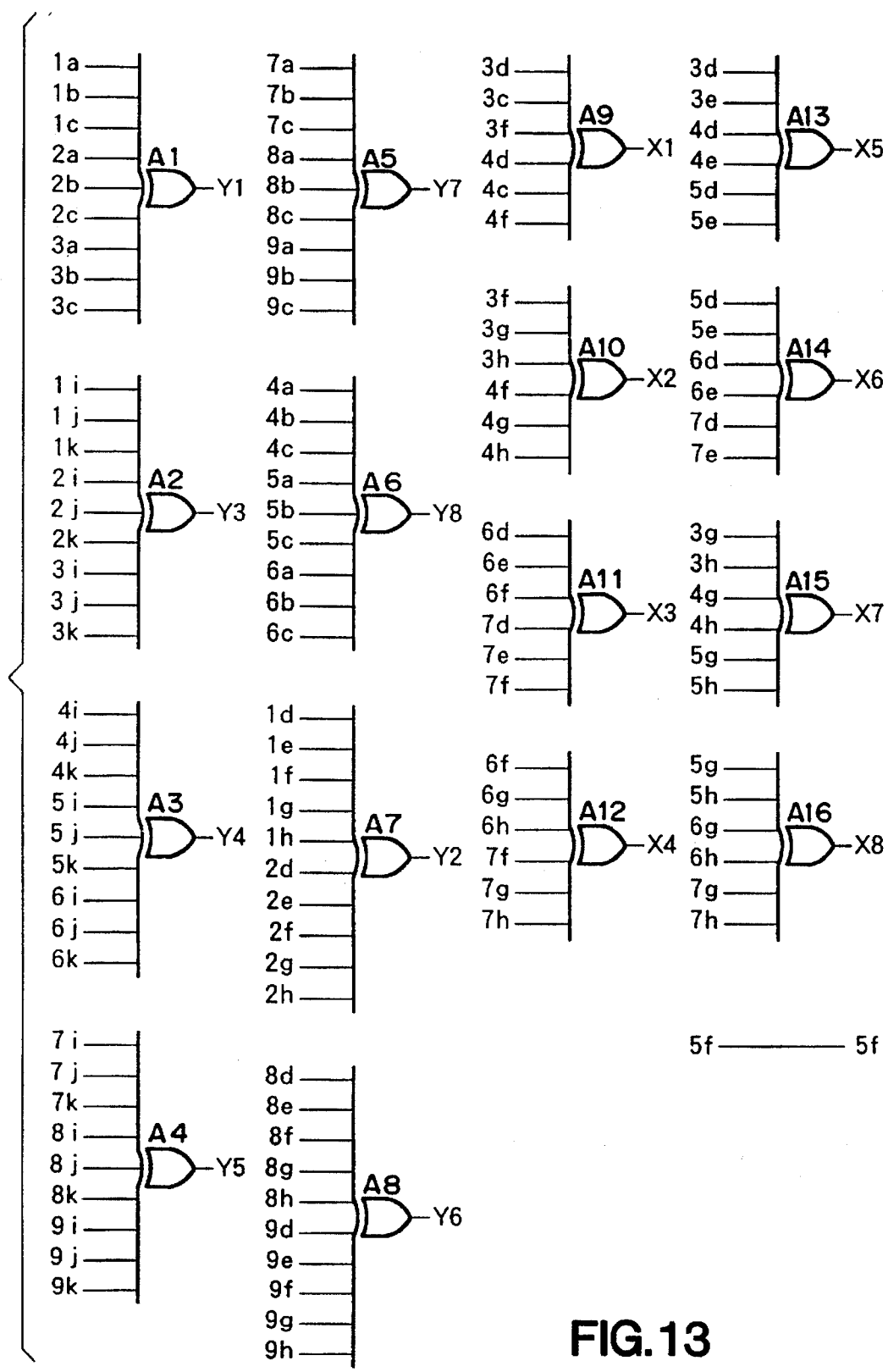
FIG. 13 is a diagram showing a circuit of a feature extraction unit of the first embodiment.

The feature of each region is detected by a circuit shown in FIG. 13. In FIG. 13, reference symbols A1 to A16 denote EX-OR gates. Each of the EX-OR gates A1 to A16 EX-ORs all the pixel signals in the corresponding region (X1 to X8, Y1 to Y8) (if all the input signals are the same, the gate outputs "0"; if the input signals are different from each other, it outputs "1").

In this manner, the features X1 to X8 and Y1 to Y8 of the respective regions are obtained.

Figure 14:
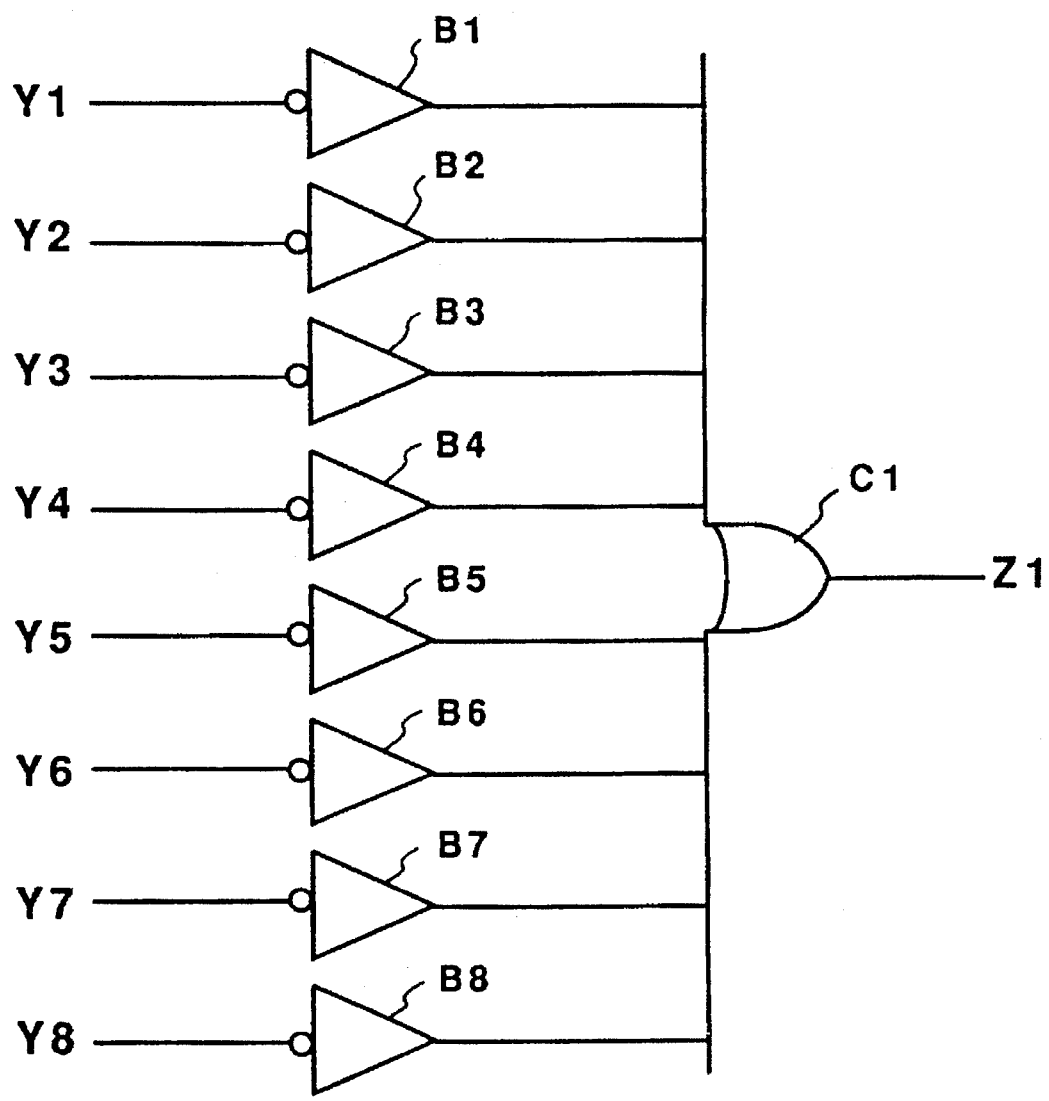
FIG. 14 is a diagram showing the circuit of the feature extraction unit of the first embodiment.

A circuit shown in FIG. 14 detects whether or not at least one feature Yn of the regions Y1 to Y8 is "0". In FIG. 14, reference symbols B1 to B8 denote inverters; and C1, an OR gate.

The feature signals Y1 to Y8 from the respective regions are logically inverted by the inverters B1 to B8, and the inverted signals are input to the OR gate C1. Thus, an output Z1 from the OR gate C1 goes to "1" when at least one of the signals Y1 to Y8 is "0".

A further detailed supplementary explanation will be given below.

Figure 48:
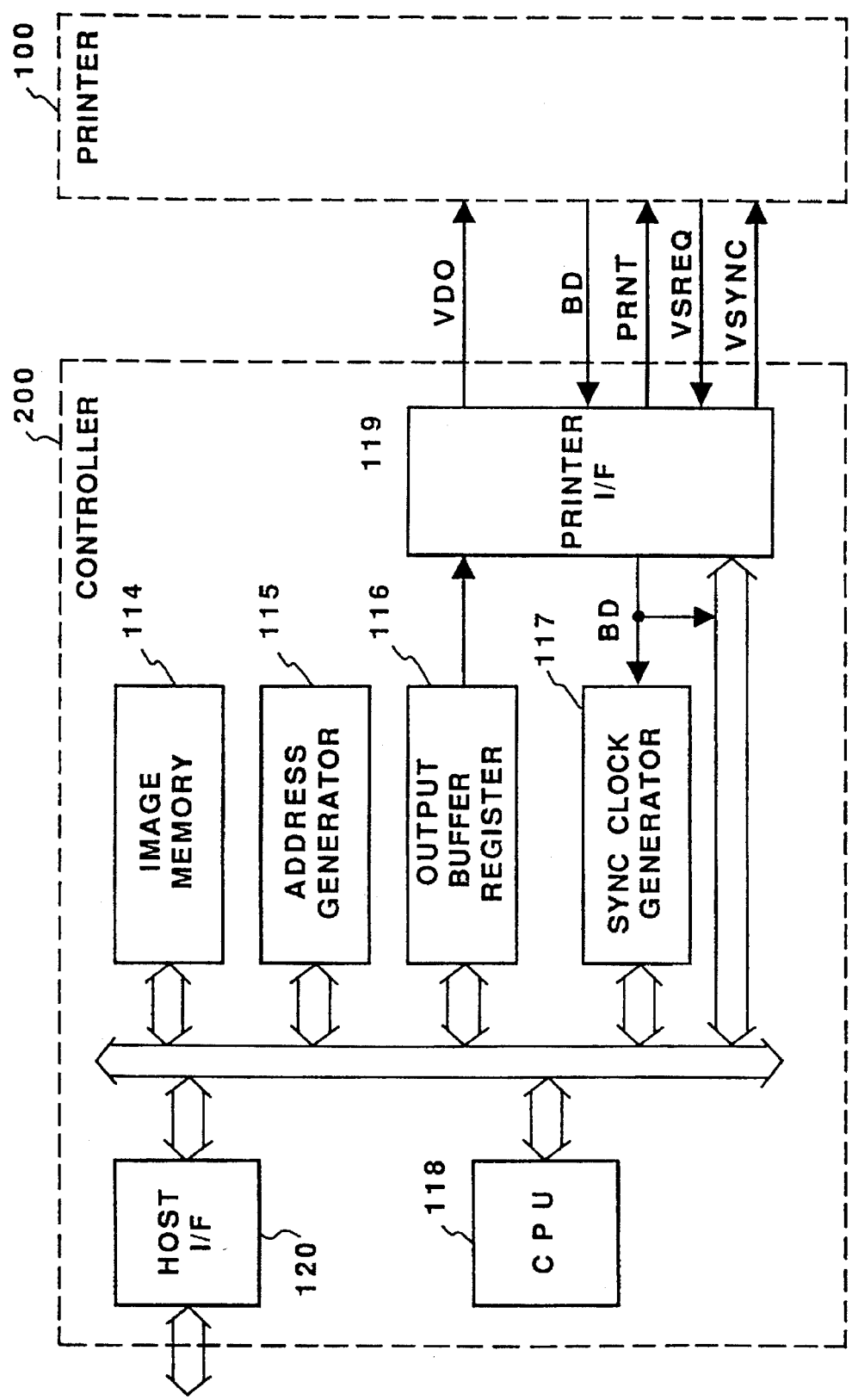
FIG. 48 is a diagram showing the flow of a printing operation in a controller of this embodiment.

The printing operation process in the controller 200 will be described below with reference to FIG. 48 showing in detail the arrangement of the controller 200.

In FIG. 48, reference numeral 114 denotes an image memory for storing bit map data (image data) for one page; 115, an address generator for generating addresses for the image memory 114; 116, an output buffer register for converting image data read out from the image memory 114 into image signals VDO; 117, a sync clock generator for generating the image clock signal VCLK synchronized with the above-mentioned BD signal as the horizontal sync signal; 118, a CPU for controlling the overall controller; 119, a printer interface as an I/O unit with the printer engine 100; and 120, a host computer interface as a signal I/O unit with an external host apparatus such as a personal computer.

In the above arrangement, an operation performed when the image signals VDO are sent to the printer engine will be described below.

When image data for one page are prepared in the image memory 114, the controller 200 outputs the print request signal PRNT to the printer 100. Upon reception of the PRNT signal, the printer 100 starts a printing operation. When the printer 100 is ready to accept the vertical sync signal VSYNC, and to perform the printing operation, it sends the VSREQ signal to the controller 200.

Upon reception of the VSREQ signal, the controller 200 outputs the vertical sync signal VSYNC to the printer 100, and counts a predetermined period of time from the VSYNC signal to perform the printing operation from a predetermined position in the subscanning direction. Upon completion of the count operation of the predetermined period of time, the address generator 115 sequentially generates addresses from the start address of image data stored in the image memory 114 so as to read out image data. The readout image data are input to the output buffer register 116 in units of main scanning lines. The output buffer register 116 counts a predetermined number of pulses of the image clock signal VCLK after the BD signal is input in units of printing lines, so that the printing operation can be performed from a predetermined position in the main scanning direction, and thereafter, outputs data for each printing line as image signals VDO synchronized with the VCLK signal to the printer 100. The printer 100 performs the above-mentioned image forming operation.

The above-mentioned operation is performed in units of printing pages, thus always performing the printing operation at the same positions on paper sheets.

Figure 49:
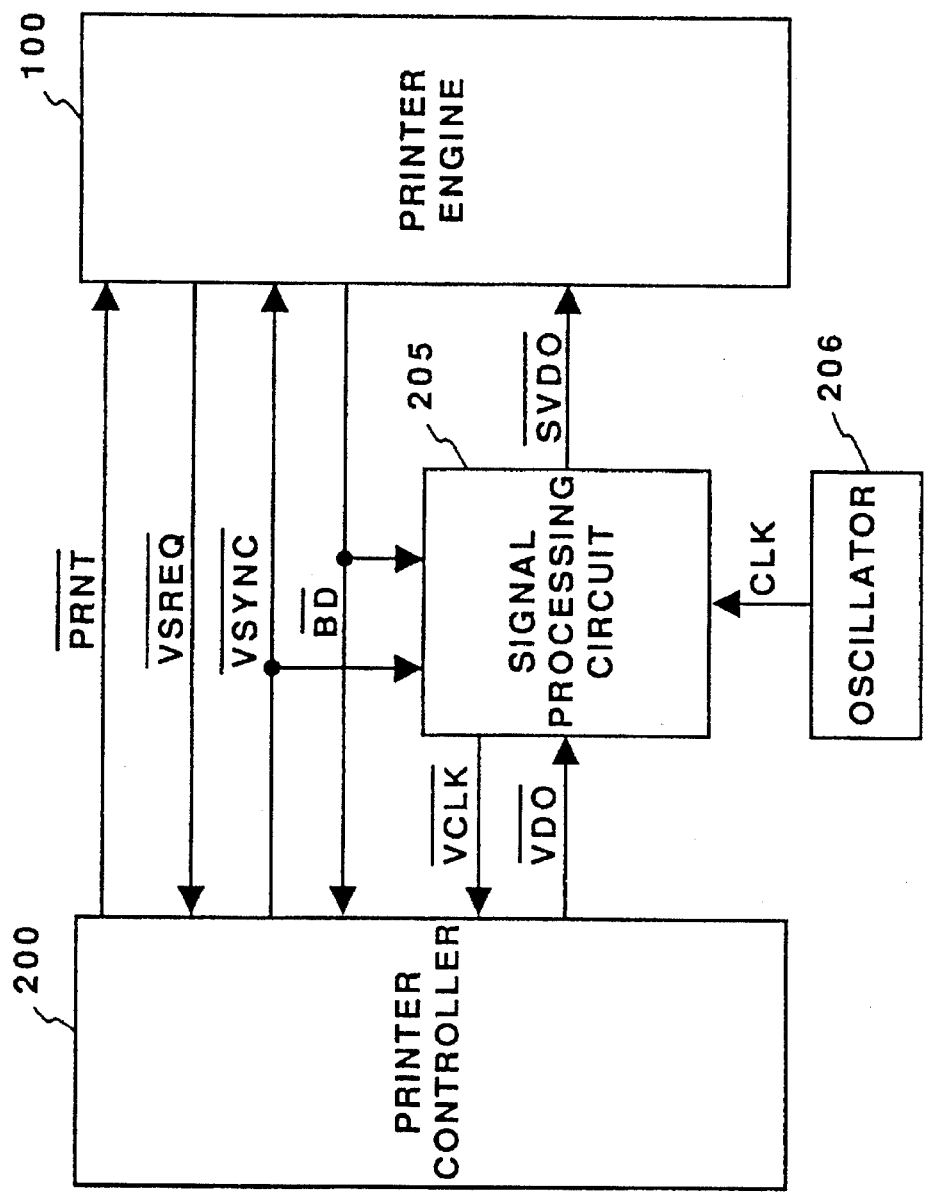
FIG. 49 is a block diagram showing in detail a laser beam printer of this embodiment.

FIG. 49 is a detailed block diagram showing an embodiment to which an image processing apparatus according to the present invention is applied. The laser beam printer shown in FIG. 49 is mainly constituted by the printer 100, the controller 200, a signal processing circuit 205, and an oscillator 206.

The signal processing circuit 205 of this embodiment is functionally located between the controller 200 and the printer 100. The circuit 205 increases the main scanning resolution of image signals VDO of 300 dpi output from the controller 200 to 1,200 dpi four times that of the signals VDO, and outputs them as smoothed signals SVDO to the printer 100.

Other I/O signals of the signal processing circuit 205 will be described below.

Input signals from the controller 200 include the VDO signals and the VSYNC signal.

An input signal from the printer 100 includes the BD signal as the horizontal sync signal. An output signal to the controller 200 includes the VCLK signal as an image clock, i.e., a clock for the VDO signals synchronized with the BD signal.

A CLK signal input from the oscillator 206 is used as a fundamental block in the signal processing circuit 205, and has a frequency eight times that of the VCLK signal. The VCLK signal is generated by frequency-dividing the CLK signal by 8 at a timing synchronized with the BD signal, and has sync precision ⅛ its own period for the BD signal. Therefore, a shift (jitter) of an image in the main scanning direction with respect to the BD signal can be limited to within ⅛ dot, and high image quality can be obtained.

An example of signal processing executed by the signal processing circuit 205 shown in FIG. 8 will be described below with reference to FIG. 23 and subsequent drawing.

FIG. 23 is a view for explaining smoothing processing of the signal processing circuit 205 for a figure in which the inclination of a boundary portion is ½ (a lateral line inclined at 45° or less). When a bit pattern in a frame at the left side in each of FIG. 23 is detected, a four-divided pixel of interest (central pixel) is changed, as shown in a pattern at the right side in the corresponding figure.

Figures 25A, 25B, 25C:
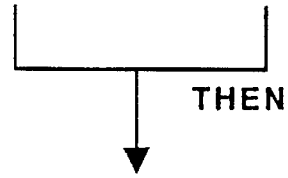
FIG. 25 is a view for explaining a feature extraction algorithm of this embodiment.

FIG. 25 shows in detail the algorithms in FIGS. 23-$a$ to 23-$d$.

FIG. 25 is a view for explaining in detail the algorithm corresponding to FIG. 23-$a$. When the regions X5=0 and X2=0, as shown in FIG. 25-$b$, at least one of the regions Y1 to Y8, X3, and X4 is 0, and a bit pattern is expressed by $7a=7b=6c=6d=5e=5f=4g=4h=3i=3j=2k=0$, and $8a=8b=7c=7d=6e=6f=5g=5h=4i=4j=3k=1$, as shown in FIG. 25-$a$, a pixel of interest (central pixel) $5f$ is changed to have x1=0, x2=0, x3=1, and x4=1, and the changed pixel is output.

Figure 29:
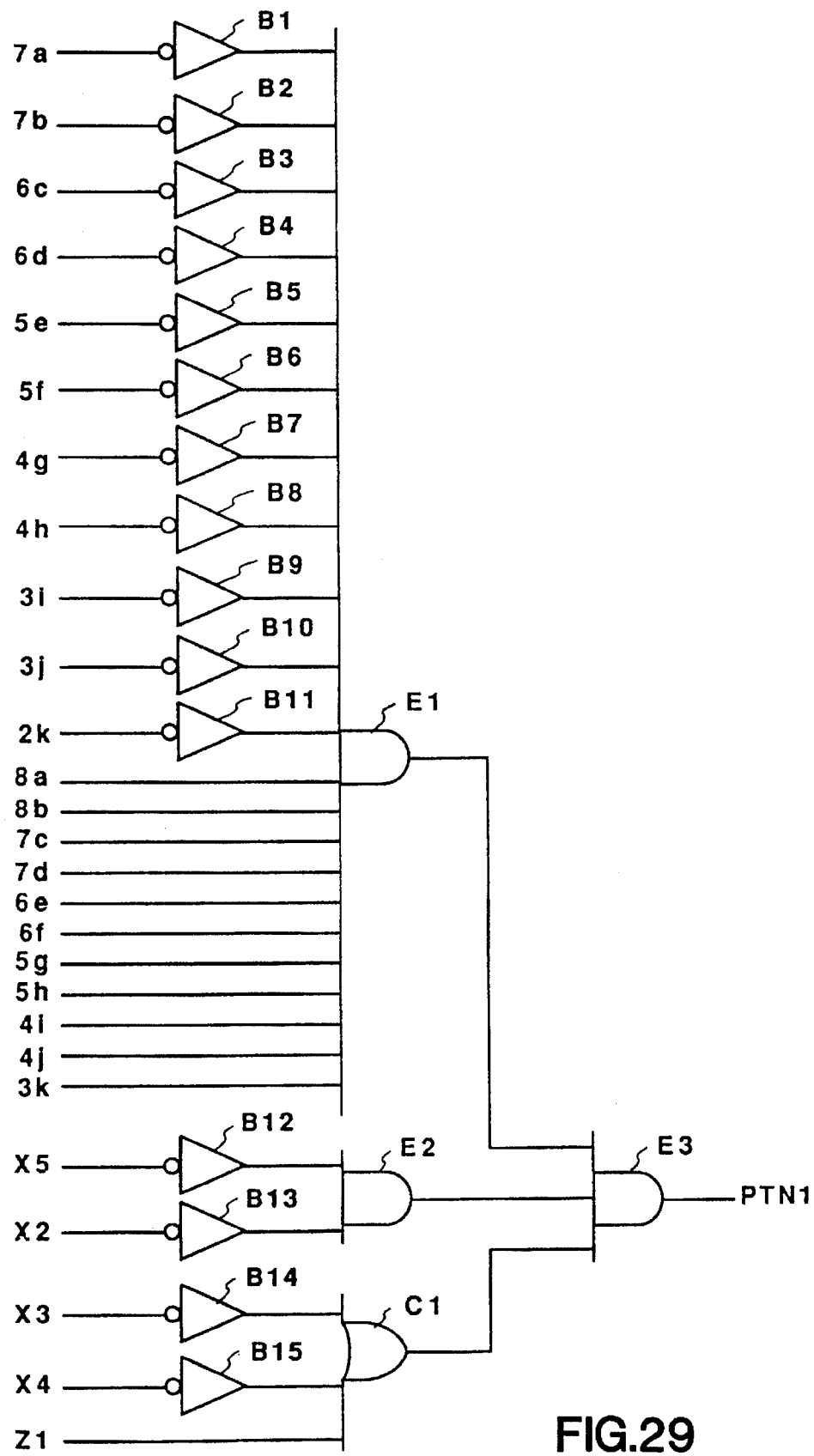
FIG. 29 is a diagram showing a feature extraction circuit corresponding to FIG. 16.

FIG. 29 shows in detail a circuit for realizing this algorithm. In FIG. 29, reference symbols B1 to B15 denote inverters; E1 to E3, AND gates; and C1, an OR gate. The inputs of the AND gate E2 receive data of the regions X2 and X5. The inputs of the OR gate C1 receive data of the regions X3, X4, and Y1 to Y8 (Z1). The inputs of the AND gate E1 receive bit pattern data. When the AND condition of the AND gate E3 is satisfied, the AND gate E3 outputs "1" as an output PTN1; otherwise, it outputs "0". The output PTN1 is input to an input of an OR gate Q4 in a circuit shown in FIG. 15 (to be described later).

Figures 26A, 26B, 26C:
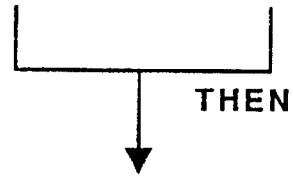
FIG. 26 is a view for explaining the feature extraction algorithm of this embodiment.

FIG. 26 is a view for explaining in detail the algorithm corresponding to FIG. 23-$b$. When the region X1=0, as shown in FIG. 26-$b$, at least one of the regions Y1 to Y8, X7, X3, and X4 is 0, and a bit pattern is expressed by $7a=6b=6c=5d=5e=4f=4g=3h=3i=2j=2k=0$, and $8a=7b=7c=6d=6e=5f=5g=4h=4i=3j=3k=1$, as shown in FIG. 26-$a$, a pixel of interest (central pixel) $5f$ is changed to have x1=0, x2=0, x3=1, and x4=1, and the changed pixel is output.

Figure 30:
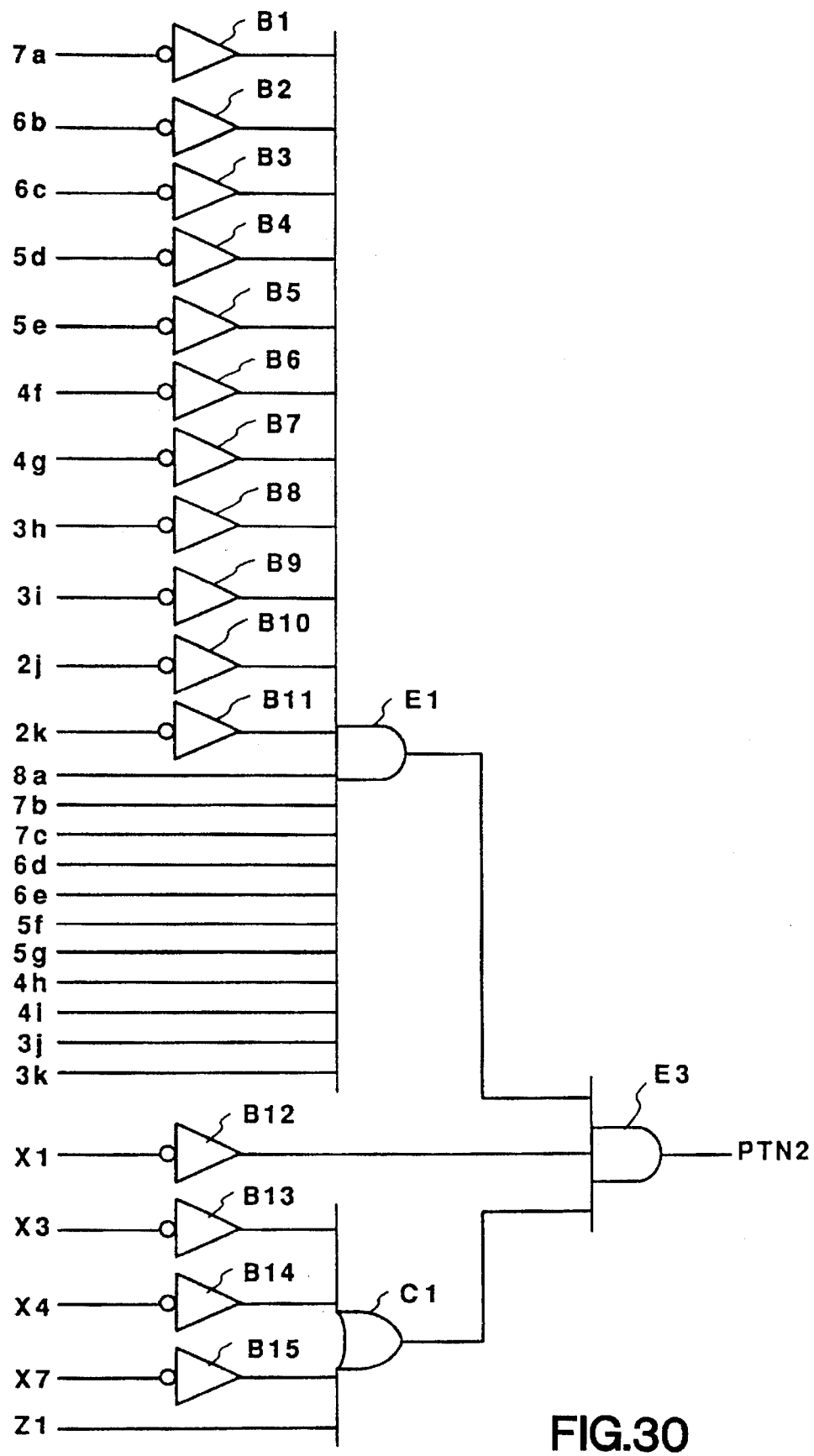
FIG. 30 is a diagram showing a feature extraction circuit corresponding to FIG. 17.

FIG. 30 shows a circuit for realizing this circuit. In FIG. 30, reference symbols B1 to B15 denote inverters; E1 and E3, AND gates; and C1, an OR gate.

The input of the inverter B12 receives data of the region X1. The inputs of the OR gate C1 receive data of the regions X3, X4, X7, and Y1 to Y8 (Z1). The inputs of the AND gate E1 receive bit pattern data. When the AND condition of the AND gate E3 is satisfied, the AND gate E3 outputs "1" as an output PTN2; otherwise, it outputs "0". The output PTN2 is input to an input of an OR gate Q13 in the circuit shown in FIG. 15 (to be described later).

Figures 27A, 27B, 27C:
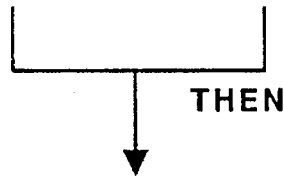
FIG. 27 is a view for explaining the feature extraction algorithm of this embodiment.

FIG. 27 is a view for explaining in detail the algorithm corresponding to FIG. 23-$c$. When the regions X8=0 and X3=0, as shown in FIG. 27-$b$, at least one of the regions Y1 to Y8, X1, and X2 is 0, and a bit pattern is expressed by $7a=6b=6c=5d=5e=4f=4g=3h=3i=2j=2k=1$, and $8a=7b=7c=6d=6e=5f=5g=4h=4i=3j=3k=0$, as shown in FIG. 27-$a$, a pixel of interest (central pixel) $5f$ is changed to have x1=1, x2=1, x3=0, and x4=0, and the changed pixel is output.

Figure 31:
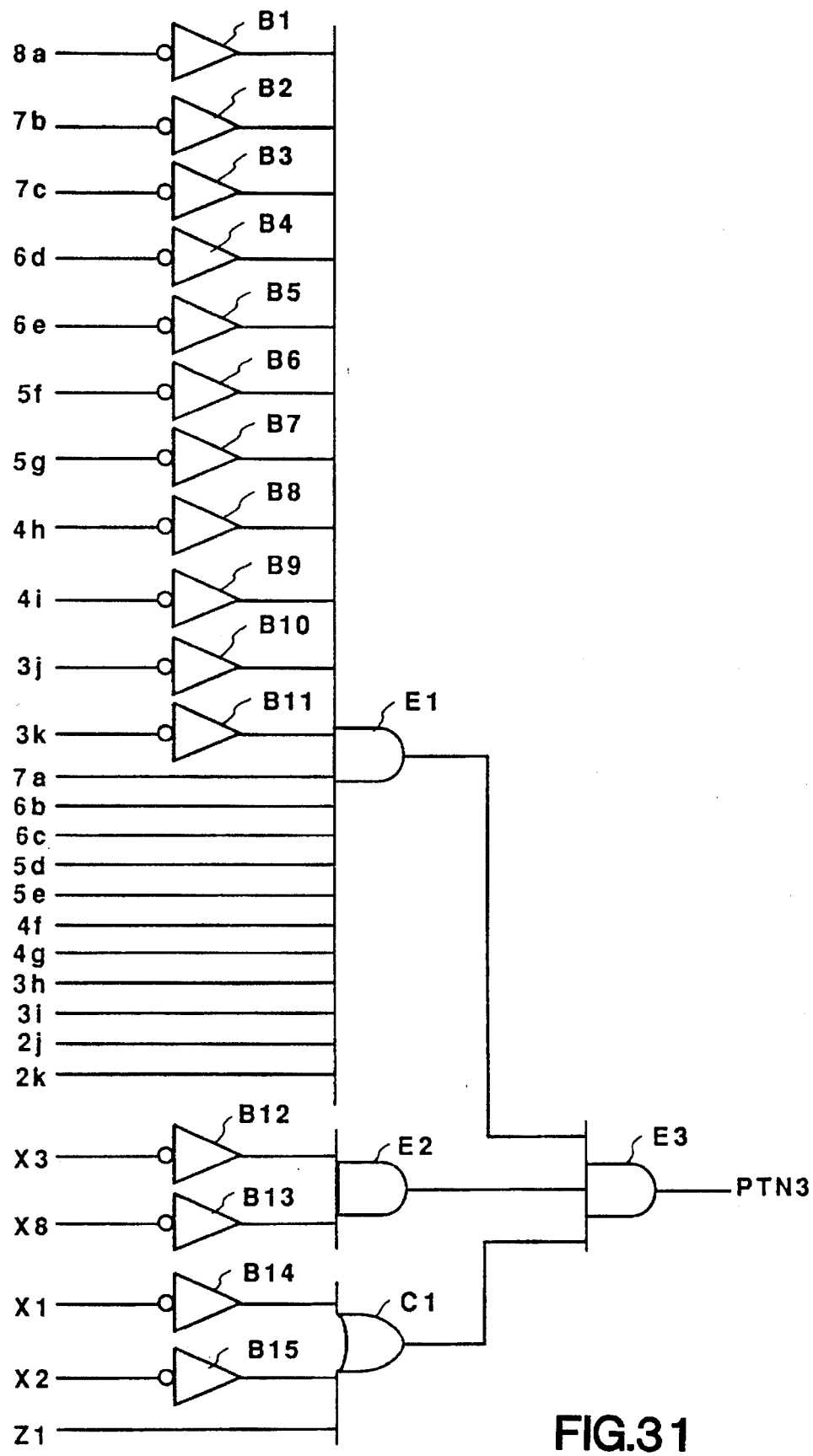
FIG. 31 is a diagram showing a feature extraction circuit corresponding to FIG. 18.

FIG. 31 shows a circuit for realizing this algorithm. In FIG. 31, reference symbols B1 to B15 denote inverters; E1 to E3, AND gates; and C1, an OR gate. The inputs of the AND gate E2 receive data of the regions X3 and X8. The inputs of the OR gate C1 receive data of the regions X1, X2, and Y1 to Y8 (Z1). The inputs of the AND gate E1 receive the bit pattern data. When the AND condition of the AND gate E3 is satisfied, the AND gate E3 outputs "1" as an output PTN3; otherwise, it outputs "0". The output PTN3 is input to an input of the OR gate Q4 in the circuit shown in FIG. 15 (to be described later).

FIG. 28 is a view for explaining in detail the algorithm corresponding to FIG. 23-$d$. When the regions X4=0 and X8=0, as shown in FIG. 28-$b$, at least one of the regions Y1 to Y8, X1, X2, and X6 is 0, and a bit pattern is expressed by $7a=7b=6c=6d=5e=5f=4g=4h=3i=3j=2k=1$, and $8a=8b=7c=7d=6e=6f=5g=5h=4i=4j=3k=0$, a pixel of interest (central pixel) $5f$ is changed to have x1=1, x2=1, x3=0, and X4=0, and the changed pixel is output.

Figure 32:
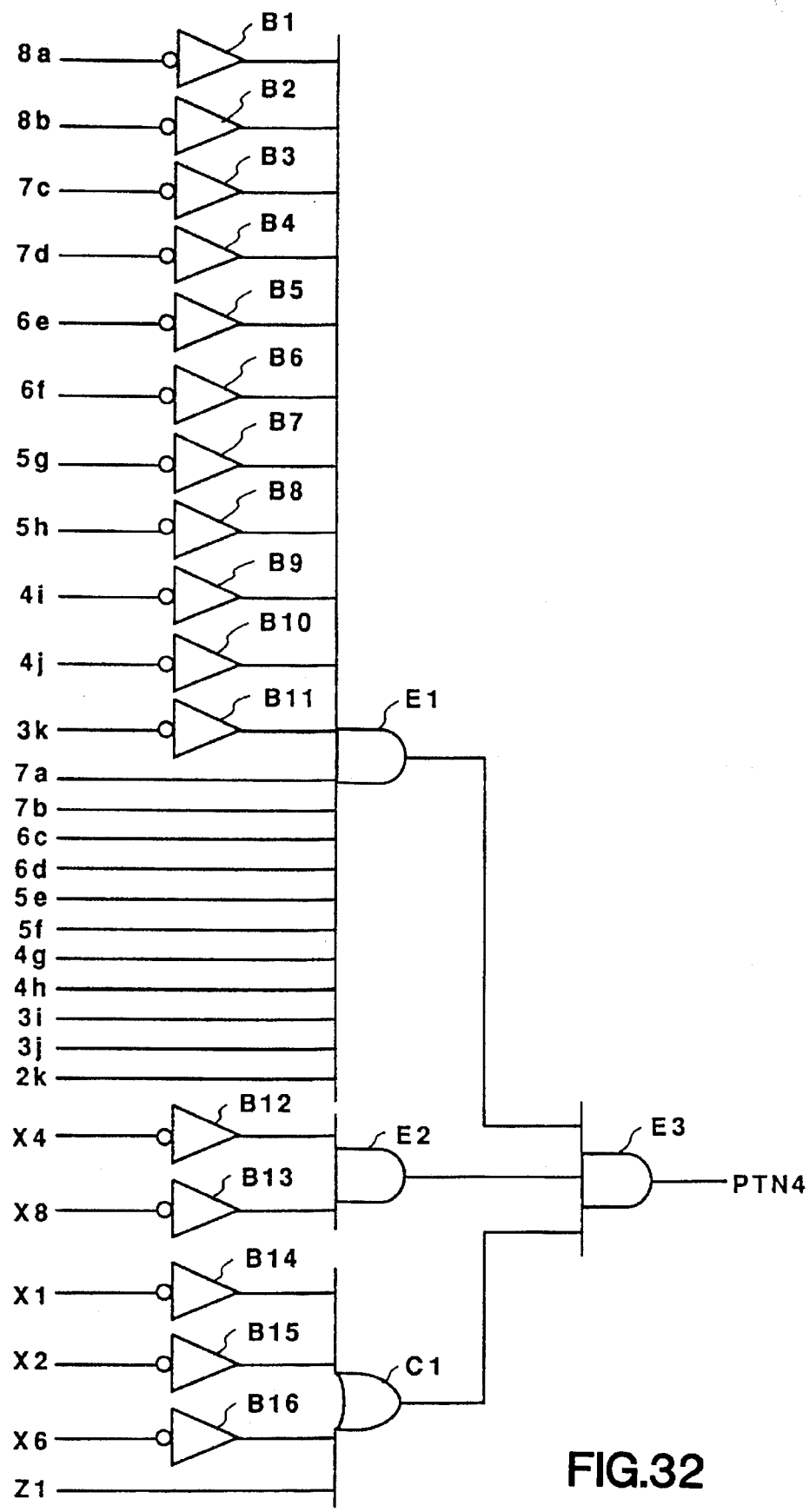
FIG. 32 is a diagram showing a feature extraction circuit corresponding to FIG. 19.

FIG. 32 shows a circuit for realizing this algorithm. In FIG. 32, reference symbols B1 to B15 denote inverters; E1 to E3, AND gates; and C1, an OR gate. The inputs of the AND gate E2 receive data of the regions X4 and X8. The inputs of the OR gate C1 receive data of the regions X1, X2, X6, and Y1 to Y8 (Z1). The inputs of the AND gate E1 receive bit pattern data. When the AND condition of the AND gate E3 is satisfied, the AND gate E3 outputs "1" as an output PTN4; otherwise, it outputs "0". The output PTN4 is input to an input of the OR gate Q13 in the circuit shown in FIG. 15 (to be described later).

FIG. 34 is a view for explaining smoothing processing for a figure in which the inclination of a boundary portion is 2/1 (a longitudinal line inclined at 45° or more).

When a bit pattern in a frame at the left side in each of FIG. 34 is detected, processing for changing a four-divided pixel of interest (central pixel), as shown in a pattern at the right side in the corresponding figure, is performed.

Figures 35A, 35B, 35C:
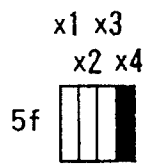
FIG. 35 is a view for explaining a feature extraction algorithm of this embodiment.
Figure 39D:
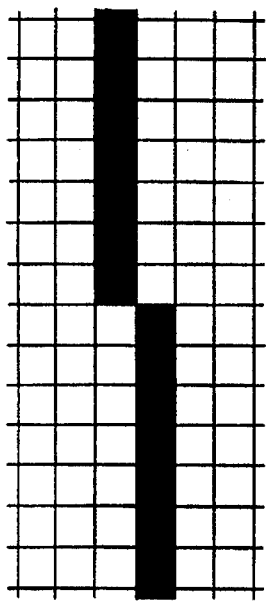
FIG. 39 is a view showing smoothing processing for two different one-dot lines.
Figure 39E:
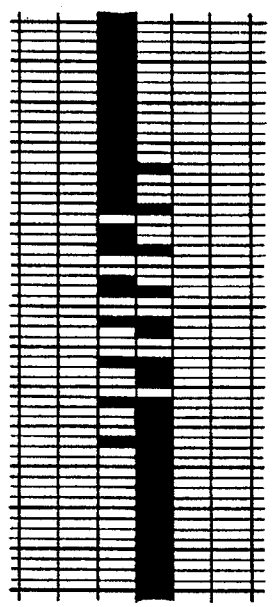
Figure 39F:
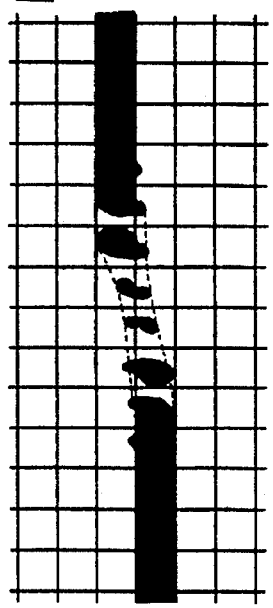
Figure 39A:
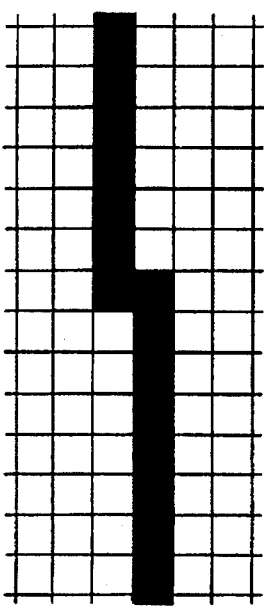
Figure 39B:
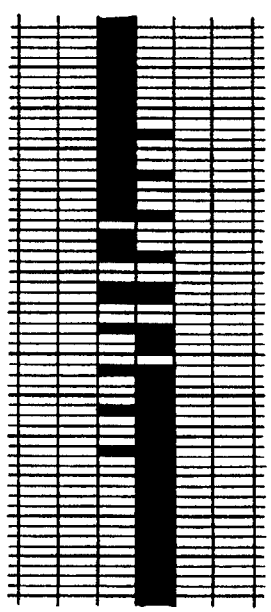
Figure 39C:
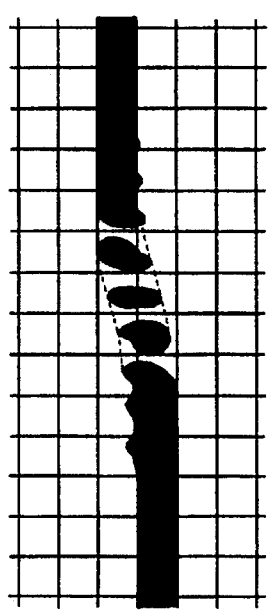
Figure 40A:
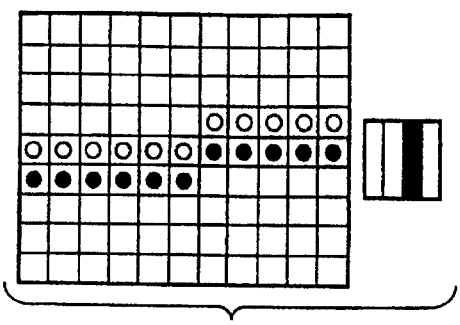
FIG. 40 is a view showing a conventional smoothing algorithm for a lateral line whose boundary portion is almost horizontal.
Figure 40E:
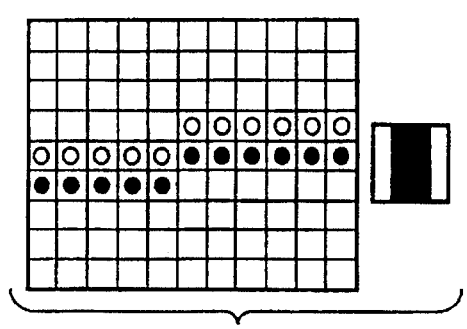
Figure 40B:
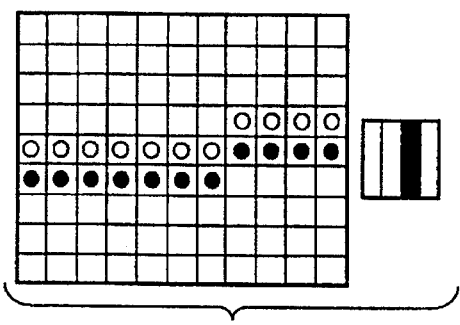
Figure 40F:
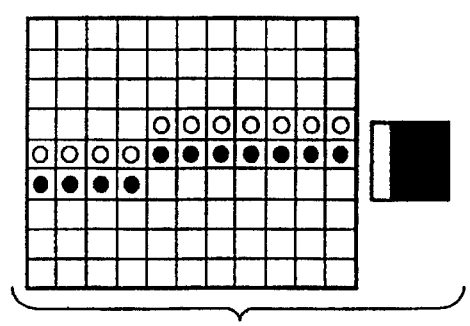
Figure 40C:
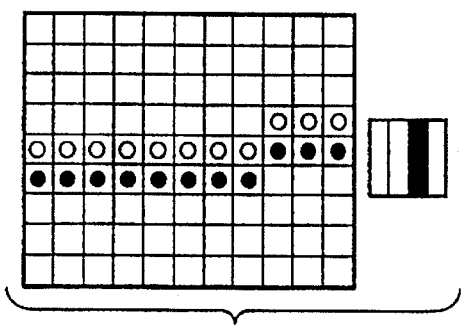
Figure 40G:
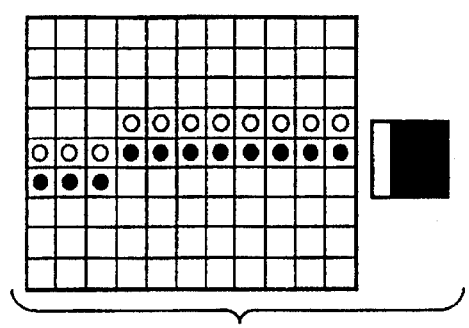
Figure 40D:
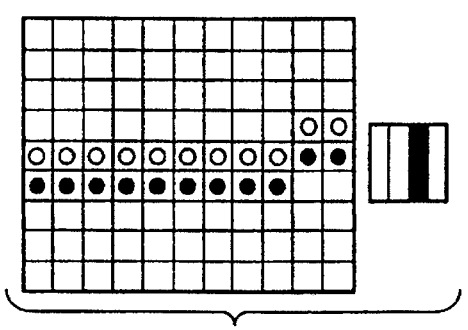
Figure 40H:
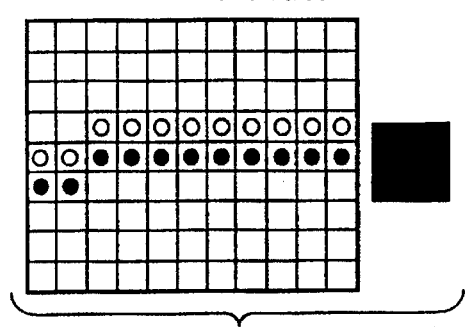
Figure 41A:
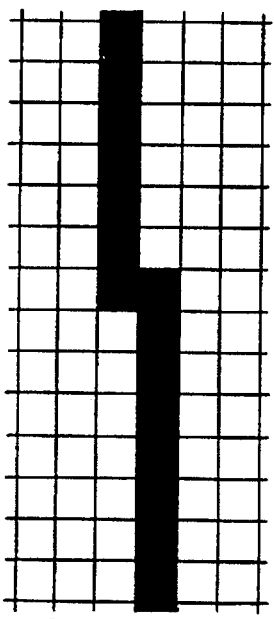
FIG. 41 is a view showing a smoothing effect for an almost horizontal lateral line according to this embodiment.
Figure 41B:
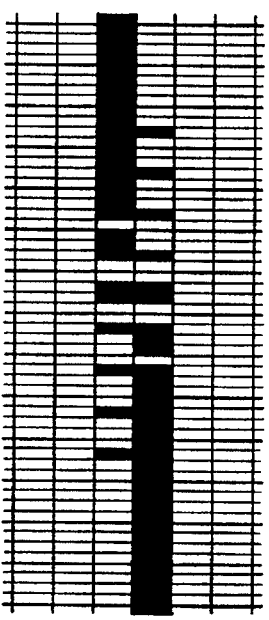
Figure 41C:
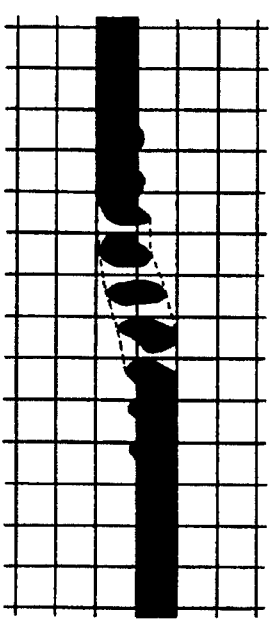
Figure 41D:
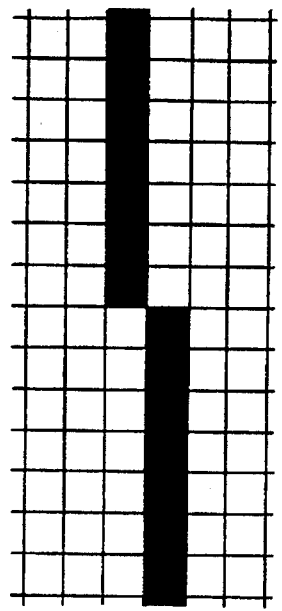
Figure 41E:
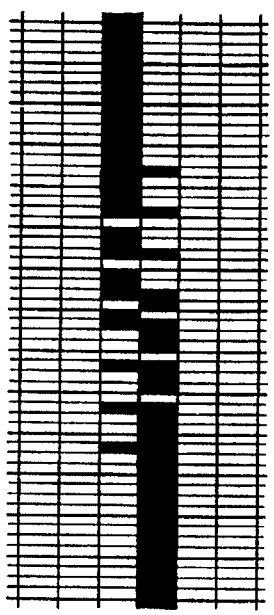
Figure 41F:
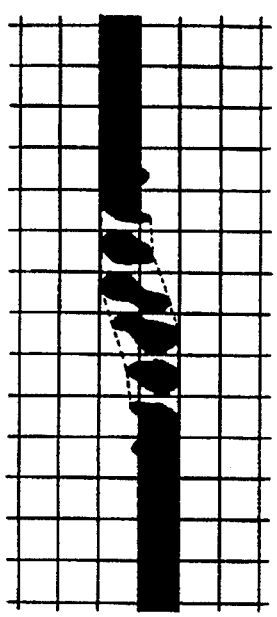
Figure 45A:
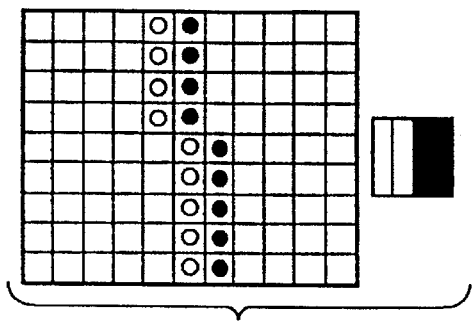
FIG. 45 is a view showing a conventional smoothing algorithm for a longitudinal line whose boundary portion is almost vertical.
Figure 45D:
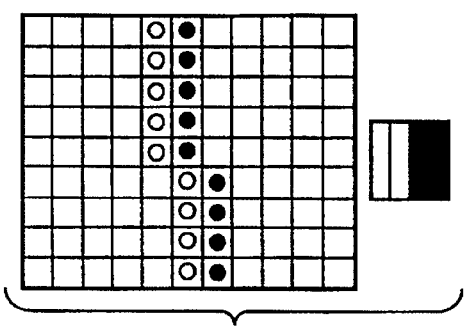
Figure 45B:
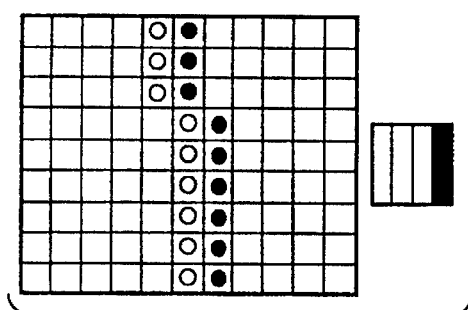
Figure 45E:
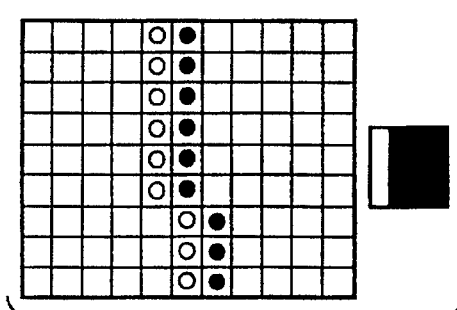
Figure 45C:
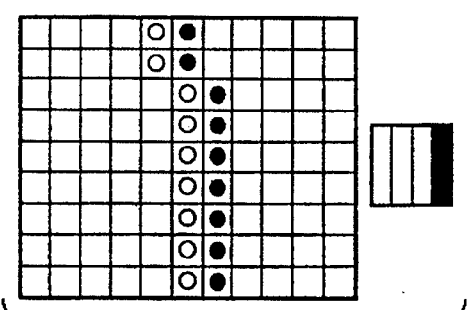
Figure 45F:
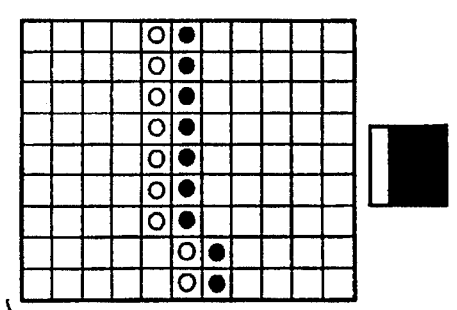

FIG. 35 show in detail the algorithms shown in FIG. 34.

FIG. 35 is a views for explaining in detail the algorithm corresponding to FIG. 34-$a$. When regions X1=0 and X6=0, as shown in FIG. 35-$b$, at least one of the regions Y1 to Y8, X4, and X7 is 0, and a bit pattern is expressed by $1h=2g=3g=4f=5f=6e=7e=8d=9d=0$, and $1i=2h=3h=4g=5g=6f=7f=8e=9e=1$, as shown in FIG. 35-$a$, a pixel of interest (central pixel) $5f$ is changed to have x1=0, x2=0, x3=0, and x4=1, and the changed pixel is output.

FIG. 36 is a view for explaining in detail the algorithm corresponding to FIG. 34-$b$. When the region X5=0, as shown in FIG. 36-$b$, at least one of the regions Y1 to Y8, X3, X8, and X7 is 0, and a bit pattern is expressed by $1h=2h=3g=4g=5f=6f=7e=8e=9d=1$, and $1g=2g=3f=4f=5e=6e=7d=$ $8d=9c=0$, as shown in FIG. 36-a, a pixel of interest (central pixel) 5f is changed to have x1=0, x2=1, x3=1, and x4=1, and the changed pixel is output.

Figures 37A, 37B, 37C:
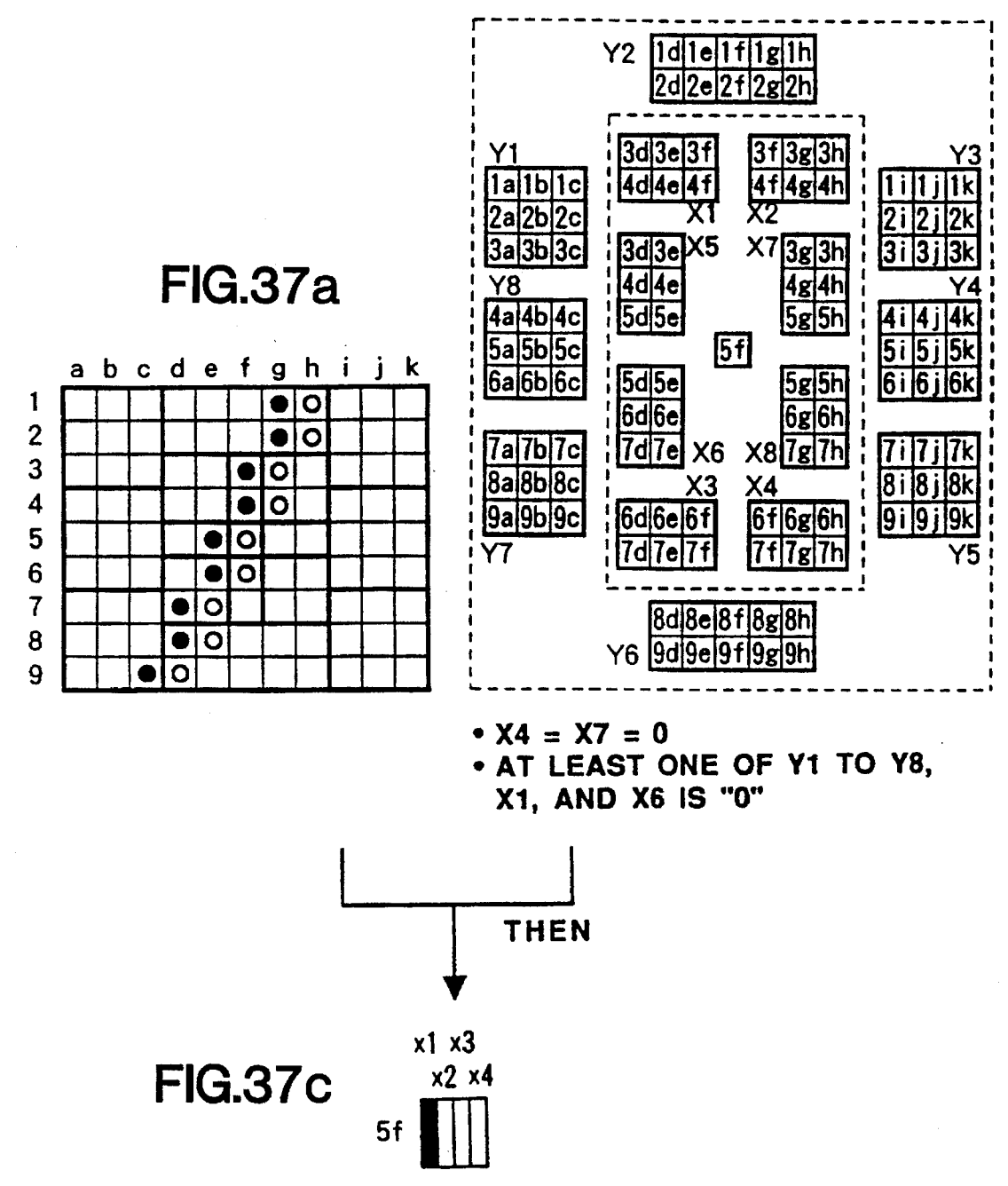

FIG. 37 is a view for explaining in detail the algorithm corresponding to FIG. 34-c. When the regions X4=0 and X7=0, as shown in FIG. 37-b, at least one of the regions Y1 to Y8, X1, and X6 is 0, and a bit pattern is expressed by $1h=2h=3g=4g=5f=6f=7e=8e=9d=0$, and $1g=2g=3f=4f=5e=6e=7d=8d=9c=1$, as shown in FIG. 37-a, a pixel of interest (central pixel) 5f is changed to have x1=1, x2=0, x3=0, and x4=0, and the changed pixel is output.

FIG. 38 is a view for explaining in detail the algorithm corresponding to FIG. 34-d. When the regions X4=0 and X8=0, as shown in FIG. 38-b, at least one of the regions Y1 to Y8, X1, and X8 is 0, and a bit pattern is expressed by $1h=2g=3g=4f=5f=6e=7e=8d=9d=1$, and $1i=2h=3h=4g=5g=6f=7f=8e=9e=0$, as shown in FIG. 38-a, a pixel of interest (central pixel) 5f is changed to have x1=1, x2=1, x3=1, and x4=0, and the changed pixel is output.

Note that, in practice, the patterns shown in FIG. 23 also have feature extraction patterns in which the right and left portions are replaced with each other to have the pixel of interest (central pixel) as the center (i.e., a total of eight patterns are available).

Similarly, the patterns shown in FIG. 34 also have feature extraction patterns in which the right and left portions are replaced with each other to have the pixel of interest (central pixel) as the center (i.e., a total of eight patterns are available).

Figure 24:
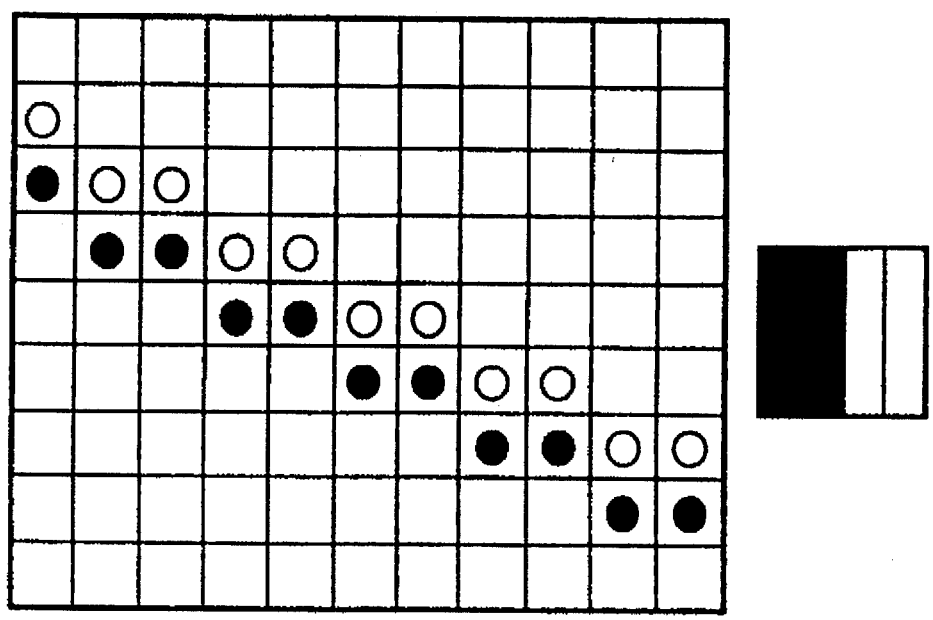
FIG. 24 is a view showing patterns for use in explaining a smoothing effect for a lateral line inclined in this embodiment

For example, a pattern obtained by replacing the right and left portions of the feature extraction pattern shown in FIG. 23-a is as shown in FIG. 24.

In the smoothing algorithm in this case, if $2a=3b=3c=4d=4e=5f=5g=6h=6i=7j=7k=0$ (O dots) and $3a=4b=4c=5d=5e=6f=6g=7h=7i=8j=8k=1$(● dots), X7=X1=0, and at least one of the regions Y1 to Y8, X3, and X4 is "1", a pixel of interest 5f is changed to have x1=1, x2=1, x3=0, and x4=0.

Similarly, symmetrical algorithms in the right-and-left direction are set for the patterns shown in FIGS. 23-b,c and d.

In this manner, since the symmetrical feature extraction algorithms in the right-and-left direction are prepared, smoothing processing for characters "O", "U", "V", "W", and the like can be performed by the symmetrical algorithms, and these characters can have natural appearances.

Figure 15:
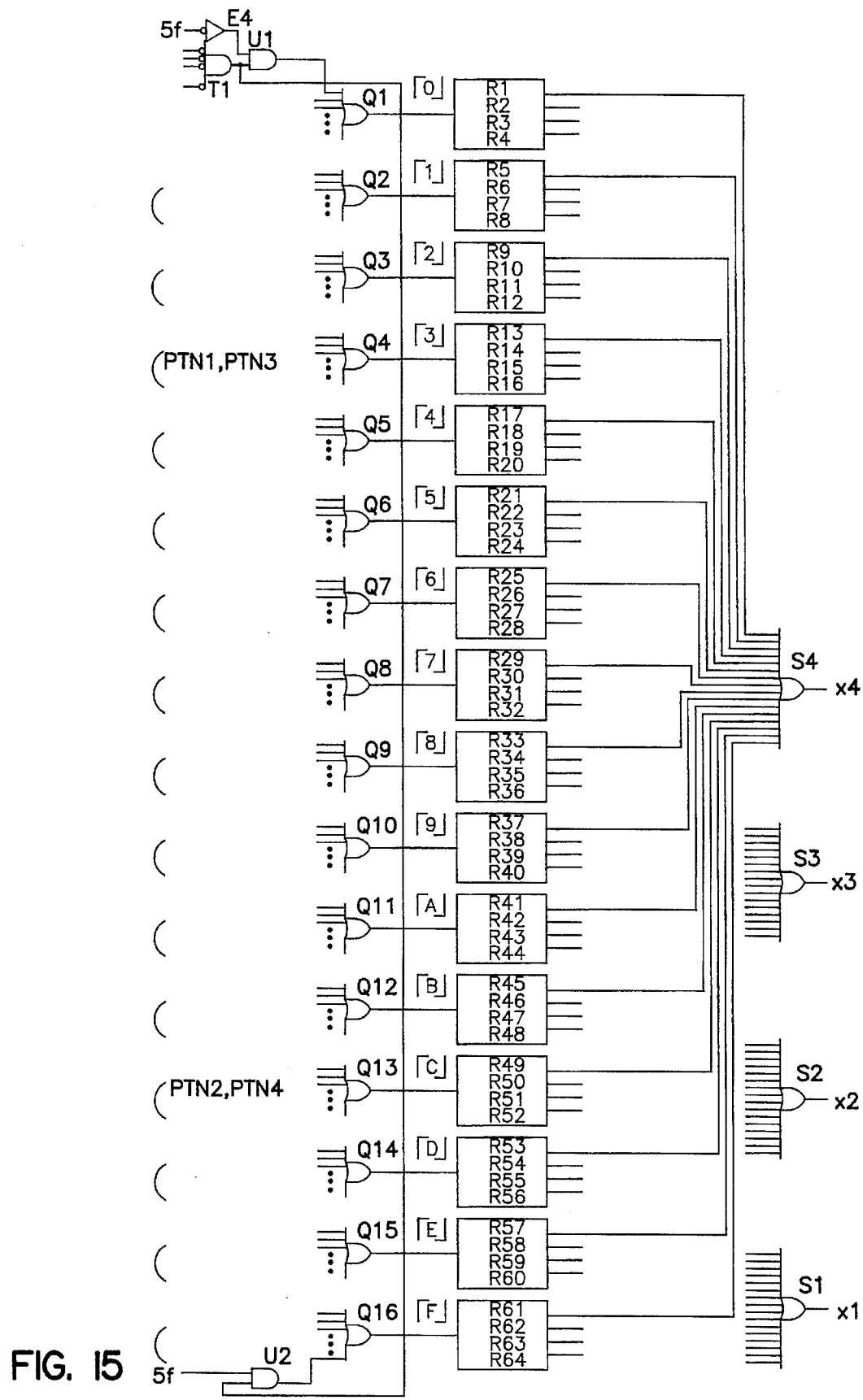
FIG. 15 is a diagram showing the circuit of the feature extraction unit of the first embodiment.
Figure 16:
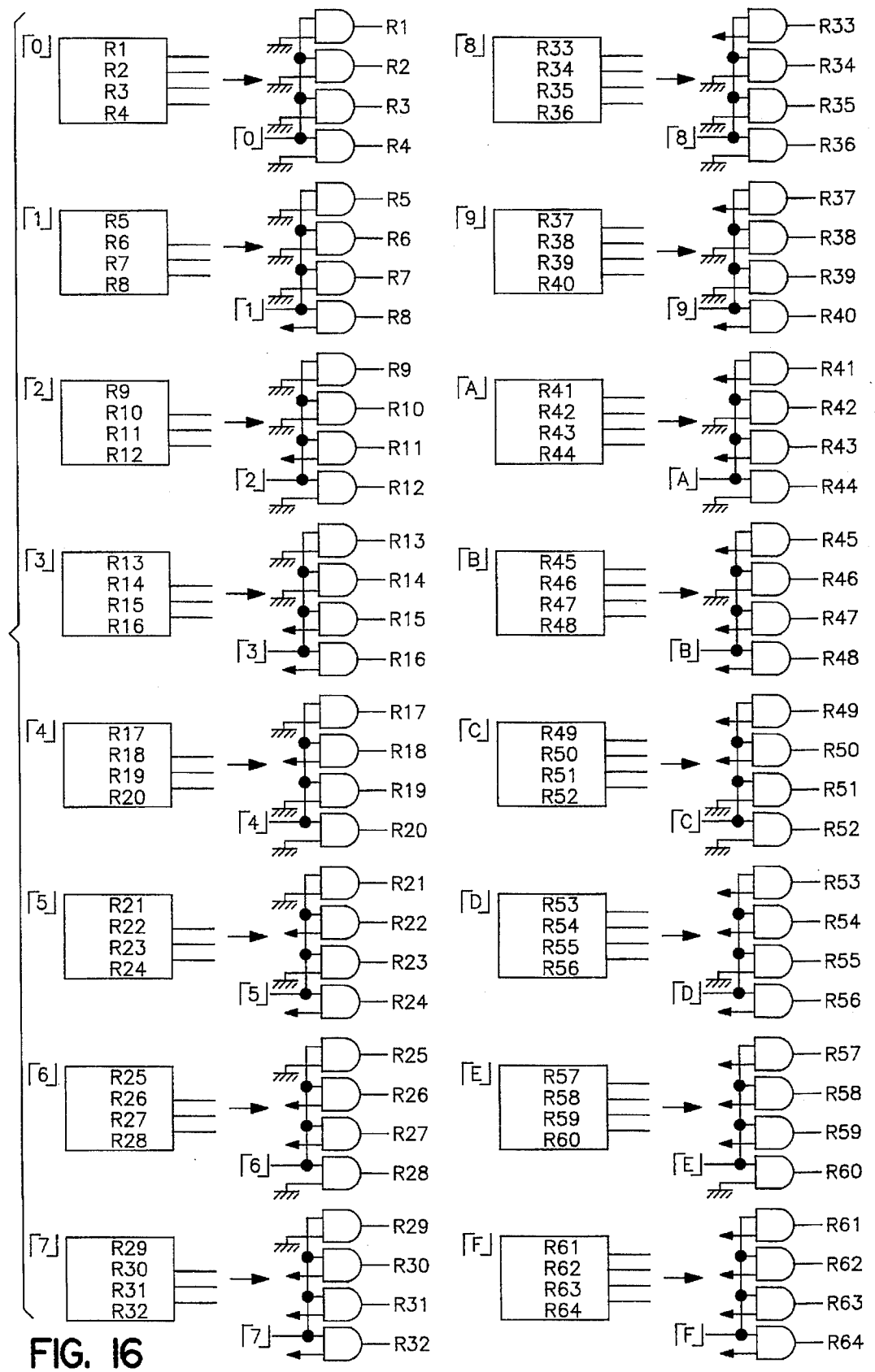
FIG. 16 is a diagram partially showing in detail the circuit shown in FIG. 15.

FIGS. 15 and 16 show a data generator, including a plurality of feature detection circuits, for receiving output signals from the feature detection circuits, and generating data of the pixel of interest 5f according to the input signals. Note that FIG. 16 shows in detail a portion of the circuit shown in FIG. 15.

In FIGS. 15 and 16, reference symbols Q1 to Q16 denote OR gates; R1 to R64, U1, and U2, 2-input AND gates; S1 to S4, 16-input OR gates; E4, an inverter; and T1, a NOR gate.

Each of the output signals, extracted as a plurality of features, from the feature detection circuits is connected to a corresponding one of the OR gates Q1 to Q16. Of the outputs from the feature detection circuits, the outputs PTN1 and PTN3 are connected to the OR gate Q4, the outputs PTN2 and PTN4 are connected to the OR gate Q13, and so on.

The signals, including the outputs PTN1 to PTN4, from all the feature detection circuits are connected to the NOR gate T1. In correspondence with the outputs "1" from the OR gates Q1 to Q16, each of code generators constituted by four AND gates of the AND gates R1 to R64 generates a corresponding one of codes "0" to "F" as a code of four bits 20 (R4 output), 21 (R3 output), 22 (R2 output), and 23 (R1 output).

Of these code outputs, data at the bit position 20 are logically ORed by the OR gate S1, and the ORed result is output as an output "x1" of the OR gate S1. Data at the bit position 21 of the code outputs are logically ORed by the OR gate S2, and the ORed result is output as an Output "x2" of the OR gate S2.

Data at the bit position 22 of the code outputs are logically ORed by the OR gate S3, and the ORed result is output as an output "x3" of the OR gate S3. Data at the bit position 23 of the code outputs are logically ORed by the OR gate S4, and the ORed result is output as an output "x4" of the OR gate S4.

In this manner, one of the codes "0" to "F" corresponding to the output from one of the OR gates Q1 to Q16, two or more of which are never selected at the same time, is obtained as the outputs x1 to x4 from the OR gates S1 to S4.

For example, if the code is "3", x1=1, x2=1, x3=0, and x4=0. If the code is "9", x1=1, x2=0, x3=0, and x4=1.

Since all the feature coincidence signals are connected to the inputs of the NOR gate T1, if at least one of the feature coincidence signals is not "1" (none of the features coincide with each other), the output from the NOR gate T1 goes to "1". At this time, when a pixel of interest 5f is a "0" dot, the output from the two-input AND gate U1 goes to "1", and sets the output from the OR gate Q1 to be "1", thus outputting a code "0" to x1 to x4 (i.e., x1=0, x2=0, x3=0, and x4=0). When a pixel of interest 5f is a ● dot, the output from the 2-input AND gate U2 goes to "1", and sets the output from the OR gate Q16 to be "1", thus outputting a code "F" to x1 to x4 (i.e., x1=1, x2=1, x3=1, and x4=1).

In this manner, when the features do not coincide with the predetermined features, data of the pixel of interest 5f is preserved and printed.

The outputs x1 to x4 from the data generator are input to the known parallel/serial converter 44, and the converter 44 generates signals VDOM (SVDO signals) output in synchronism with the clock signal VCL in the order of x1, x2, x3, and x4. The signals VDOM drive the laser through the laser driver.

Figure 22A:
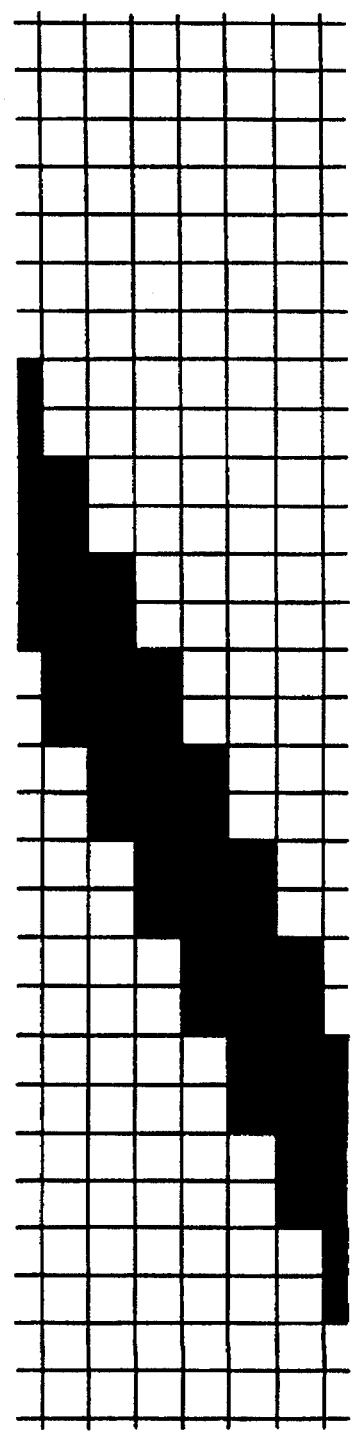
FIG. 22 is a view for explaining a smoothing effect for a lateral line inclined at 45° or less in this embodiment.
Figure 22B:
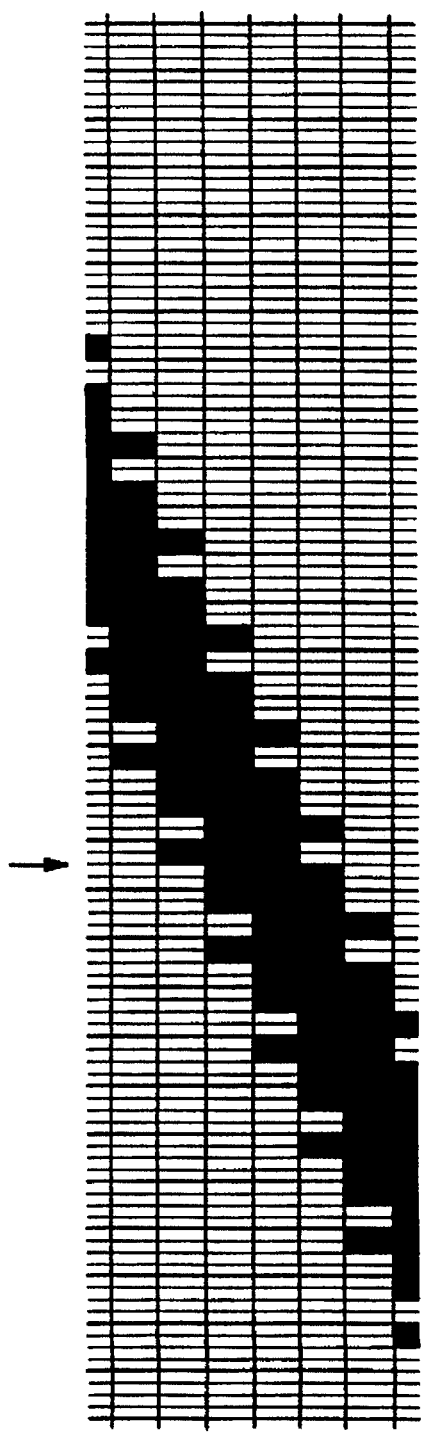
Figure 23C:
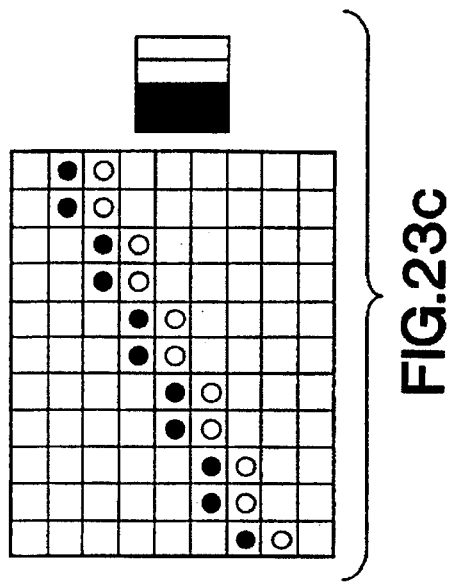
FIG. 23 is a view for explaining smoothing processing for a figure having a boundary portion inclined at 45° or less.
Figure 23D:
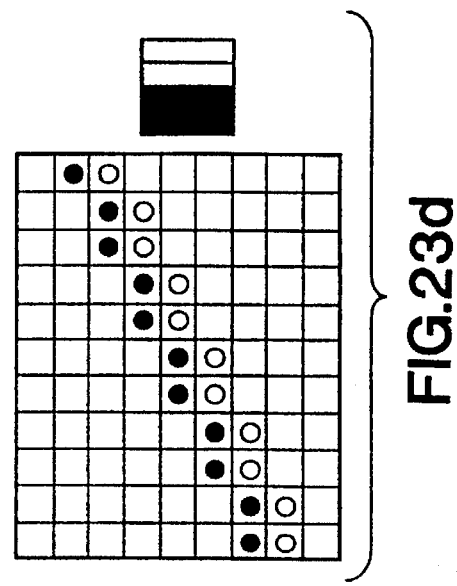
Figure 23A:
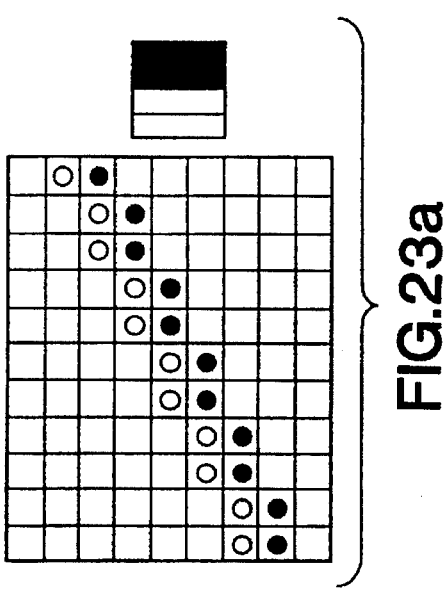
Figure 23B:
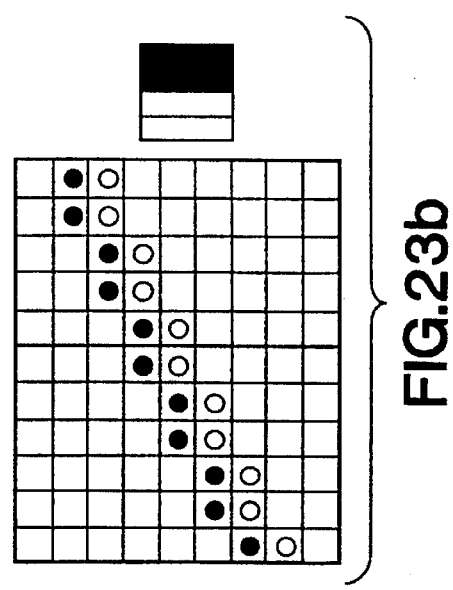

FIG. 22-b shows output image signals obtained when smoothing processing of a lateral line having an inclination of 45° or less shown in FIG. 22-a is performed using the above-mentioned algorithms. As can be seen from FIG. 22-b, the line is processed, so that pulse width signal components to be added to the left boundary portion of the line image have the same time interval as the pulse width signal components deleted from the central portion to the left boundary portion of the line image.

The same processing is performed for the right boundary portion of the line image. The pulse width added to the left boundary portion is controlled to be equal to the pulse width added to the right boundary portion.

Figure 33A:
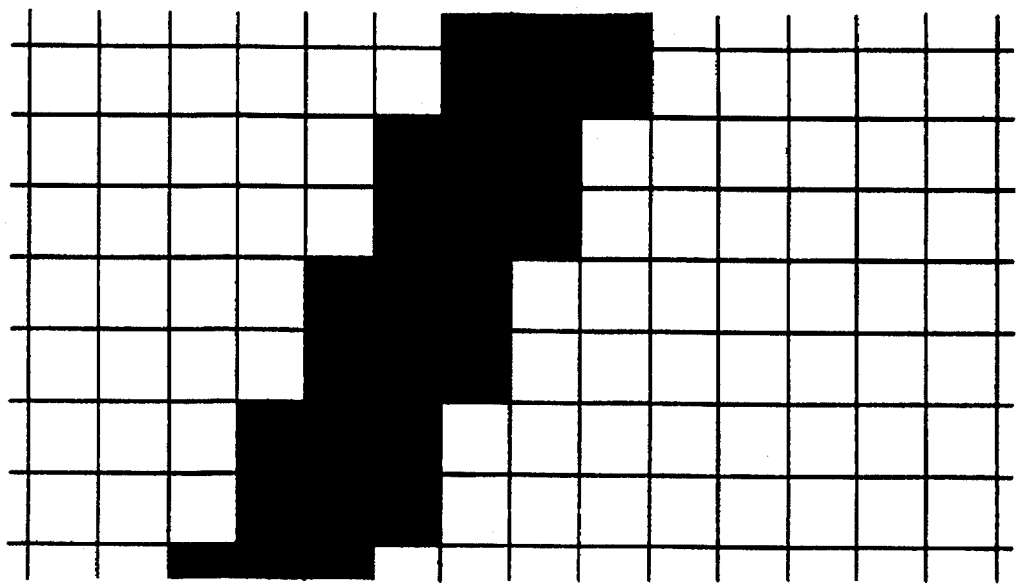
FIG. 33 is a view for explaining a smoothing effect for a longitudinal line inclined at 45° or less in this embodiment.
Figure 33B:
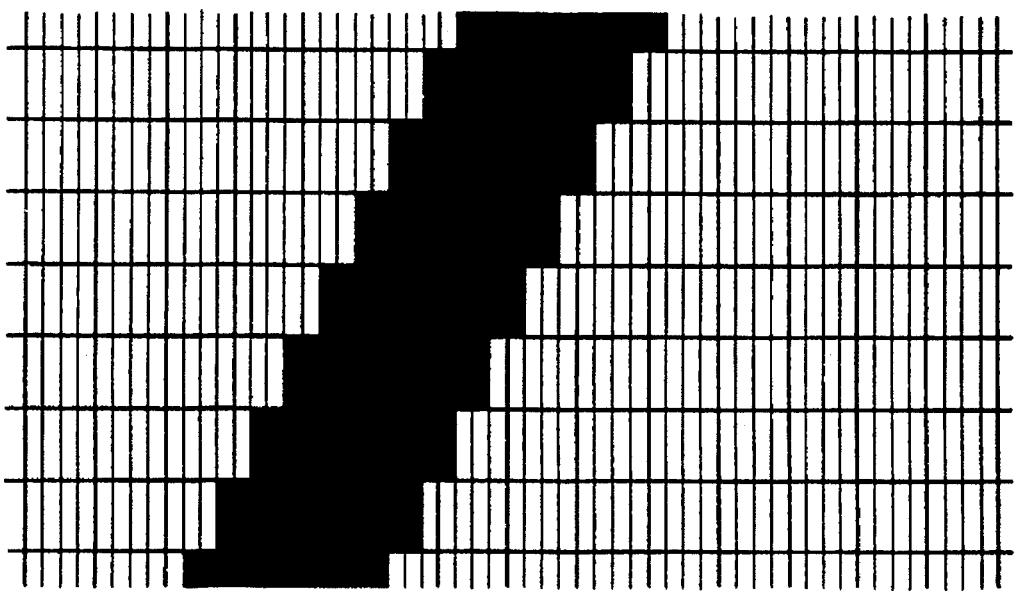
Figure 34C:
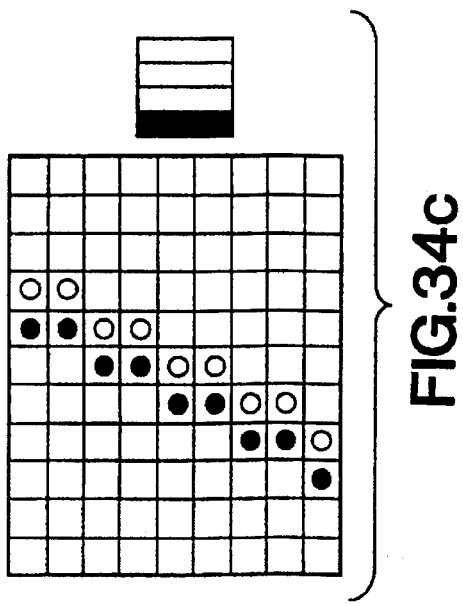
FIG. 34 is a view for explaining a smoothing effect for a longitudinal line in this embodiment.
Figure 34D:
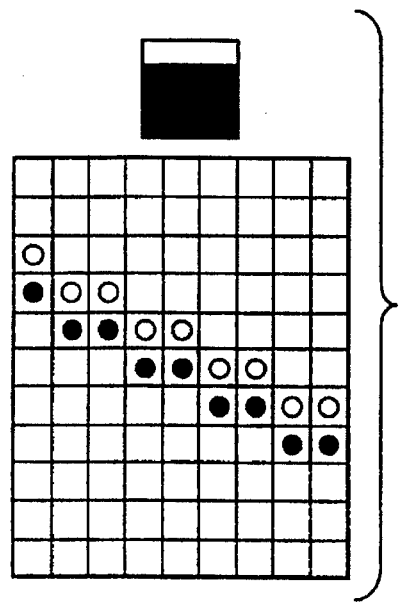
Figure 34A:
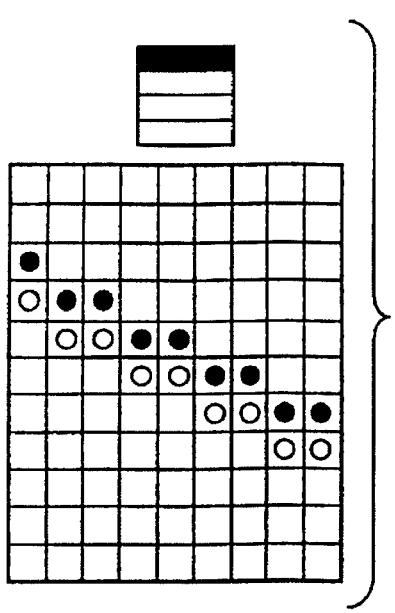
Figure 34B:
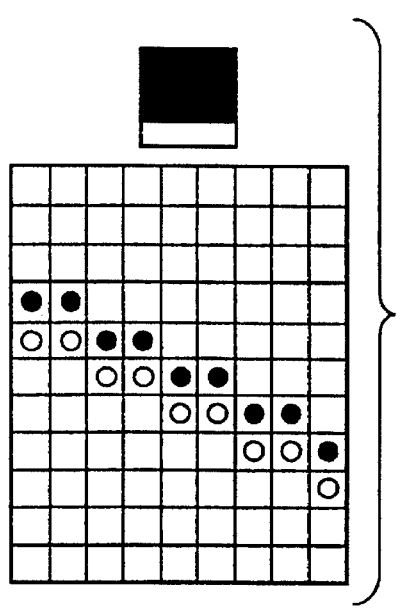

FIG. 33-b shows output image signals obtained when smoothing processing of a longitudinal line having an inclination of 45° or less shown in FIG. 33-a is performed using the above-mentioned algorithms. As can be seen from FIG. 33-b, the same signal width as that added to (or deleted from) the left edge boundary portion of the line image is deleted from (or added to) the right edge boundary portion. As a result, the width of the line after the smoothing processing can be kept unchanged from that before smoothing.

With this processing, the width of the line after smoothing processing can be prevented from being increased or decreased. The line can have uniform appearances at its right and left edge portions, thus effectively improving image quality of the line.

FIG. 40 is a view showing conventional smoothing algorithms performed by the present applicant for a lateral line whose boundary portion is almost horizontal.

When smoothing processing is performed using the algorithms shown in FIG. 40, smoothed signals of a one-dot line shown in FIG. 39-*a* are as shown in FIG. 39-*b*, and as a result, the signals are printed on a paper sheet, as shown in FIG. 39-*c*, according to electrophotography characteristics.

On the other hand, smoothed signals of a one-dot line shown in FIG. 39-*d* are as shown in FIG. 39-*e*, and as a result, the signals are printed on a paper sheet, as shown in FIG. 39-*f*, according to electrophotography characteristics.

As can be seen from FIGS. 39-*c* and *f*, even when similar one-dot lines are to be processed, the lines shown in FIGS. 39-*a* and *d* have different black dot areas to be added to smoothing processing portions, and the line shown in FIG. 39-*d* has a smaller number of dots to be printed than that of the line shown in FIG. 39-*a* by one dot. When a smoothing/printing operation is performed for the line shown in FIG. 39-*d*, the line is thinned and becomes discontinuous, as shown in FIG. 35-*f*. When the dot area to be added to the smoothing processing portion is increased by an algorithm, which can prevent the line from being thinned unlike in FIG. 39-*f*, the line shown in FIG. 39-*d* can be prevented from being thinned by the smoothing processing. However, the width of the smoothing processing portion of the line shown in FIG. 39-*a* is undesirably increased.

FIG. 42 is a view showing smoothing processing algorithms for a boundary portion of an almost horizontal lateral line according to an embodiment of the present invention, which can solve the above-mentioned problems. The detailed algorithms are the same as those described above, and a detailed description thereof will be omitted here.

Note that the algorithm shown in FIG. 42-*a* has a total of four patterns, which are symmetrical in the horizontal and vertical directions to have a pixel of interest (central pixel) as the center, as shown in FIGS. 43 (a1) to (a4). Each of the algorithms shown in FIGS. 42-*b* to *p* has a total of four patterns, which are symmetrical in the horizontal and vertical directions to have a pixel of interest (central pixel) as the center, although not shown. With the algorithms shown in FIG. 42, since either one of the two types of one-dot lines can be determined, optimal processing that can prevent a line width from being increased/decreased according to the type can be executed.

FIG. 41 is an explanatory view when smoothing processing are performed for the two types of one-dot lines using the algorithms according to the embodiment of the present invention. As can be seen from FIG. 41, the algorithms that can identify the two types of one-dot lines are used, and the one-dot line of either type can be printed to have an equal black area of pixels of a smoothing processing portion to that before smoothing. As a result, the width of the smoothing processing portion can be prevented from being increased/decreased, thus allowing printing with high image quality.

FIG. 45 is a view showing conventional smoothing algorithms, previously proposed by the present applicant, for a longitudinal line whose boundary portion is almost vertical.

When smoothing is performed using these algorithms, smoothed signals of a one-dot line shown in FIG. 44-*a* are as shown in FIG. 44-*b*.

On the other hand, smoothed signals for a one-dot line shown in FIG. 44-*c* are as shown in FIG. 44-*d*.

As can be seen from FIGS. 44*a* and *d*, even when similar one-dot lines are to be processed, the lines shown in FIGS. 44*a* and *c* have different black dot areas to be added to smoothing processing portions, and the line shown in FIG. 44-*c* has a larger number of dots to be printed than that of the line shown in FIG. 44-*a* by one dot.

Thus, as a result of the smoothing/printing operation for the line shown in FIG. 44-*a*, the width of the smoothing processing portion of the line shown in FIG. 44-*b* is increased, and a line with a node is printed. On the contrary, when the dot area to be added to a smoothing processing portion is decreased by an algorithm that can prevent the width of the line shown in FIG. 44-*a* from being increased, an increase in width of the line shown in FIG. 44-*a* by the smoothing processing can be prevented. However, the width of the smoothing processing portion of the line shown in FIG. 44-*c* is undesirably decreased.

FIG. 47 is a view showing smoothing processing algorithms for a boundary portion of an almost vertical longitudinal line according to an embodiment of the present invention, that can eliminate the above-mentioned drawbacks.

The detailed algorithms are the same as those described above, and a detailed description thereof will be omitted here.

Note that the algorithm shown in FIG. 47-*a* has a total of four patterns, which are symmetrical in the horizontal and vertical directions to have a pixel of interest (central pixel) as the center, although not shown.

Since the algorithms shown in FIG. 47 can discriminate either of the two types of one-dot lines, i.e., the line including one overlapping pixel, or the line including no overlapping pixel, optimal processing that can prevent the line width from being increased/decreased according to the type can be executed.

FIG. 46 is an explanatory view when smoothing processing is performed for the above-mentioned two types of one-dot lines using the algorithms according to the embodiment of the present invention shown in FIG. 47. As can be seen from FIG. 46, the algorithms that can identify the two types of one-dot lines are used, and the one-dot line of either type can be printed to have an equal black area of pixels of a smoothing processing portion to that before smoothing. As a result, the width of the smoothing processing portion can be prevented from being increased/decreased, thus allowing printing with high image quality.

Figure 50:
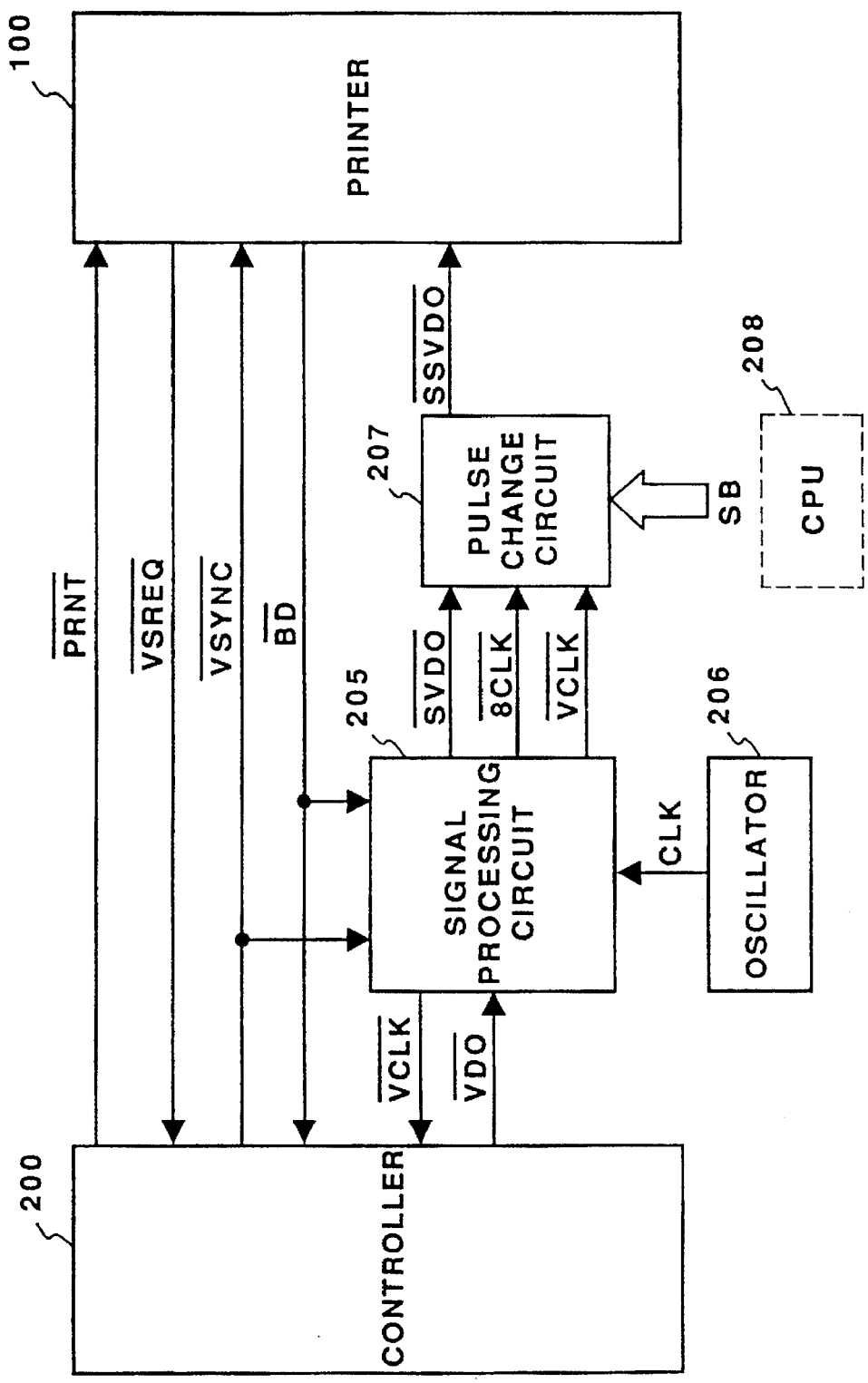
FIG. 50 is a block diagram showing in detail the laser beam printer of this embodiment.

FIG. 50 is a detailed block diagram showing another embodiment to which an image processing apparatus according to the present invention is applied. The same reference numerals in FIG. 50 denote the same parts as in FIG. 49.

In FIG. 50, an 8CLK signal is a clock signal having a frequency eight times that of the VCLK signal, and is the same as the CLK signal in practice.

In a laser beam printer shown in FIG. 50, a pulse change circuit 207 is inserted between the signal processing circuit 205 and the printer 100 in the printer described above with reference to FIG. 49. The pulse change circuit 207 receives the 8CLK signal and the VCLK signal in addition the SVDO signals from the signal processing circuit 205. The circuit 207 outputs SSVDO signals (to be described later) to the printer 100. The pulse change circuit 207 also receives 6-bit parallel signals SB under the control of a CPU 208 for controlling the controller 200 or the printer 100.

In FIG. 50, the signal processing circuit 205 increases the main scanning resolution of image signals VDO of 300 dpi output from the controller 200 to 1,200 dip four times that of the VDO signals, and outputs the signals as smoothed signals SVDO to the pulse change circuit 207 in synchronism with the VCLK signal. Upon reception of the SVDO signals, the pulse change circuit 207 increases the main scanning resolution of predetermined signals to an integer multiple of that of the SVDO signals (e.g., 2,400 dpi twice that of the SVDO signals), and outputs the changed signals as SSVDO signals to the printer 100.

Figure 51:
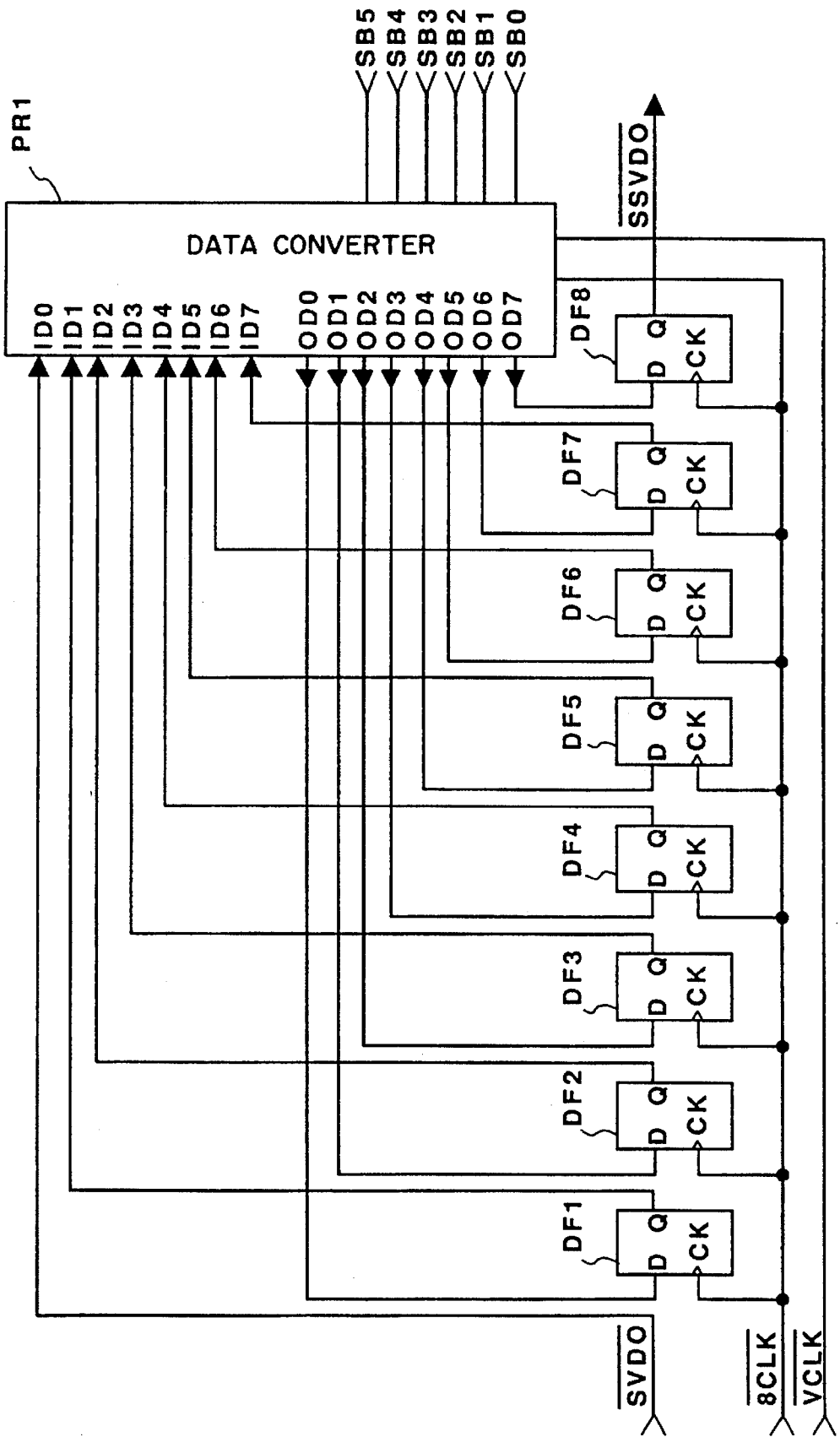
FIG. 51 is a diagram showing in detail a pulse change circuit 207 in FIG. 50.
Figure 52:
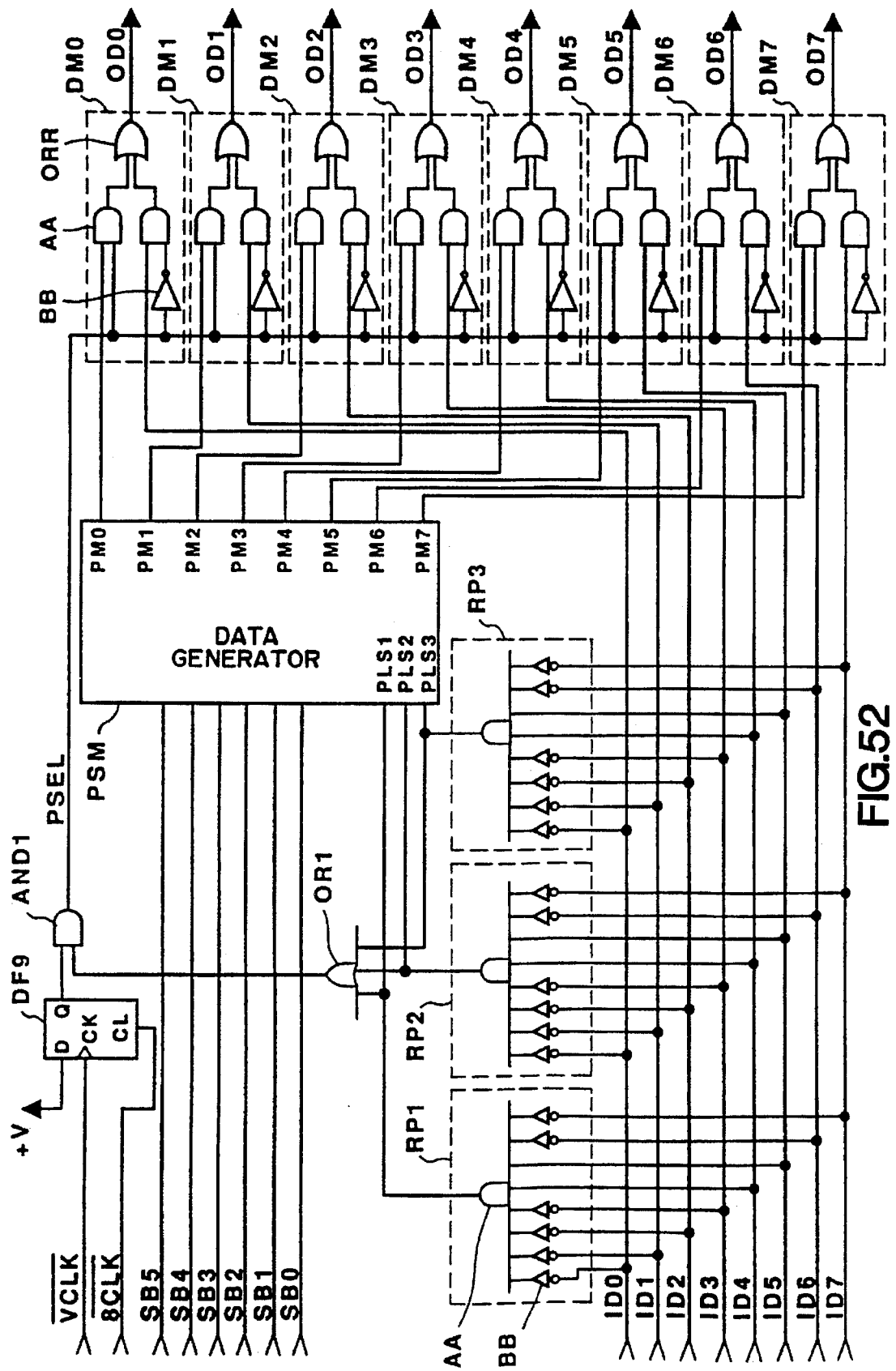
FIG. 52 is a diagram showing in detail a data converter in FIG. 51.

FIGS. 51 and 52 are detailed circuit diagrams of the pulse change circuit 207.

In FIG. 51, reference symbols DF1 to DF8 denote D-type flip-flops; and RR1, a data converter.

An SVDO signal is input to the ID0 input of the data converter RR1. The data converter RR1 outputs an OD0 output corresponding to the ID0 input to the D input of the flip-flop DF1.

The Q output from the flip-flop DF1 is input to the ID1 input of the data converter RR1. The data converter RR1 outputs an OD1 output corresponding to the ID1 input to the D input of the flip-flop DF2.

The Q output from the flip-flop DF2 is input to the ID2 input of the data converter RR1. The data converter RR1 outputs an OD2 output corresponding to the ID2 input to the D input of the flip-flop DF3.

The Q output from the flip-flop DF3 is input to the ID3 input of the data converter RR1. The data converter RR1 outputs an OD3 output corresponding to the ID3 input to the D input of the flip-flop DF4.

The Q output from the flip-flop DF4 is input to the ID4 input of the data converter RR1. The data converter RR1 outputs an OD4 output corresponding to the ID4 input to the D input of the flip-flop DF5.

The Q output from the flip-flop DF5 is input to the ID5 input of the data converter RR1. The data converter RR1 outputs an OD5 output corresponding to the ID5 input to the D input of the flip-flop DF6.

The Q output from the flip-flop DF6 is input to the ID6 input of the data converter RR1. The data converter RR1 outputs an OD6 output corresponding to the ID6 input to the D input of the flip-flop DF7.

The Q output from the flip-flop DF7 is input to the ID7 input of the data converter RR1. The data converter RR1 outputs an OD7 output corresponding to the ID7 input to the D input of the flip-flop DF8.

The Q output from the flip-flop DF8 is output as an SSVDO signal. The data converter RR1 receives 6-bit parallel signals SB (SB0 to SB5). The parallel signals SB are controlled by the CPU 208 (not shown) for controlling the printer 100 or the controller 200.

The clock inputs CK of the flip-flops DF1 to DF8 receive the 8CLK signal. The data converter RR1 receives the VCLK signal.

FIG. 52 shows the detailed circuit of the data converter RR1.

In FIG. 52, reference symbol BB denotes inverters; AA and AND1, AND gates; OR and OR1, OR gates; DF9, a D-type flip-flop; and PSM, a data generator.

Reference symbol RP1 denotes a decoder constituted by inverters BB and one AND gate AA. The decoder RP1 outputs an output signal PLS1 when ID0 to ID7 signals are ID0=0, ID1=0, ID2=0, ID3=0, ID4=1, ID5=1, ID6=0, and ID7=0. The signal PLS1 is input to the OR gate OR1 and the data generator PSM.

Reference symbol RP2 denotes a decoder constituted by inverters BB and another AND gate AA. The decoder RP2 outputs an output signal PLS2 when ID0 to ID7 signals are ID0=0, ID1=0, ID2=1, ID3=1, ID4=0, ID5=0, ID6=0, and ID7=0. The signal PLS2 is input to the OR gate OR1 and the data generator PSM.

Reference symbol RP3 denotes a decoder constituted by inverters BB and still another AND gate AA. The decoder RP3 outputs an output signal PLS3 when ID0 to ID7 signals are ID0=0, ID1=0, ID2=1, ID3=1, ID4=1, ID5=1, ID6=0, and ID7=0. The signal PLS3 is input to the OR gate OR1 and the data generator PSM.

At the Q output of the flip-flop DF9, a signal obtained by extracting a ⅛ pulse from the leading edge of the VCLK signal is obtained. This signal is logically ANDed with a signal output from the OR gate OR1 as an ORed result of the PLS1 to PLS3 signals by the AND gate AND1, and the AND gate AND1 generates a PSEL signal.

The data generator PSM receives the PLS1 to PLS3 signals, and also receives the SB0 to SB5 signals. The data generator PSM generates PM0 to PM7 signals (8 bits) according to a logic (to be described later), and inputs these signals to data selectors DM0 to DM7 each constituted by one inverter BB and two AND gates AA.

The data selector DM0 receives the PM0 signal and the ID0 signal. When the PSEL signal is "0", the selector DM0 selects the ID0 signal; when the PSEL signal is "1", it selects the PM0 signal, and outputs an output OD0.

The data selector DM1 receives the PM1 signal and the ID1 signal. When the PSEL signal is "0", the selector DM1 selects the ID1 signal; when the PSEL signal is "1", it selects the PM1 signal, and outputs an output OD1.

The data selector DM2 receives the PM2 signal and the ID2 signal. When the PSEL signal is "0", the selector DM2 selects the ID2 signal; when the PSEL signal is "1", it selects the PM2 signal, and outputs an output OD2.

The data selector DM3 receives the PM3 signal and the ID3 signal. When the PSEL signal is "0", the selector DM3 selects the ID3 signal; when the PSEL signal is "1", it selects the PM3 signal, and outputs an output OD3.

The data selector DM4 receives the PM4 signal and the ID4 signal. When the PSEL signal is "0", the selector DM4 selects the ID4 signal; when the PSEL signal is "1", it selects the PM4 signal, and outputs an output OD4.

The data selector DM5 receives the PM5 signal and the ID5 signal. When the PSEL signal is "0", the selector DM5 selects the ID5 signal; when the PSEL signal is "1", it selects the PM5 signal, and outputs an output OD5.

The data selector DM6 receives the PM6 signal and the ID6 signal. When the PSEL signal is "0", the selector DM6 selects the ID6 signal; when the PSEL signal is "1", it selects the PM6 signal, and outputs an output OD6.

The data selector DM7 receives the PM7 signal and the ID7 signal. When the PSEL signal is "0", the selector DM7 selects the ID7 signal; when the PSEL signal is "1", it selects the PM7 signal, and outputs an output OD7.

Prior to the detailed description of the operation of the data generator, pulse change patterns will be explained below with reference to FIGS. 54 to 56.

FIGS. 54-a, 55-b, and 56-a show patterns corresponding to one dot (equivalent to one dot at 300 dpi) of an SVDO signal (when the modulation pixel size is set to be ¼). In FIGS. 54 to 56, modulation pixels obtained by dividing one dot into four sections are represented by I, II, III, and IV in turn from the left.

FIG. 54-a shows a pattern having I=0, II=1, III=0, and IV=0. FIGS. 54b to e show various candidate patterns for changing the modulation pixel size to ⅛ in correspondence with the pattern shown in FIG. 54-a. Patterns ① to ⑨ shown in FIG. 54-b are patterns in each of which the pattern shown in FIG. 54-a is replaced with one pulse having a different pulse width. Patterns ① to ⑨ shown in FIG. 54-c are patterns in each of which the pattern shown in FIG. 54-a is replaced with two pulses. Patterns ① to ⑥ shown in FIG. 54-d are patterns in each of which the pattern shown in FIG. 54-a is replaced with three pulses. A pattern 1 shown in FIG. 54-e is a pattern in which the pattern shown in FIG. 54-a is replaced with four pulses.

Of these patterns, eight types of patterns ① to ⑧ shown in FIG. 60-b are assumed to be sampled.

FIG. 55-a shows a pattern having I=0, II=0, III=1, and IV=0. FIGS. 55-b to 55-e show various candidate patterns for changing the modulation pixel size to ⅛ in correspondence with the pattern shown in FIG. 55-a. Patterns ① to ⑨ shown in FIG. 55-b are patterns in each of which the pattern shown in FIG. 55-a is replaced with one pulse having a different pulse width. Patterns ① to ⑨ shown in FIG. 55-c are patterns in each of which the pattern shown in FIG. 55-a is replaced with two pulses. Patterns ① to ⑥ shown in FIG. 55-d are patterns in each of which the pattern shown in FIG. 55-a is replaced with three pulses. A pattern ① shown in FIG. 55E is a pattern in which the pattern shown in FIG. 55-a is replaced with four pulses.

Of these patterns, eight types of patterns ① to ⑧ shown in FIG. 59-b are assumed to be sampled.

Furthermore, FIG. 56-a shows a pattern having I=0, II=1, III=1, and IV=0. FIGS. 56b to e show various candidate patterns for changing the modulation pixel size to ⅛ in correspondence with the pattern shown in FIG. 56-a. Patterns ① to ⑨ shown in FIG. 56-b are patterns in each of which the pattern shown in FIG. 56-a is replaced with one pulse having a different pulse width. Patterns ① to ⑩ shown in FIG. 56-c are patterns in each of which the pattern shown in FIG. 56-a is replaced with two pulses. Patterns ① to ⑥ shown in FIG. 56-d are patterns in each of which the pattern shown in FIG. 56-a is replaced with three pulses. A pattern ① shown in FIG. 56-e is a pattern in which the pattern shown in FIG. 56-a is replaced with four pulses.

Of these patterns, eight types of patterns ① to ⑧ shown in FIG. 61-b are assumed to be sampled. FIG. 57 shows the operation logic of the data generator PSM for executing the pattern conversion shown in FIGS. 59 to 60.

FIG. 58 shows the operation logic of the data generator PSM for executing the pattern conversion shown in FIG. 61.

The output PLS1 from the decoder RP1 goes to "1" when a pattern (I=0, II=0, III=1, and IV=0) shown in FIG. 59-a is detected.

The output PLS2 from the decoder RP2 goes to "1" when a pattern (I=0, II=1, III=0, and IV=0) shown in FIG. 60-a is detected.

The output PLS3 from the decoder RP3 goes to "1" when a pattern (I=0, II=1, III=1, and IV=0) shown in FIG. 61-a is detected.

In FIG. 57, for example, when SB5=0, SB4=1, and SB3=1, if PLS3=0, PLS2=0, and PLS1=1, then PM7=0, PM6=0, PM5=0, PM4=1, PM3=0, PM2=1, PM1=0, and PM0=0 are output regardless of the values of SB2 to SB0. Thus, the pattern shown in FIG. 60-a is converted into a pattern ④ shown in FIG. 60-b.

If PLS3=0, PLS2=1, PLS1=0, then PM7=0, PM6=0, PM5=1, PM4=0, PM3=1, PM2=0, PM1=0, and PM0=0 are output, and the pattern shown in FIG. 59-a is converted into a pattern ④ shown in FIG. 59-b.

Figures 59A, 59B:
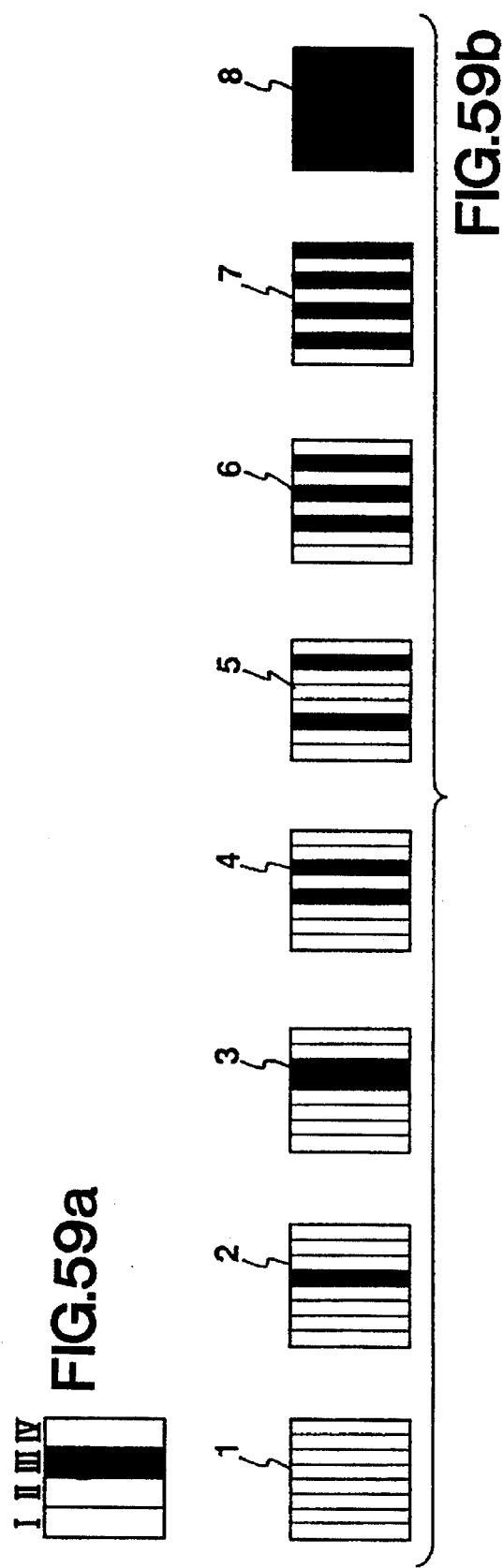
FIG. 59 is a view showing pattern conversion of this embodiment.
Figure 63A:
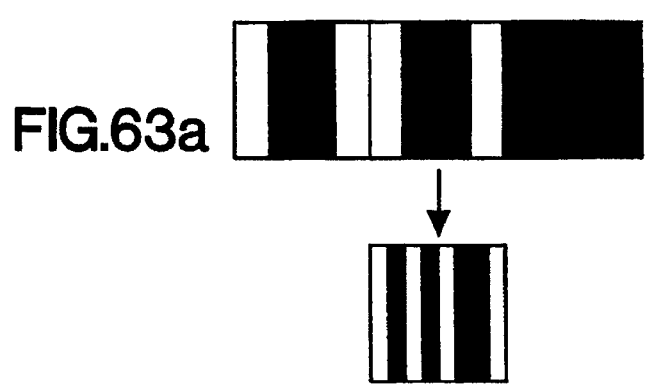
Figure 63B:
Figure 63C:
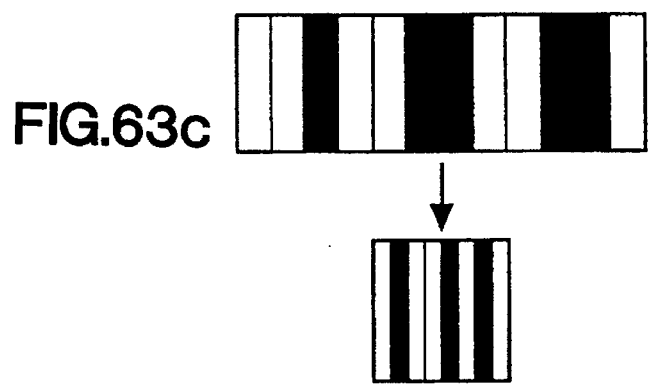
Figure 63D:

Similarly, when the values of SB5 to SB3 are selected, one of the patterns ① to ⑧ shown in FIG. 59b can be designated in correspondence with the pattern shown in FIG. 59-a, and one of the patterns ① to ⑧ shown in FIG. 60-b can be designated in correspondence with the pattern shown in FIG. 60-a.

In FIG. 58, for example, when SB2=0, SB1=1, and SB0=0, if PLS3=1, PLS2=0, and PLS1=0, then PM7=0, PM6=1, PM5=1, PM4=0, PM3=0, PM2=1, PM1=1, and PM0=0 are output regardless of the values of SB5 to SB3. Thus, the pattern shown in FIG. 61-a is converted into the pattern ③ shown in FIG. 61-b. Similarly, upon selection of the values of SB5 to SB3, one of the patterns ① to ⑧ shown in FIG. 61-b can be designated in correspondence with the pattern shown in FIG. 61-a.

According to this embodiment, first pulse signals that are already formed into pulses are received, and can be converted into second pulse signals having a smaller modulation pixel size than that of the first pulse signals according to the features of the pulses.

FIG. 62 shows change patterns when the modulation pixel size is set to be smaller, e.g., 1/16. In this case, a 16CLK signal having a frequency twice that of the 8CLK signal shown in FIG. 51 is used, and the number of D-type flip-flops DF1 to DF8 is doubled, i.e., 16 flip-flops are used, thus achieving the pattern conversion in the same manner as described above.

FIG. 63 shows another data conversion. FIG. 63 exemplify a case wherein three pixels are referred to, and a change pattern of the central pixel is determined according to the states of the three pixels.

This case can be realized by increasing the number of D-type flip-flops DF1 to DF8 in correspondence with three pixels (24 flip-flops) in the arrangement shown in FIGS. 51 and 52.

The signal processing circuit 205 and the pulse change circuit 207 may be integrated as a single IC package. However, if these circuits are prepared as separate IC packages, the signal processing circuit 205, which has a relatively large logic circuit keyboard, but does not relatively require a high-speed operation, can comprise a low-speed, inexpensive C-MOS logic IC, and the pulse change circuit 207, which has a relatively small logic circuit keyboard, but requires a relatively high-speed operation, can comprise a high-speed, relatively expensive BI-CMOS logic IC or ECL logic IC. Thus, a circuit arrangement having high cost performance can be realized as a whole.

When the above-mentioned pulse conversion function is used, the following conventional drawbacks can be eliminated.

When the select signals SB5 to SB0 are selected according to the toner particle size, in the case of a normal particle size toner (a toner particle size=10 to 12μ), the pattern ③ shown in FIG. 59B, the pattern ③ shown in FIG. 60B, or the pattern ③ shown in FIG. 61B is selected. In the case of a small particle size toner (a toner particle size=5 to 6μ), the pattern ⑥ shown in FIG. 59B, the pattern ⑥ in FIG. 60-b, or the pattern ④ shown in FIG. 61-b is selected. In this manner, as the toner particle size becomes smaller, the pulses are further segmented (the number of pulses is increased), so that the modulation pixels can be avoided from being developed to have a "whisker"-like pattern. Thus, the modulation pixels are printed to be "blurred", thereby preventing deterioration of smoothing printing quality, and maintaining high image quality.

When the printing dot density is switched between, for example, 240 dpi and 300 dpi, as shown in, e.g., FIG. 64, a change pattern is selected in correspondence with the printing dot density, so that high image quality can be maintained in correspondence with the printing dot density.

The printing dot density is switched as follows. In FIG. 50 described above, for example, the controller 200 transmits the switching command to the printer engine 100 through the serial signal, and the CPU 208, which received the command, and controls the printer engine 100, generates the SB signals corresponding to the printing dot density to be selected.

FIG. 64 is a view showing the flow of the smoothing processing for an almost horizontal black line having a one-dot width. FIG. 64-*a* shows a dot pattern before smoothing processing, and FIG. 64B shows a pattern subjected to the smoothing processing at the first modulation pixel size (¼ a dot).

The pattern shown in FIG. 64-*b* is converted into a pattern shown in FIG. 64-*c* at 240 dpi, and is converted into a pattern shown in FIG. 64-*d* at 300 dpi both as a pattern having the second modulation pixel size (⅛ a dot).

When the printing dot density is switched between 300 dpi and 600 dpi by a command, the circuit shown in FIG. 8 is used for 300 dpi, and the circuit shown in FIG. 18 (to be described later) is used for 600 dpi. In this case, the apparatus may have both the circuits, and can set an optimal pattern according to the printing dot density.

A case will be explained below wherein the printing density is changed.

In FIG. 50 described above, the controller 200 transmits a printing density change command to the printer 100 through the serial signals. Upon reception of the density change command, the CPU 208, which controls the printer 100, performs a density change operation in an electrophotography process (e.g., changes the developing bias voltage according to a designated density), and at the same time, generates the SB signals according to the density. For example, in each of FIGS. 59-*b*, 60-*b* and 61-*b*, patterns are sequentially selected in the order from ① to ⑧ as the density becomes lower. Contrary to this, as the density becomes higher, patterns are sequentially selected in the order from ⑧ to ①. Thus, a uniform density of a smoothing processing portion can be maintained, and high image quality can also be maintained.

In the above case, the density is changed in response to a command from the controller. Alternatively, information of a dot density change means such as a volume, operated by a user, at an operation unit of the printer 100 may be input, and may be fetched by the CPU 208. The CPU 208 may change SB signals according to the input information to select a pattern.

Furthermore, a thermistor or a humidity sensor may be connected to the input port of the CPU 208 for controlling the printer engine 100, and a signal from the thermistor or the humidity sensor may be fetched by the CPU 208 as A/D-converted data. The CPU 208 may change SB signals in correspondence with a value uniform density of a smoothing processing portion can be maintained, and high image quality can also be maintained.

(Another Embodiment)

Another embodiment according to the present invention will be described below. In this embodiment, when a controller transmits image data of 300 dpi in both the main scanning an subscanning directions to a printer engine having a printing function of 600 dpi in the subscanning direction, the printer engine prints the image data equivalently at 1,200 dpi in the main scanning direction, and equivalently at 600 dpi in the subscanning direction.

Figure 17:
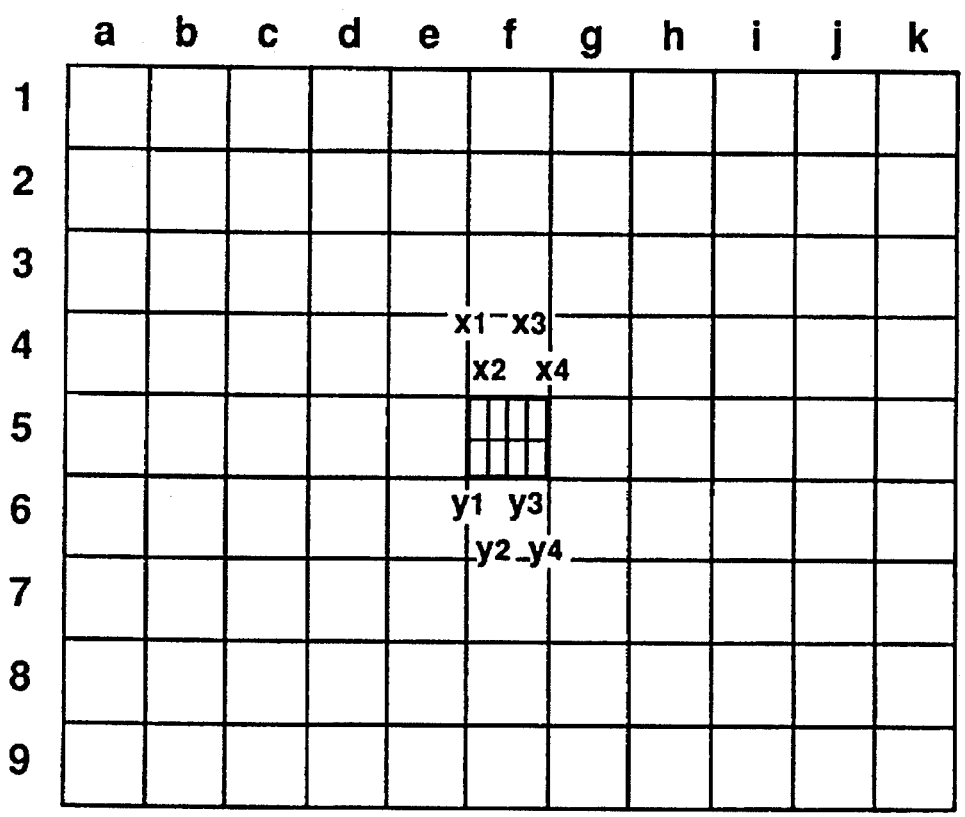
FIG. 17 is a view showing another embodiment of the present invention wherein a pixel of interest is divided in four sections in the main scanning direction, and is divided into two sections in the subscanning direction.

FIG. 17 shows the way of dividing small pixel sections for printing a pixel of interest in this embodiment.

In this embodiment, in FIG. 17, a pixel of interest (5*f*) at the central portion of a dot-matrix memory consisting of 11 dots in the main scanning direction×9 dots in the subscanning direction at 300 dpi is changed to image determined by a set of small pixel sections (x1, x2, x3, x4, y1, y2, y3 and y4) at a printing dot density four times in the main scanning direction× twice in the subscanning direction, and the changed image data is printed.

In this embodiment, the features of image data transmitted from the controller in a surrounding region (11 pixels in the main scanning direction×9 pixels in the subscanning direction) around the pixel of interest are checked, and the pixel of interest is changed according to the checking result.

More specifically, when a pixel of interest of dot data of, e.g., an English letter "a" at a resolution of 300 dpi shown in FIG. 6 is to printed, dot data in a region (11 pixels in the main scanning direction×9 pixels in the subscanning direction=99 pixels) surrounding the pixel of interest are stored in a temporary storage means. Thereafter, the features of the dot data in the region are checked, and data of the pixel of interest to be printed is changed according to the features. Then, the changed data is printed.

In this case, data is changed, so that the edge portion of a figure constituted by dots can be smoothly printed. In this embodiment, as shown in FIG. 17, the pixel of interest is constituted by small pixel sections (x1, x2, x3, x4, y1, y2, y3 and y4) obtained by dividing a pixel into four sections in the main scanning direction and into two sections in the subscanning direction. Therefore, data is equivalently printed at a printing dot density of 1,200 dpi in the main scanning direction×600 dpi in the subscanning direction.

Figure 18:
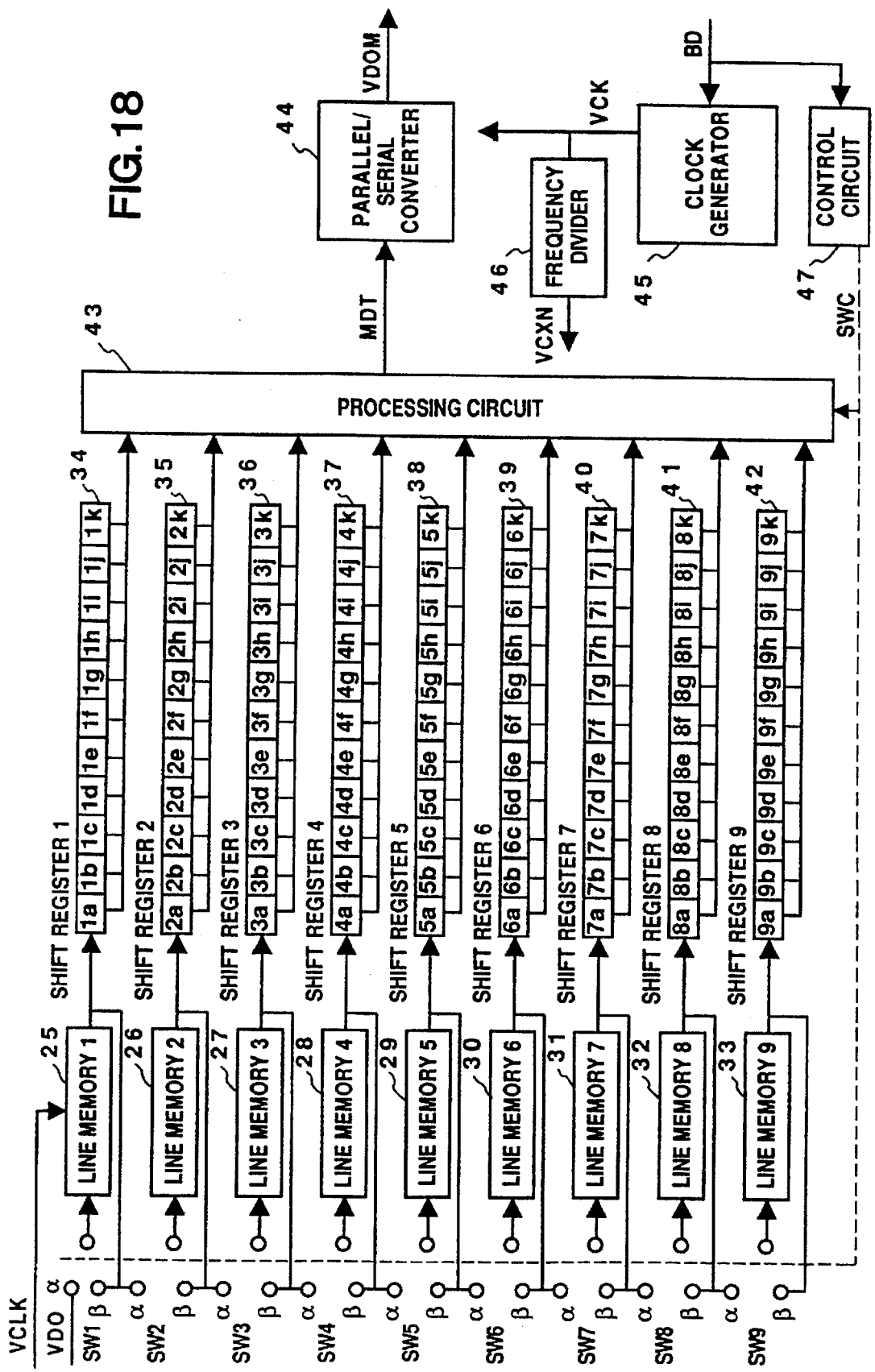
FIG. 18 is a block diagram showing a circuit for dividing a pixel of interest in the main scanning and subscanning directions, and performing smoothing processing according to the embodiment shown in FIG. 17.

FIG. 18 is a diagram showing circuit blocks of a VDO signal processor 101, arranged in an input unit of a 600-dpi printer, for performing smoothing processing, and corresponds to FIG. 8 described in the first embodiment. The same reference numerals in FIG. 18 denoted the same devices as in FIG. 8.

In FIG. 18, reference symbols SW1 to SW9 denote switch means. Each switch means is switched between positions "α" and "β" in FIG. 18 to switch a signal to be input to a corresponding one of line memories 1 to 9 (25 to 33). The switching position of each switch means is controlled by a control signal SWC generated by control circuit 47 (to be described below).

The control circuit 47 receives a sync signal BD', corresponding to 600 dpi in the subscanning direction, for performing a 600-dpi printing operation, and every time the circuit 47 receives the sync signal BD', it generates the control signal SWC, which is inverted in synchronism with the signal BD'. A sync signal BS for interfacing with the controller is generated as a signal obtained by thinning out the sync signal BD' in units of main scanning lines, and corresponding to 300 dpi in the subscanning direction.

The switch means SW1 to SW9 are set at the positions "α" in an initial state. The controller transmits image data VDO of 300 dpi in synchronism with a BD signal. The line memories 1 to 9 (25 to 33) store the image signals VDO of 300 dpi while sequentially shifting them in synchronism with a clock signal VCLK. The line memories 1 to 9 (25 to 33) store dot data having a main scanning length in correspondence with a page to be printed.

The line memories 1 to 9 (25 to 33) are coupled in the order of the line memory 1→the line memory 2→the line memory 3→ ... →the line memory 9, and store dot data having a main scanning length for 9 lines with respect to the subscanning direction.

Thereafter, the switch means SW1 to SW9 are switched to the position "β" side according to the control signal SWC generated by the control circuit 47. Reference numerals 34 to 42 denote shift registers 1 to 9. The shift registers 1 to 9 (34 to 42) respectively correspond to the line memories 1 to 9 (25 to 33), and receive outputs from the corresponding line memories (25 to 33) in synchronism with a clock signal VCKN. At this time, data output from the line memories 1 to 9 are re-input to the line memories 1 to 9 through the switch means SW1 to SW9.

Each of the shift registers (34 to 42) has an 11-bit arrangement. As shown in FIG. 18, the shift registers constitute a dot-matrix memory (1a to 1k, 2a to 2k, 3a to 3k, . . . , 9a to 9k, i.e., 11 dots in the main scanning direction×9 lines in the subscanning direction).

Of the matrix memory, a dot 5f at the central portion is defined as a dot of a pixel of interest. Reference numeral 43 denotes a processing circuit for detecting the feature of data stored in the dot-matrix memory for smoothing, and changing the pixel of interest 5f as needed. The processing circuit 43 receives the bits (1a to 9k, i.e., a total of 99 bits) from the shift registers 1 to 9 (34 to 42), and outputs parallel signals MDT (x1, x2, x3 and x4) corresponding to the changed pixel.

The parallel signals MDT (x1, x2, x3 and x4) are input to a parallel/serial converter 44. The parallel/serial converter 44 converts the input parallel signals MDT (x1, x2, x3 and x4) into serial signals VDOM, and causes a laser driver 50 to drive a semiconductor laser 51. Similarly, processing for one main scanning line is sequentially performed.

Thereafter, the switch means SW1 to SW9 are switched to the position "α" side. In synchronism with the sync signal BD' input at the next timing, data are similarly read out from the line memories 1 to 9 (25 to 33), and the readout data are shifted to the next line memories. In addition, the read-out data are output to the shift registers 1 to 9. The processing circuit 43 detects the feature of data stored in the dot-matrix memory of 11 dots in the main scanning direction×9 dots in the subscanning direction constituted by the shift registers, changes the pixel of interest 5f as needed, and outputs parallel signals MDT (y1, y2, y3 and y4). The parallel/serial converter 44 converts the input parallel signnals MDT (y1, y2, y3 and y4) into serial signals VDOM, and drives the semiconductor laser 51 through the laser driver 50. Similarly, processing for one main scanning line is sequentially performed.

Thereafter, the switch means SW1 to SW9 are switched to the position "α" side. Then, image signals VDO of the next subscanning line of 300 dpi transmitted from the controller are input.

In this embodiment, the parallel signals consist of 4 bits, as described above. Accordingly to the sync signal BD', the first MDT signals (x1, x2, x3 and x4), and the second MDT signals (y1, y2, y3 and y4) are alternately output. Reference numeral 45 denotes a clock generator, which receives the BD' signal as a main scanning sync signal, and generates a clock signal VCK as a clock signal synchronized with the BD' signal. The clock signal VCK has a frequency twice a clock frequency twice a clock frequency $f_0$ necessary for performing recording at 600 dpi in the main scanning direction.

In synchronism with the clock signal VCK, the serial signals VDOM (x1, x2, x3, and x4 or y1, y2, y3, and y4) are sequentially output. Reference numeral 46 denotes a frequency divider for receiving the clock signal VCK, and frequency-dividing the input clock signal with 2 to generate a clock signal VCKN having the frequency $f_0$. The clock signal VCKN is used as a sync clock when dot data are fetched from the above-mentioned dot matrix memory to the processing circuit 43.

Of the processing circuit 43, a feature extraction circuit portion has the same circuit arrangement shown in FIGS. 13, 14, and 29 to 32 described in the first embodiment.

Figure 19:
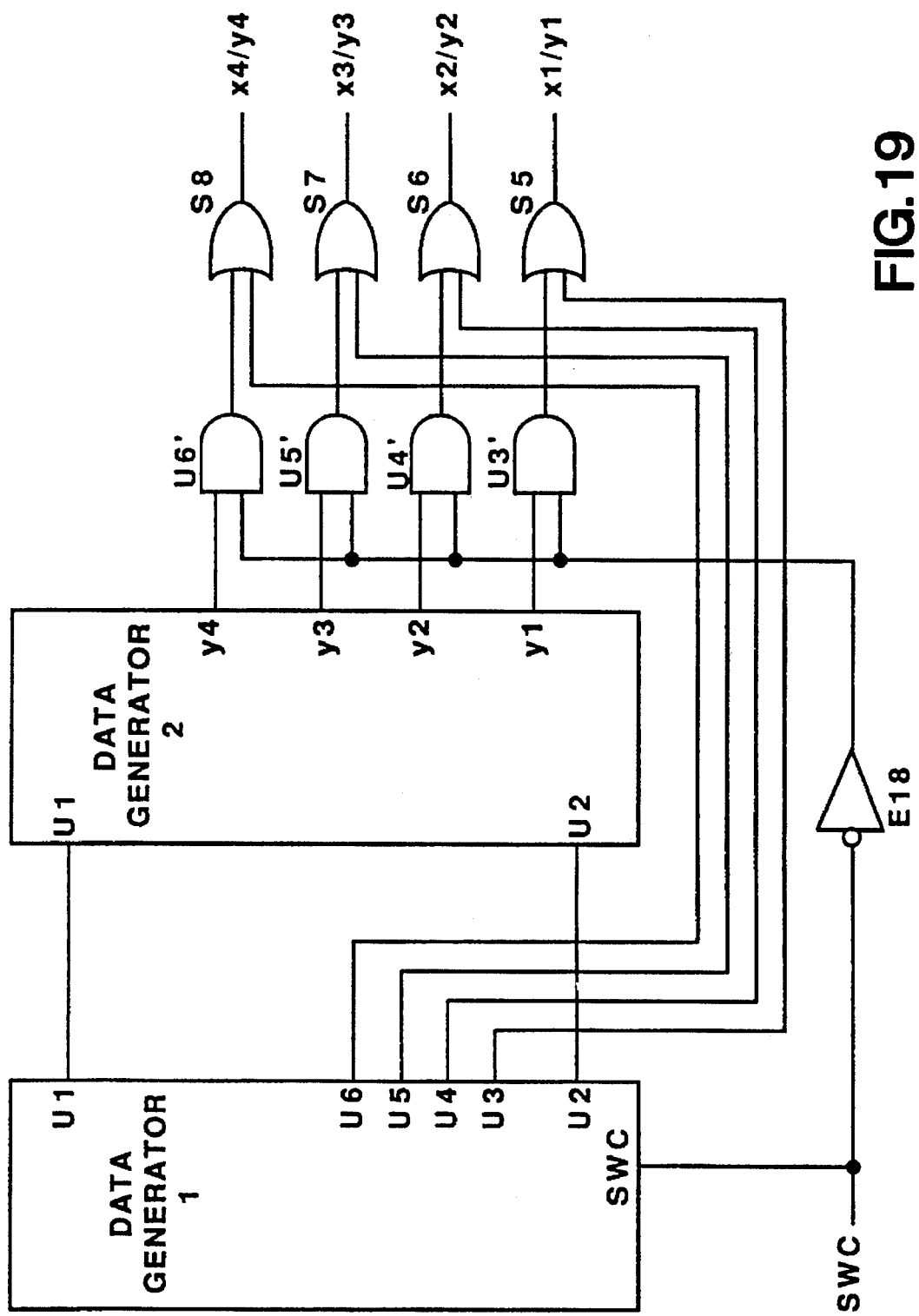
FIG. 19 is a diagram showing a circuit of a feature extraction unit according to the embodiment shown in FIG. 17.
Figure 20:
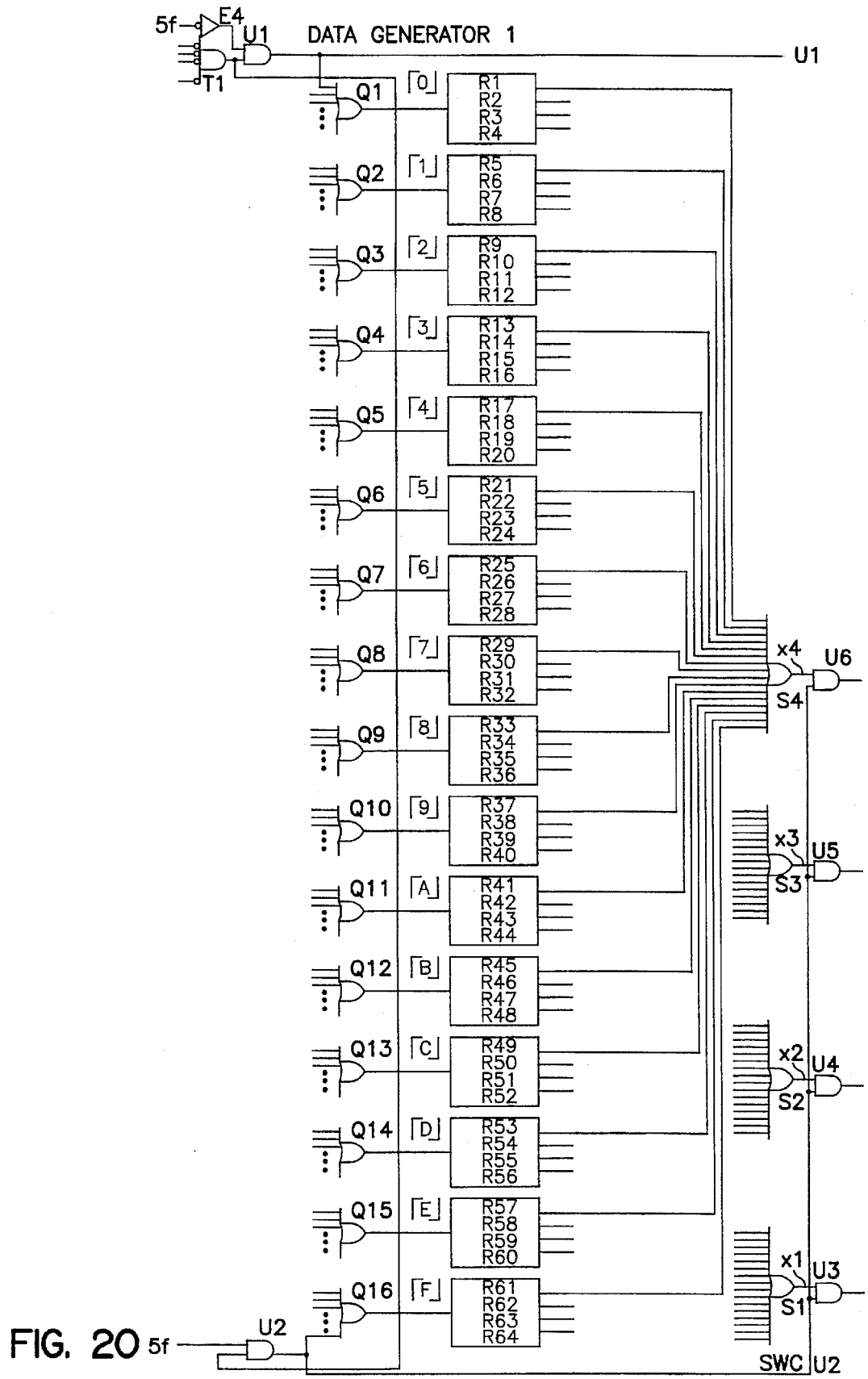
FIG. 20 is a diagram showing in detail a data generator 1 in FIG. 19.
Figure 21:
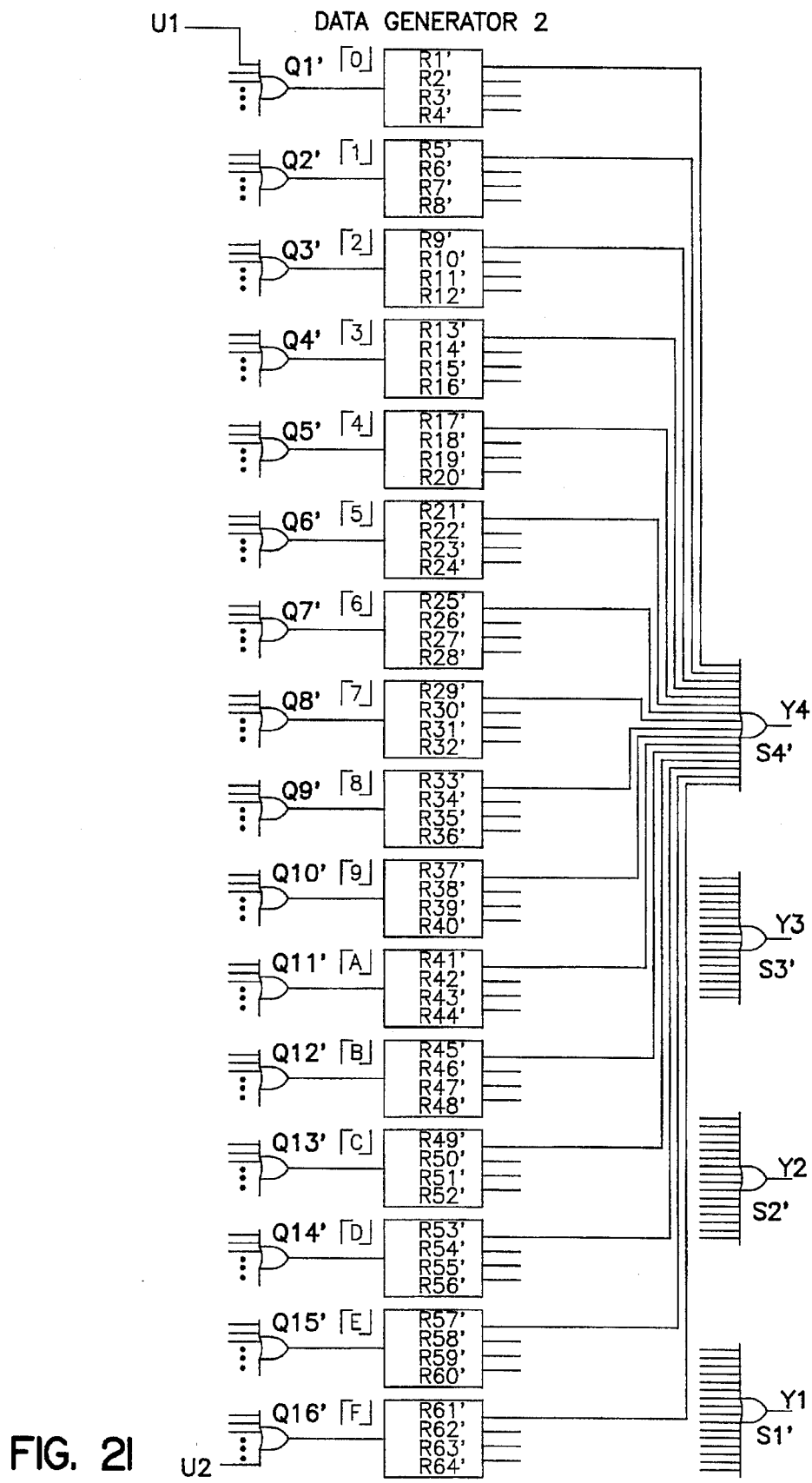
FIG. 21 is a diagram showing in detail a data generator 2 in FIG. 19.

Of the processing circuit 43, a data generation circuit used in this embodiment is shown in FIGS. 19 to 21.

The same reference numerals in FIGS. 19 to 21 denote devices having the same functions as in FIGS. 15 and 16. FIG. 20 shows in detail a data generator 1, and FIG. 21 shows in detail a data generator 2.

FIGS. 19, 20, and 21 show a data generation circuit for generating data of a pixel of interest 5f according to the detected feature of data. In FIGS. 19 to 21, reference symbols Q1 to Q16, and Q1' to Q16' denote OR gates; R1 to R61, R1' to R64', U1 and U2, 2-input AND gates; S1 to S4, S1' to S4', and S5 to S8, 16-input OR gates; E4 and E18, inverters; and T1, a NOR gate.

When the first MDT signals described in FIG. 18 are generated, the control signal SWC output from the control circuit 47 is set at "1" level. In this state, the 2-input AND gates U3 to U6, and U3' to U6', and the 2-input OR gates S5 to S8 select the data generator 1, and parallel signals x1, x2, x3, and x4 are output.

When the second MDT signals described in FIG. 18 are generated, the control signal SWC output from the control circuit 47 is set at "0" level. In this state, the 2-input AND gates U3 to U6, and U3' to U6', and the 2-input OR gates S5 to S8 select the data generator 2, and parallel signals y1, y2, y3, and y4 are output.

Each of the output signals from feature detection circuits corresponding to a plurality of patterns is connected to one of the OR gates Q1 to Q16 so as to select output data x1 to x4, and is also connected to one of the OR GATES Q1' to Q16' so as to select output data y1 to y4.

The output data x1 to x4 from the data generation circuit cause the known serial/parallel converter 44 to generate signals VDOM which are output in the order of x1, x2, x3 and x4 in synchronism with the clock signal VCK. The output data y1 to y4 similarly cause the parallel/serial converter 44 to generate signals VDOM which are output in the order of y1, y2, y3 and y4 in synchronism with the clock signal VCK. The VDO signals drive the semiconductor laser through the laser driver.

The above-mentioned algorithm can be similarly applied to the printer engine of 600 dpi.

First pulses including the output data x1, x2, x3 and x4, and the output data y1, y2, y3 and y4 are input to the above-mentioned pulse change circuit, and the data arrangements are collated. When a coincidence with a predetermined pattern is found, the input pulses are replaced with 1/integer pixels as data having a smaller modulation pixel size than the modulation pixel size, like x1→x1', x1", x2→x2', x2", x3→x3', x3", x4→x4', x4", y1→y1', y1", y2→y2', y2", y3→y3', y3", y4→y4', y4", thus changing the modulation pixel size.

As described above, according to this embodiment, since two or more types of modulation pixel unit sizes are prepared, the apparatus can cope with a smoothing circuit corresponding to toners having a plurality of toner particle sizes. Furthermore, only a circuit portion for determining a modulation pixel unit size is arranged as an IC separate from the IC of a pattern reference circuit portion. Thus, only the circuit portion for determining the modulation pixel unit size, which option requires a logic having a higher speed than the pattern reference circuit portion can comprise a high-speed logic.

Since algorithms suitable for respective printing dot densities are provided, the algorithms can be switched upon switching of the printing dot densities.

Since a plurality of algorithms corresponding to respective densities are provided, the algorithms cam be switched according to a change in density.

The temperature or humidity is detected, and a corresponding one of a plurality of predetermined algorithms can be selected.

As described above, according to this embodiment, techniques effective for performing smoothing processing with high image quality can be provided.

As described above, according to the present invention, the feature of a dot pattern of a wide surrounding region of a pixel of interest is extracted, and the pixel of interest is changed according to the extracted feature. An almost horizontal or vertical edge portion can be detected by a simple logic circuit and optimal smoothing correction can be performed according to the curvature of the edge portion. Furthermore, the changed pixel signal is changed to another pixel signal, so that smoothing processing with high image quality can be performed in correspondence with a change in type of toner, resolution, or environment.

(Still Another Embodiment)

The present invention is not limited to the above embodiments. When a printer can switch the resolution, an arrangement for switching a smoothing method upon switching of the resolution of the printer is provided, so that a high-quality image output can be obtained at a each resolution.

Still another embodiment of the present invention will be described below.

Figure 65:
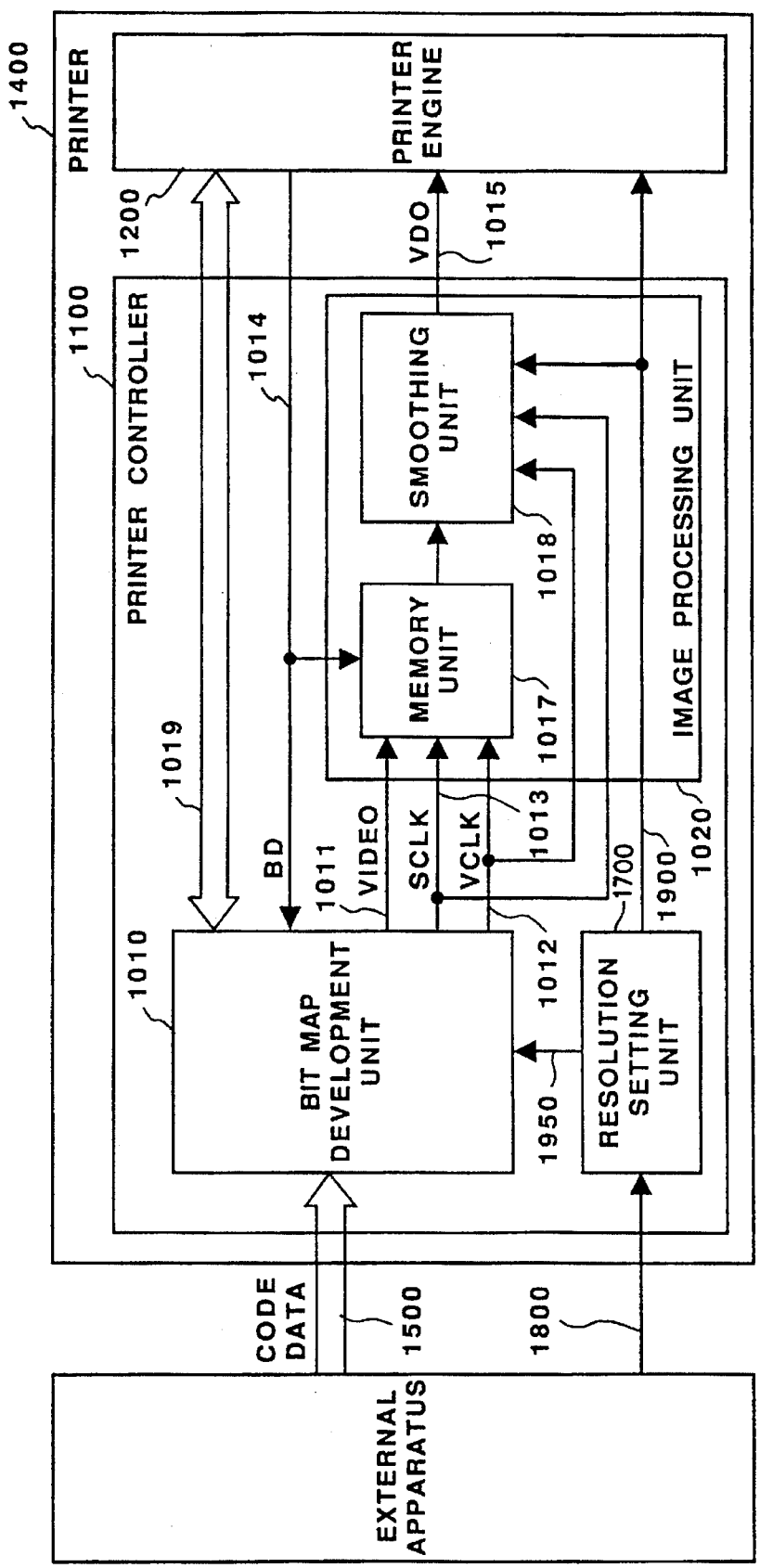
FIG. 65 is a block diagram showing still another embodiment of the present invention.

FIG. 65 is a block diagram for explaining still another embodiment of the present invention.

In FIG. 65, reference numeral 1300 denotes an external apparatus such as a personal computer; 1400, a printer such as a laser beam printer; 1500, code data generated by the external apparatus 1300; 1100, a printer controller; and 1200, a printer engine.

Reference numeral 1010 denotes a bit map development unit for receiving the code data 1500, and generating a bit map on the basis of the code data; and 1019, communication signals (e.g., horizontal sync signals) exchanged between the bit map development unit 1010 and the printer engine 1200. Reference numeral 1020 denotes an image processing unit for performing image processing such as smoothing for the bit map generated by the bit map development unit.

Figure 66:
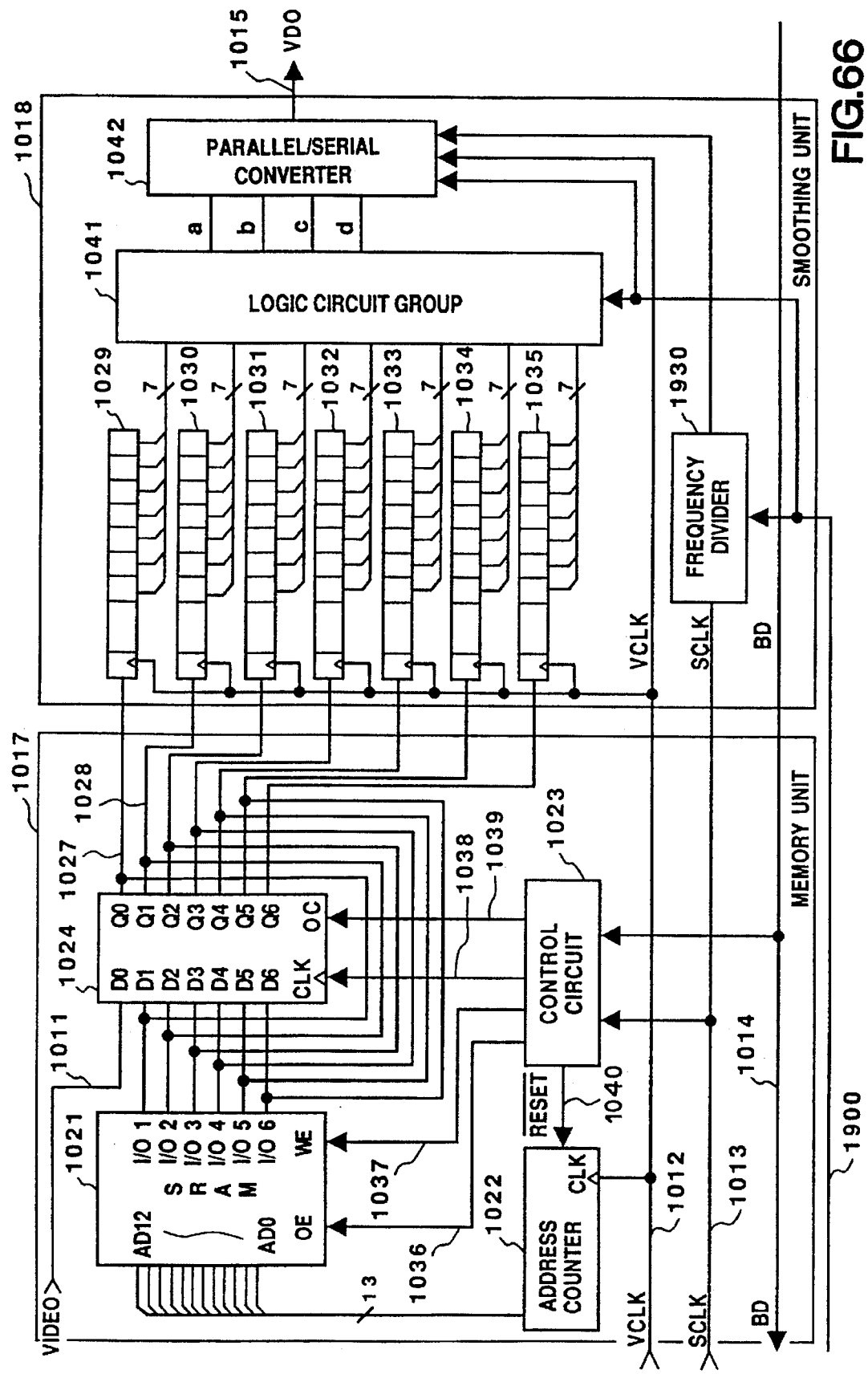
FIG. 66 is a diagram showing in detail the arrangement of an image processing unit shown in FIG. 65.

FIG. 66 shows the detailed arrangement of the image processing unit 1020 constituted by a memory unit 1017 and a smoothing unit 1018 shown in FIG. 65.

In FIG. 66, the bit map development unit 1010 outputs a video signal VIDEO 1011 in synchronism with an image clock VCLK 1012 of 300 dpi, and a system block SCLK 1013 having the same phase as the clock VCLK 1012, and a frequency eight times that of the clock VCLK.

The video signal 1011 is connected to one input terminal "D0" of a tristate latch buffer 1024. An output $Q_0$, corresponding to "D0", of the tristate latch buffer 1024 is output to the input terminal of a shift register 1029, and is also output to a data pin I/O1 of an SRAM 1021. The address terminals of the SRAM 1021 are connected to 13 address lines supplied from an address counter 1022.

A read signal 1036 and a write signal 1037 of the SRAM 1021, a latch signal 1038 and an output enable signal 1039 of the tristate latch buffer 1024, and a clear signal 1040 of the address counter 1022 are generated by a control circuit 1023. These signals will be described in detail later.

The control circuit 1023 generates a plurality of states in response to the clocks SCLK during one period of the image clock VCLK. The clock SCLK is a clock signal having a frequency eight times that of the clock VCLK. In this embodiment, eight steps can be executed during one period of the image clock VCLK.

Figure 67:
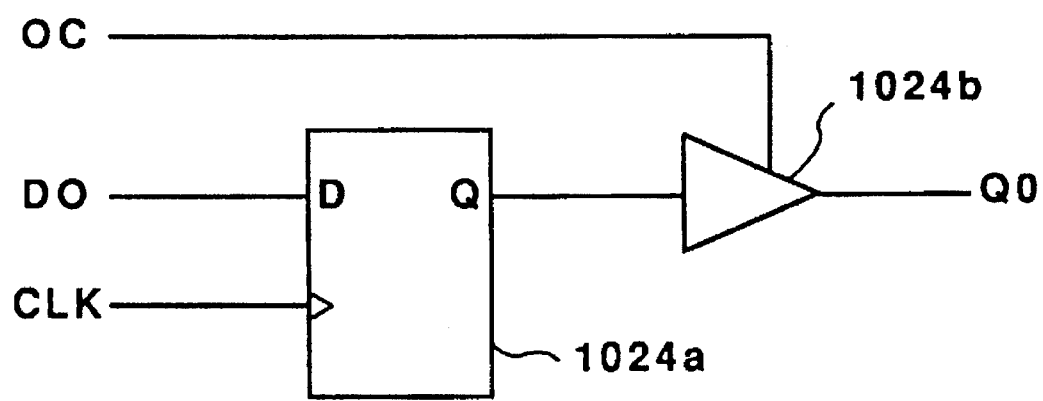
FIG. 67 is a view for explaining a tristate latch buffer of the first embodiment.

Note that the tristate latch buffer 1024 comprises a latch 1024a and a buffer 1024b, as shown in FIG. 67 (FIG. 67 illustrates only an arrangement corresponding to one bit).

The operation of the SRAM and its peripheral circuits will be described below with reference to the timing chart shown in FIGS. 68(1) to 68(12). In the following description, nth pixel data is represented by data(n), and an address at a which the data is stored is represented by adr(n).

Figure 68:
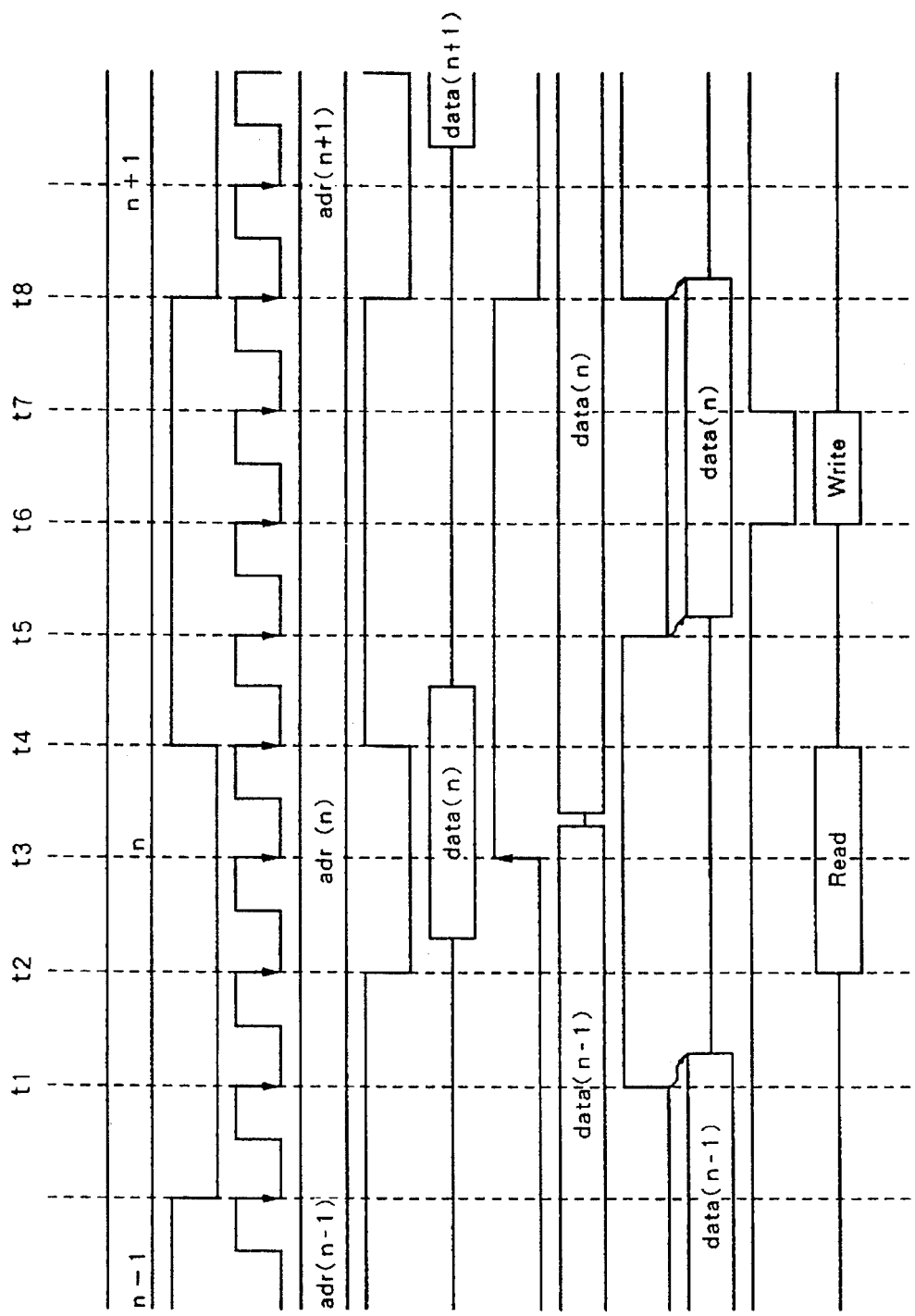
FIG. 68 is a timing chart showing an image processing operation of the embodiment shown in FIG. 65.

When the first clock is input (time t1) after the image clock VCLK shown in FIG. 68(2) goes to low level, an enable signal OC of the tristate buffer latch 1024 goes FALSE (FIG. 68(9)), the buffer 1024a is set in a high-impedance state, and the output previous data {data(n−1)} is stopped (FIG. 68(10)). Thus, no data is input to the data bus of the SRAM 1021.

When the second clock is input (time t2), an OE signal goes TRUE (FIG. 68(5)), the SRAM 1021 is set a read state (FIG. 68(12)), and data (data(n)) stored at an address adr(n) is output onto the data bus.

When the third clock is input (time t3), the data (data(n)) output onto the data bus is latched by the tristate latch buffer 1024 (FIG. 68(7)). However, since the output enable signal OE shown in FIG. 68(9) is kept FALSE, the latched data is not output outside the tristate latch buffer 1024. For this reason, no bus collision occurs in the above-mentioned operations.

When the fourth clock is input (time t4), the output enable signal OE of the SRAM 1021 goes FALSE, and the SRAM 1021 is set in a floating state. When the fifth clock is input (time t5), the output enable signal OC of the tristate latch buffer 1024 goes TRUE, and the latched data (data(n)) is output to the SRAM 1021. However, since the write enable signal WE 1037 shown in FIG. 68(11) is FALSE, the data is not written in the SRAM 1021.

When the sixth clock is input (time t6), the write enable signal WE of the SRAM 1021 goes TRUE, and data(n) is written in a memory 1062. When the seventh clock is input, the write enable signal WE goes FALSE, thus ending the write operation.

When the eighth clock is input, the address is updated from adr(n) to adr(n+1), and a series of operations for data of a given pixel are completed. Such operations are similarly and simultaneously performed for the tristate latch buffer 1024 and the SRAM 1021.

In this manner, data output from the data pin D2 of the SRAM 1021 are written in D3 at the same address during one cycle of the image clock VCLK, and when data are sequentially sent, image data for seven lines are always stored in the SRAM. Thus, the SRAM supplies image data to the shift registers 1029 to 1035.

Each of the shift registers 1029 to 1035 has a 7-bit bit length. The shift registers serial/parallel-convert the image data for seven lines sent from the buffer 1024 to develop them in units of 7 dots in the main scanning direction, and outputs image data of a total of 49 dots to a logic circuit group 1041.

Figure 69:
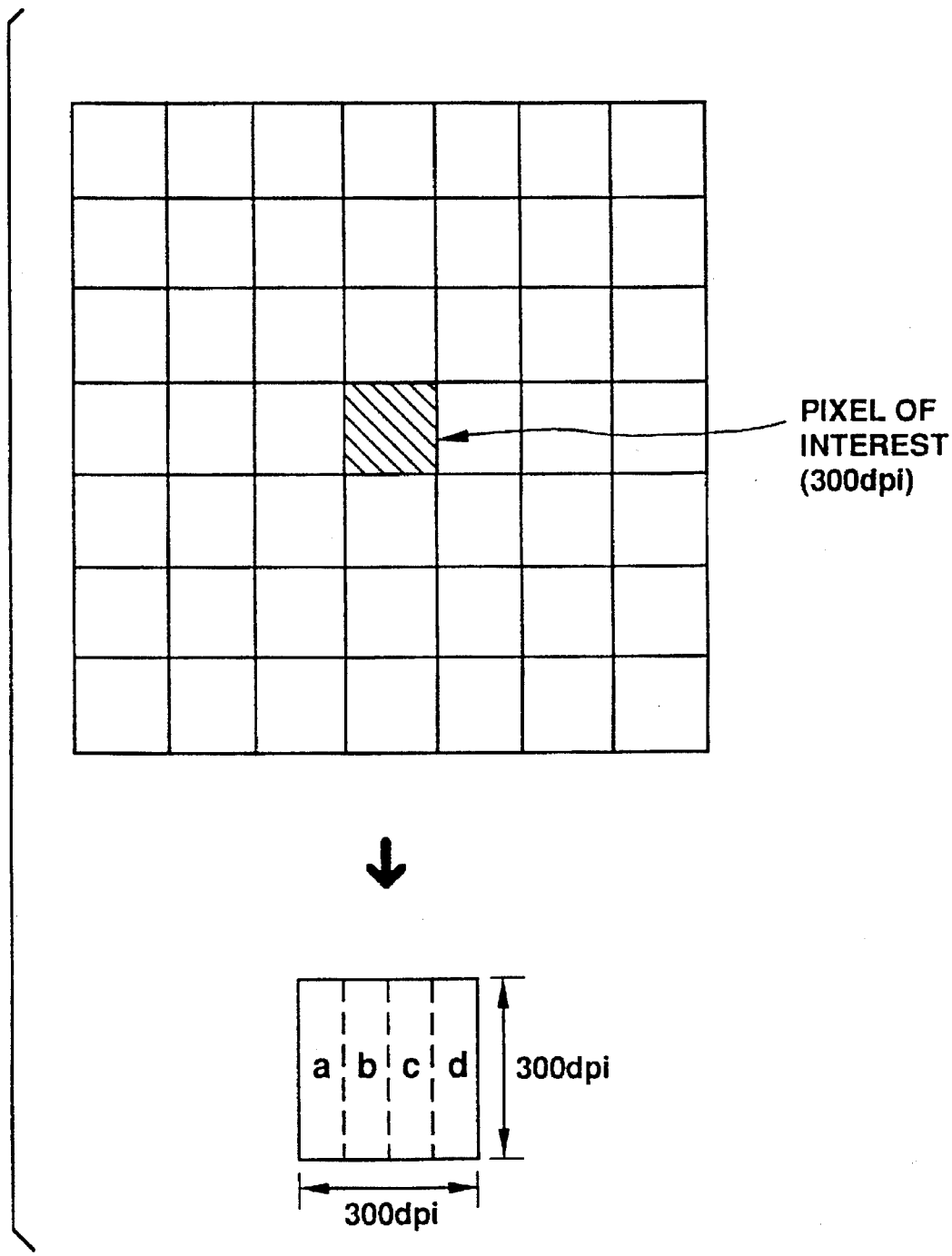
FIG. 69 is a view for explaining smoothing processing executed when a pixel at a resolution of 300 dpi is divided according to the embodiment shown in FIG. 65.

The logic circuit group 1041 performs image processing shown in FIG. 69 for the input 49-bit data. In FIG. 69, reference symbol a denotes logic 1; b, logic 2; c, logic 3; and d, logic 4.

As shown in FIG. 69, the (logic 1) to (logic 4) are respectively assigned to sections a to d obtained by dividing a pixel of interest into four sections for a total of 49 dots including the pixel of interest (hatched portion).

The sections a to d are determined as sections to be printed or sections not to be printed according to the (logic 1) to (logic 4) for the purpose of performing the smoothing processing.

The logics 1 to 4 are logics for the purpose of performing the smoothing processing, and are developed under the following conditions:

A portion having a right angle or an angle of 135° is left unchanged.

The number of dots to be deleted coincides with the number of dots to be added so as not to change the density.

The corner portion of an acute-angle portion is prevented from being rounded.

Dots are added to or deleted from an oblique line according to the inclination of the line.

The pixel of interest whose printing sections are determined by the logics 1 to 4 based on the above-mentioned conditions is input to a parallel/serial converter 1042 as a 4-bit signal (1 bit corresponds to each of the sections a to d). The parallel/serial converter 1042 outputs a signal VDO 1015 in synchronism with a clock SCLK 1013 frequency-divided with 2 by a frequency divider 1930, i.e., a clock having a frequency four times that of the clock VCLK 1012. The printer turns on/off a laser on the basis of the image data VDO 1015, thus performing the printing operation.

The one-pixel four-division smoothing operations performed when the resolution is 300 dpi have been described. An operation for switching the smoothing algorithms upon switching of the resolution will be described below.

In the switching operation of the smoothing algorithm, as shown in, e.g., FIG. 70, smoothing processing is performed by dividing one pixel into four sections when the resolution is 300 dpi, while smoothing processing is performed by dividing one pixel into two sections when the resolution is 600 dpi.

In FIG. 65, the external apparatus 1300 designates a resolution in a resolution setting unit 1700 through a signal line 1800. For example, when 600 dpi is designated, the resolution setting unit 1700 designates the bit map development unit 1010 to perform image development for dpi through a signal line 1950. A generator (not shown) for generating the clock VCLK 1012 in the bit map development unit 1010 generates a clock having a frequency four times the image clock VCLK for 300 dpi in response to the designation through the signal line 1950. A generator (not shown) for generating the clock SCLK 1013 in the bit map development unit 1010 also generates a clock having a frequency four times that of the system clock SCLK for 300 dpi.

Furthermore, the resolution setting unit 1700 sends a command for performing a 600-dpi printing operation to the printer engine 1200 through a signal line 1900, and also sends this command to the smoothing unit 1018. The frequency divider 1930 in the smoothing unit 1018 divides the clock SCLK 1013 with 4 so as to output signals VDO 1015 as signals obtained by dividing a 600-dpi pixel into two section. 2-bit signals are output to the parallel/serial converter 1042 through signal lines a and b.

Figure 71:
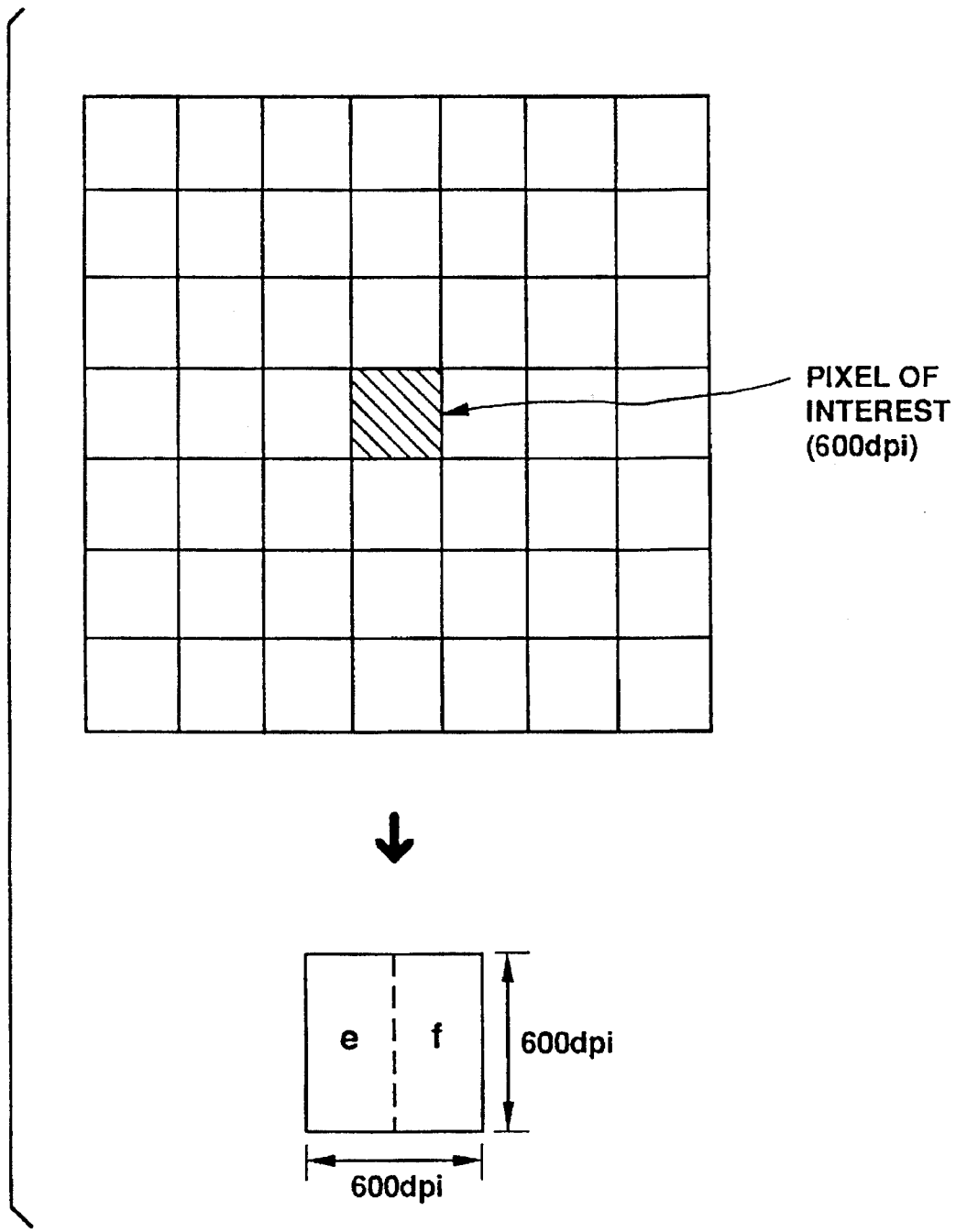
FIG. 71 is a view for explaining smoothing processing executed when a pixel at a resolution of 600 dpi is divided according to the embodiment shown in FIG. 65.

Even when the resolution is set to be 600 dpi, as shown in FIG. 71, smoothing processing is performed by applying the smoothing logics used for 300 dpi (e.g., the logic 1 for a section e and the logic 4 for a section f) for surrounding pixels of 7 dots in the main scanning direction×7 lines in the subscanning direction including the pixel of interest, i.e., a total of 49 dots.

Figure 72:
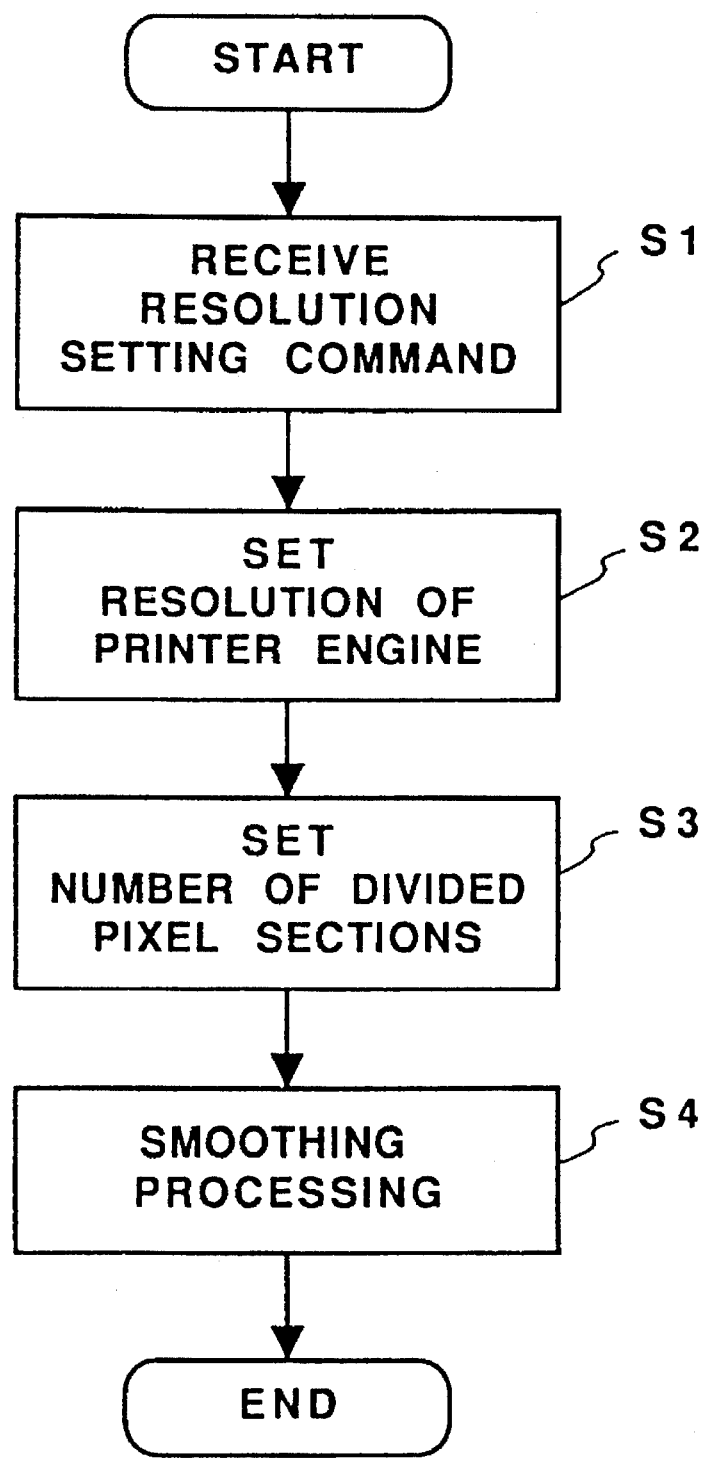
FIG. 72 is a flow chart for explaining image processing of the embodiment shown in FIG. 65.

The schematic operation of this embodiment will be described below with reference to the flow chart shown in FIG. 72.

In step S1, the resolution setting unit 1700 in the printer 1400 receives a resolution setting command from the external apparatus 1300. In step S2, the resolution setting unit 1700 sets the designated resolution in the printer engine 1200 according to the received solution setting command. In step S3, the number of divided sections per pixel is set on the basis of the set resolution. Parallel to the processing in step S3, clock frequencies are set according to the designated resolution. In step S4, bit map development based on code data sent from the external apparatus 1300, and smoothing processing according to the smoothing logics are performed.

In this embodiment, when the resolution is 300 dpi, one pixel is divided into four sections, and when the resolution is 600 dpi, one pixel is divided into two sections. However, the present invention is not limited to these resolutions and numbers of divided pixel sections.

Needless to say, the present invention is not limited to a specific number of reference surrounding pixels for performing smoothing processing. In addition, in this embodiment, the image processing unit 1020 is arranged in the printer controller 1100, but may be arranged in the printer engine 1200 side.

As described above, according to this embodiment, when the resolution is switched, the number of divided sections per pixel is converted in correspondence with the resolution. That is, the number of divided pixel sections is optimized according to the switched resolution to perform optimal smoothing processing. Thus, a high-quality image output can be obtained at the selected resolution.

In the embodiment described above, when the resolution is switched, the number of divided sections per pixel is converted in correspondence with the resolution. However, the present invention is not limited to the above embodiment. For example, the smoothing logics may be converted when the resolution is switched.

An embodiment for converting smoothing logics upon switching of the resolution will be described below with reference to the accompanying drawings.

Figure 73:
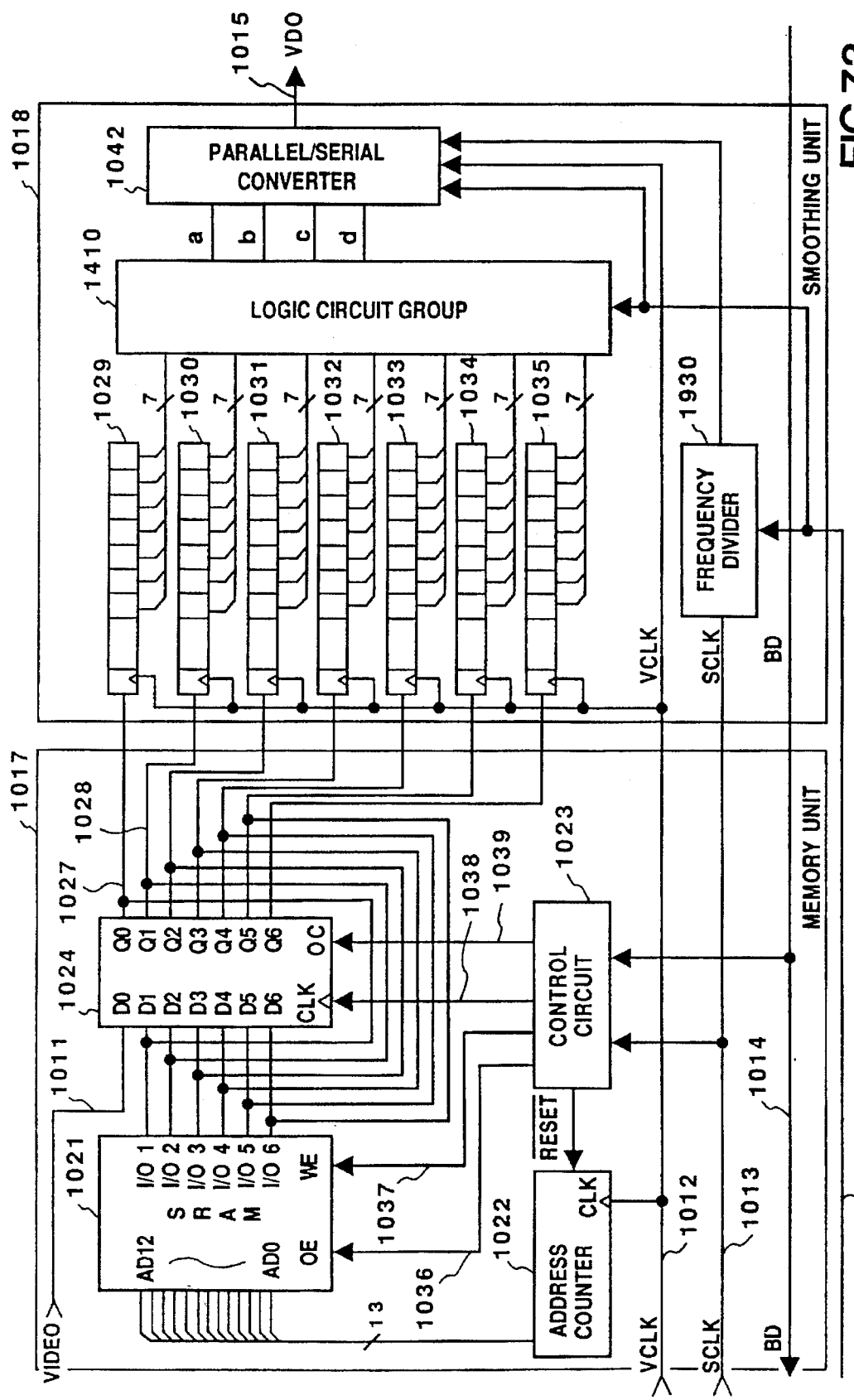
FIG. 73 is a block diagram showing the detailed arrangement of an image processing unit according to still another embodiment of the present invention.

FIG. 73 is a detailed block diagram of an image processing circuit according to this embodiment. The same reference numerals in FIG. 73 denote the same parts as in FIG. 66, and a detailed description thereof will be omitted.

In this embodiment, a logic circuit group 1410 in a smoothing unit 1018 has a different arrangement, and has a plurality of smoothing logics according to a plurality of resolutions.

Figure 74:
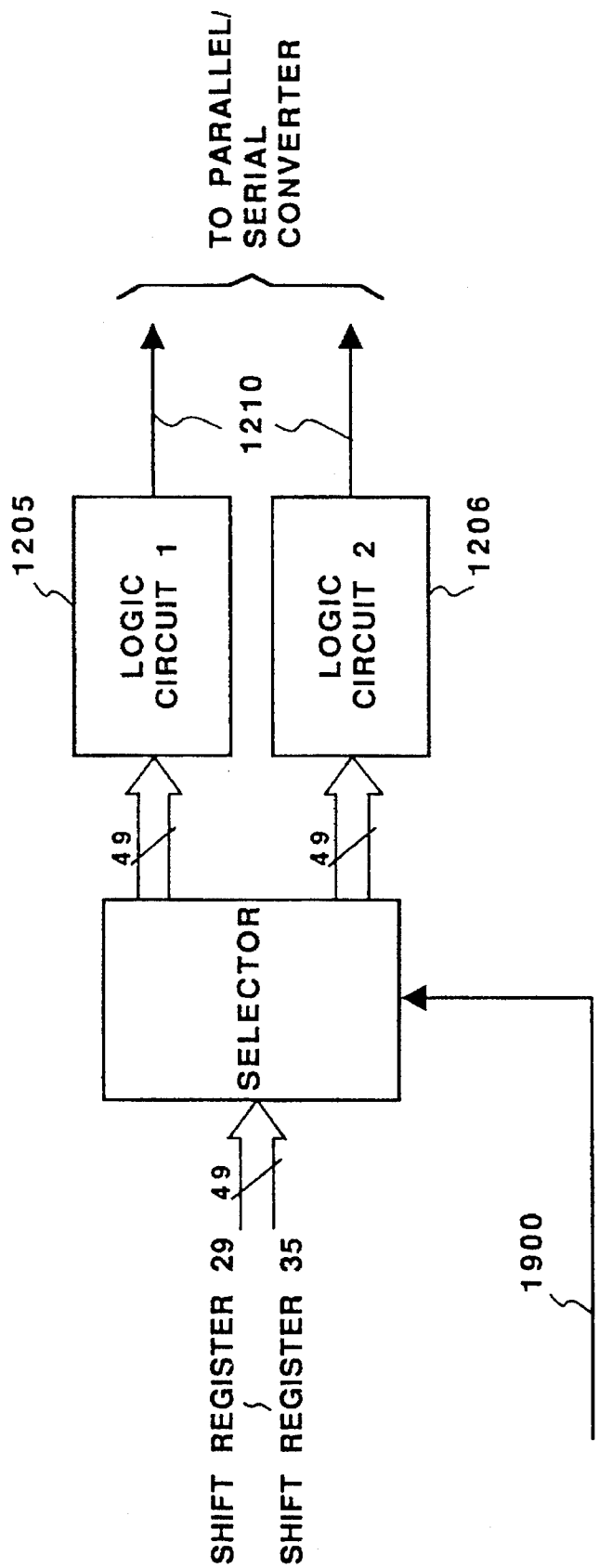
FIG. 74 is a diagram showing the detailed arrangement of a logic circuit group of this embodiment.

FIG. 74 shows the detailed arrangement of the logic circuit group 1410.

The logic circuit group 1410 of this embodiment comprises, e.g., two logic circuits, as shown in FIG. 74. In FIG. 74, reference numeral 1205 denotes a logic circuit 1 for a resolution of 300 dpi; and 1206, a logic circuit 2 for a resolution of 600 dpi.

Each of the logic circuits 1205 and 1206 receives 49-bit signals output from shift registers 1029 to 1035, i.e., dot data for 7 dots in the main scanning direction×7 lines in the subscanning direction including a pixel of interest. Each of the logic circuits 1205 and 1206 comprises a circuit for determining a printing area upon application of a different smoothing logic according to the resolution.

In this embodiment, like in the above-mentioned embodiment, a one-pixel four-division method is employed at 300 dpi, and a one-pixel two-division method is employed at 600 dpi. At 300 dpi, a logic A in the logic circuit 1 is applied; at 600 dpi, a logic B in the logic circuit 2 is applied. A selector 1209 selects a logic according to the resolution through a signal line 1900 output from a resolution setting unit 1700.

Respective clock frequencies are set in correspondence with a switched resolution in the same manner as described above, and a detailed description thereof will be omitted.

Figure 75:
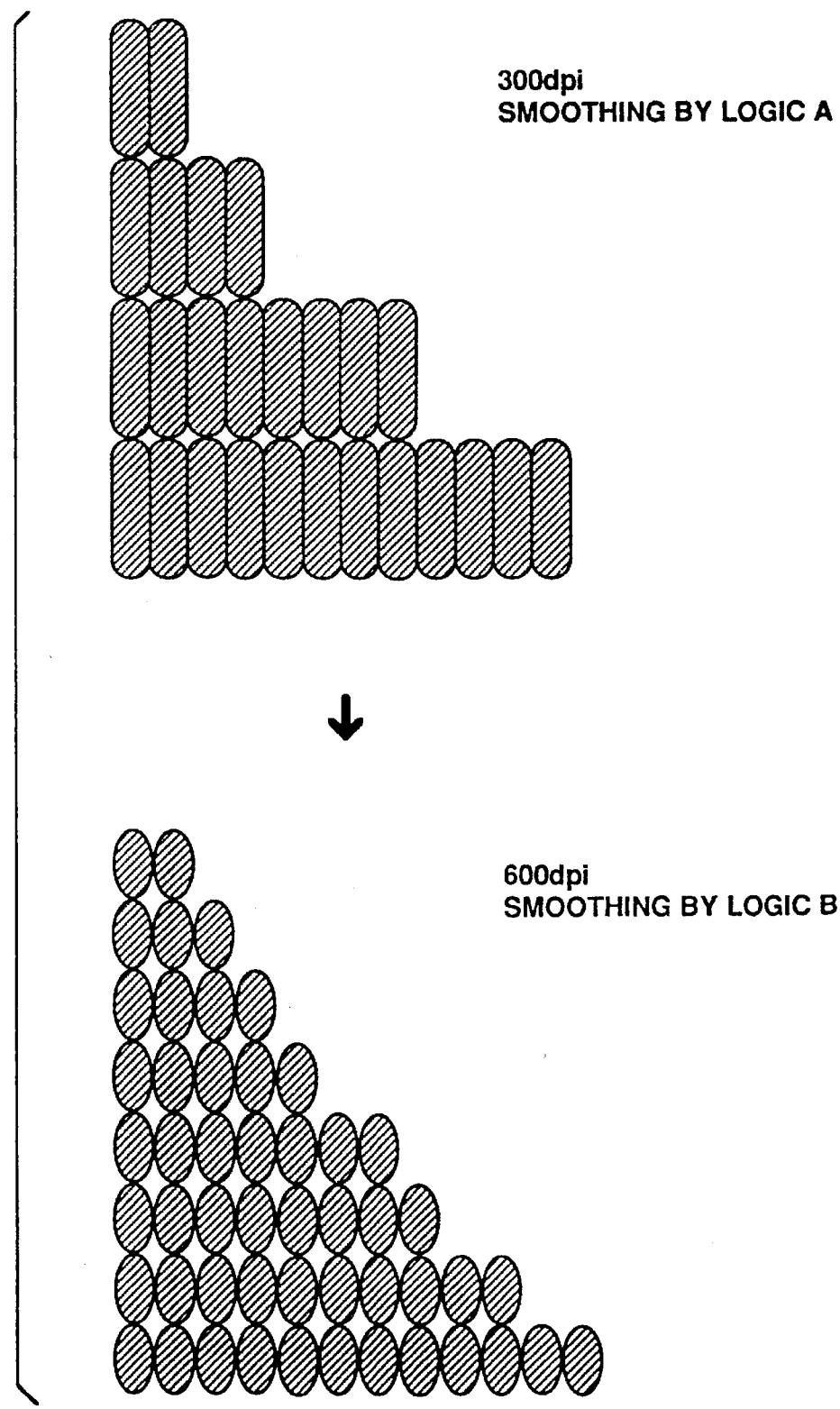
FIG. 75 is a view for explaining switching of a smoothing logic upon switching of the resolution according to this embodiment.

FIG. 75 shows results obtained when smoothing processing is performed using the logic A for 300 dpi, and the logic B for 600 dpi according to the above-mentioned operation.

Figure 76:
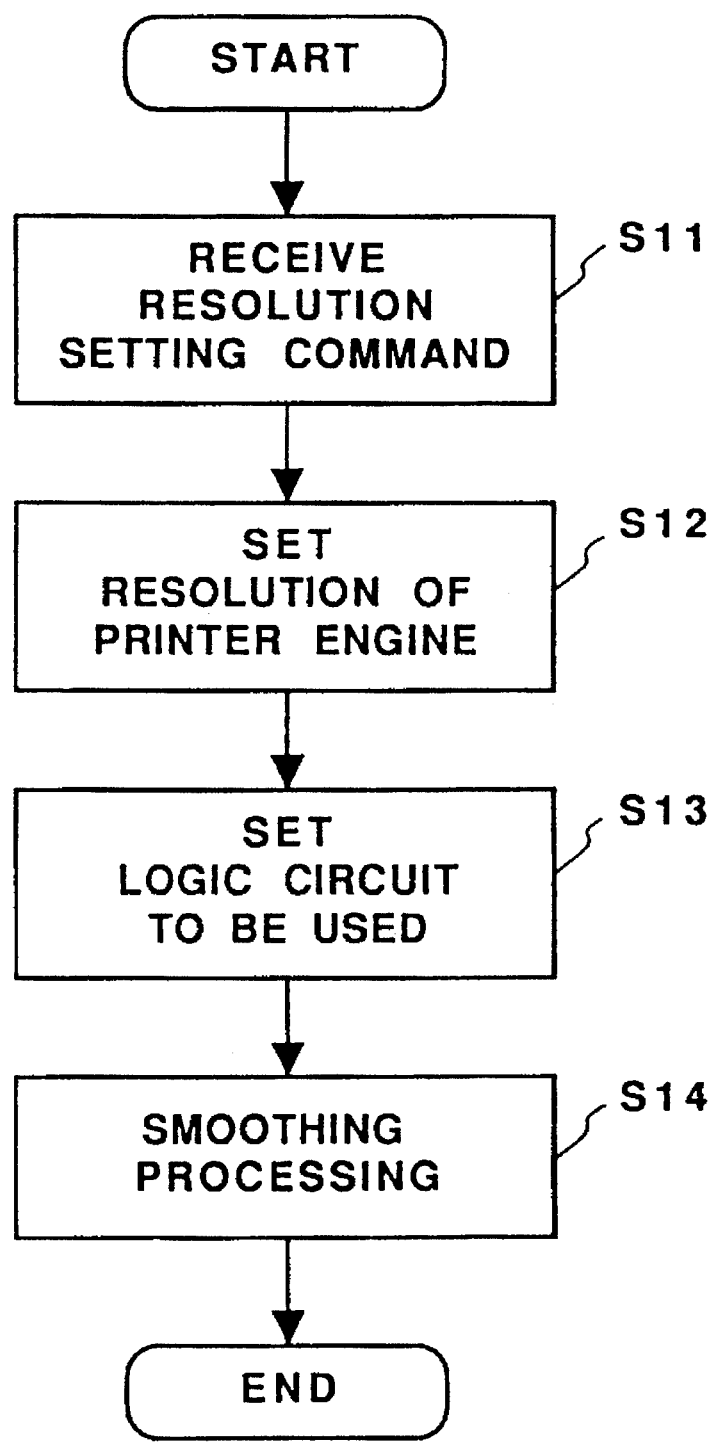
FIG. 76 is a flow chart for explaining image processing of this embodiment.
Figure 77:
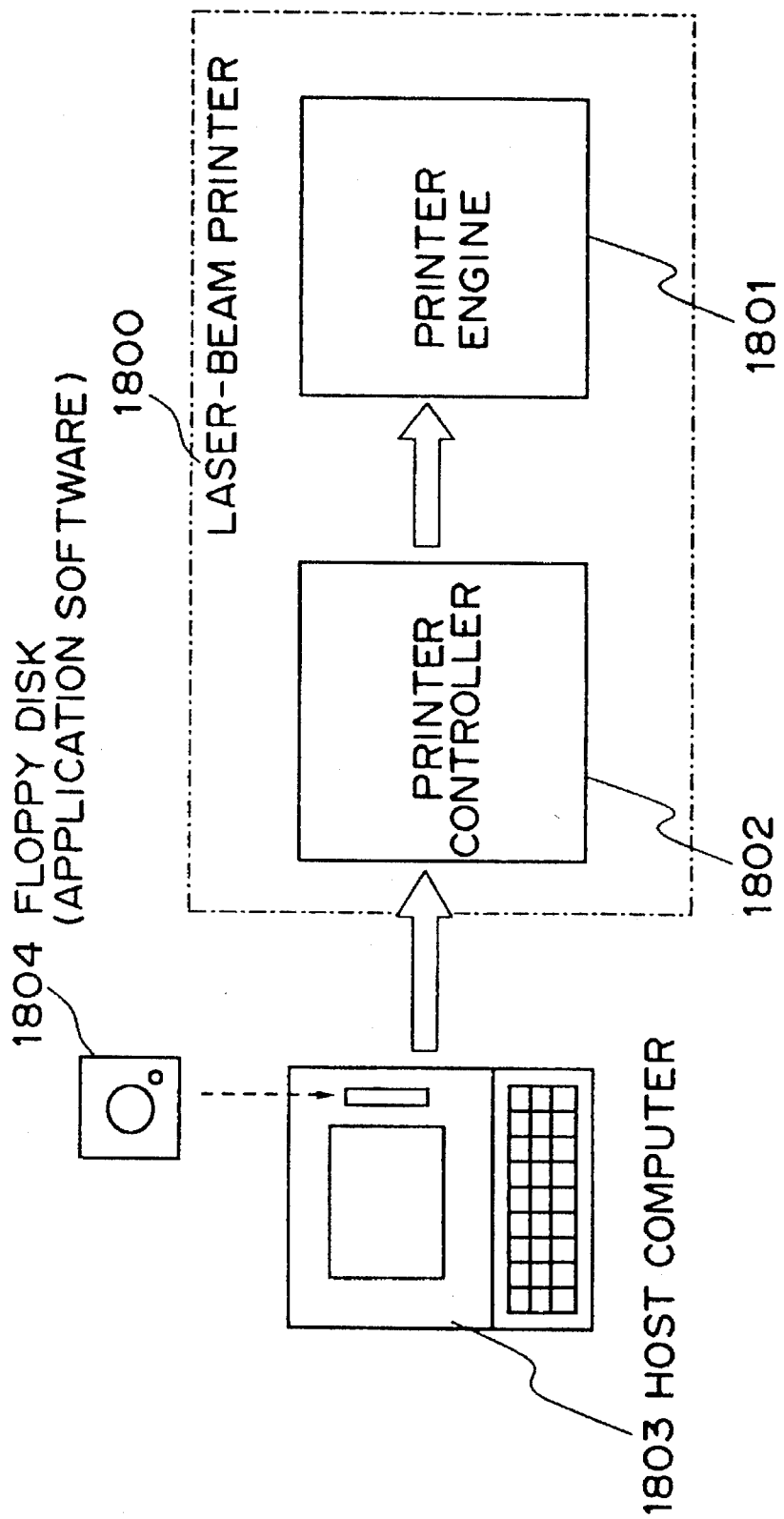
FIG. 77 is a block diagram showing the arrangement of a conventional laser beam printer.
Figure 78:
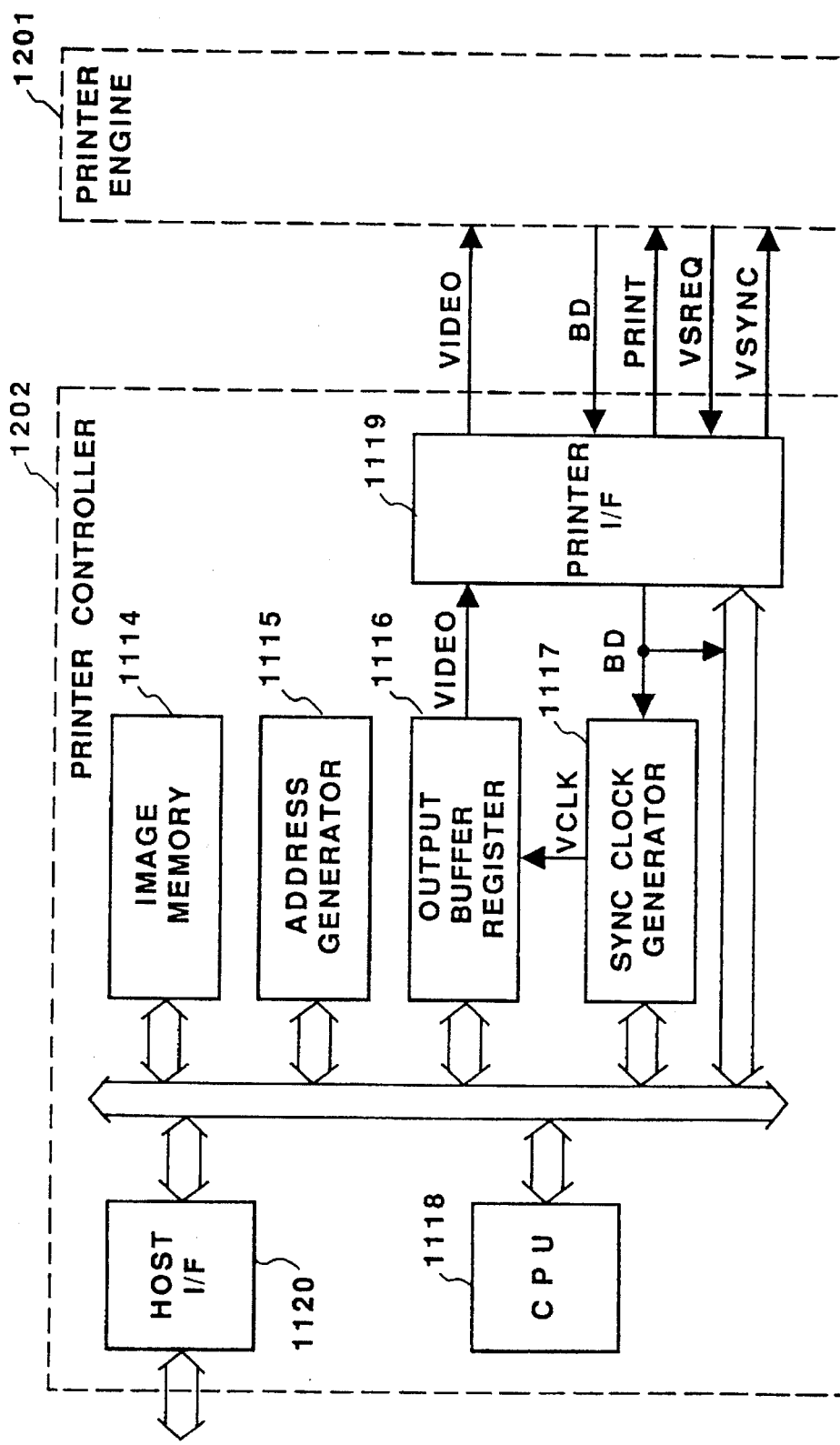
FIG. 78 is a diagram showing a printing operation process of the conventional laser beam printer.

The schematic operation of this embodiment will be described below with reference to the flow chart shown in FIG. 76.

In step S11, the resolution setting unit 1700 in a printer 1400 receives a resolution setting command from an external apparatus 1300. In step S12, the resolution of a printer engine 1200 is set to be a designated resolution according to the resolution setting command. In step S13, the resolution setting unit 1700 sets a logic circuit to be used in smoothing processing on the basis of the designated resolution. Parallel to the processing in step S13, clock frequencies according to the designated resolution are set. In step S14, bit map development based on code data sent from the external apparatus 1300, and smoothing processing according to the smoothing logic are performed.

In the above embodiment, when the resolution is 300 dpi, one pixel is divided into four sections, and when the resolution is 600 dpi, one pixel is divided into two sections. However, the resolutions and the numbers of divided pixel sections are not limited to the above-mentioned values, but may have arbitrary values. Similarly, the number of reference surrounding pixels for performing smoothing processing is not limited to the above-mentioned value, but may have an arbitrary value, as a matter of course.

The resolution is switched in accordance with a command from the external apparatus, but may be set by, e.g., a dip switch of a printer side.

As described above, according to the second embodiment, the smoothing logic is converted upon switching of the resolution to perform optimal smoothing processing. Thus, a high-quality image output can be obtained at each resolution.

Note that the present invention may be applied to either a system constituted by a plurality of devices or an apparatus consisting of one device. The present invention may also be applied to a case wherein a system or an apparatus is realized by supplying a program thereto.

As described above, since the present invention comprises a conversion means for converting a smoothing processing method of a pixel whose dot density is increased upon switching of the resolution of a recording apparatus, a proper smoothing processing method can be adopted according to the switched resolution, and a high-quality image output can be obtained.

As many apparently widely different embodiments of the present invention can be made without departing from the spirit and scope thereof, it is to be understood that the invention is not limited to the specific embodiments thereof except as defined in the appended claims.

What is claimed is:

1. An image recording apparatus comprising:
   information signal generation means for generating bit information signals;
   temporary storage means for temporarily storing at least some of the bit information signals generated by said information signal generation means;
   feature detection means for detecting whether or not a feature of the bit information signals stored in said temporary storage means coincides with one feature of a plurality of predetermined features;
   information change means for, when said feature detection means detects that a feature of the bit information signals stored in said temporary storage means coincides with said one feature of the plurality of predetermined features, changing printing information for a specific pixel of interest in the bit information signals stored in said temporary storage means;
   wherein said information change means includes:
      first forming means for forming plural patterns for a plurality of small pixels from information on one pixel;
      storage means for pre-storing a plurality of patterns with respect to one pattern of the plural patterns formed by said first forming means; and
      second forming means for selecting one of the plurality of patterns pre-stored in said storage means so as to obtain an appropriate smoothing effect on the specific pixel of interest regardless of changes in printing conditions, for forming changed printing information, and for outputting the changed printing information.

2. The apparatus according to claim 1, wherein a frequency used by said second forming means is N times a frequency used by said first forming means, where N is an integer not less than 2.

3. The apparatus according to claim 1, wherein the number of pulse signals per unit time used by the second forming means is larger than the number of pulse signals per unit time used by said first forming means.

4. The apparatus according to claim 1, wherein the first forming means has a resolution four times a subscanning resolution, and the second forming means consists of small pixels constituted by equal-interval pulse width units having a resolution eight times the subscanning resolution.

5. The apparatus according to claim 1, wherein a subscanning resolution is one of 240 dots/inch, 300 dots/inch, and 600 dots/inch.

6. The apparatus according to claim 1, wherein said temporary storage means forms an M dots×N dots matrix, and said feature detection means performs feature collation for the dot information signals in an entire region of said matrix.

7. The apparatus according to claim 1, wherein said information change means converts the pixel of interest into binary signals in units of small pixels obtained by equally dividing a recording time for the bit information in a main scanning direction into n sections, where n≦3, and
   a recording time of the small pixel is set to fall within a range between 180 nsec and 4 nsec.

8. The apparatus according to claim 1, wherein said information recording apparatus has a recording dot density in a subscanning direction of 240 dots/inch, and a printing speed of 4 sheets/min, and a recording time of the small pixel is set to fall within a range between 560 nsec and 4 nsec.

9. The apparatus according to claim 1, wherein said information recording apparatus has a recording dot density in a subscanning direction of 240 dots/inch, and a printing speed of 8 sheets/min, and a recording time of the small pixel is set to fall within a range between 280 nsec and 4 nsec.

10. The apparatus according to claim 1, wherein said information recording apparatus has a recording dot density in a subscanning direction of 240 dots/inch, and a printing speed of 16 sheets/min, and a recording time the small pixel is set to fall within a range between 140 nsec and 4 nsec.

11. The apparatus according to claim 1, wherein said information recording apparatus has a recording dot density in a subscanning direction of 300 dots/inch, and a printing speed of 4 sheets/min, and a recording time of the small pixel is set to fall within a range between 360 nsec and 4 nsec.

12. The apparatus according to claim 1, wherein said information recording apparatus has a recording dot density in a subscanning direction of 300 dots/inch, and a printing speed of 8 sheets/min, and a recording time of the small pixel is set to fall within a range between 180 nsec and 4 nsec.

13. The apparatus according to claim 1, wherein said information recording apparatus has a recording dot density in a subscanning direction of 300 dots/inch, and a printing speed of 16 sheets/min, and a recording time of the small pixel is set to fall within a range between 90 nsec and 4 nsec.

14. The apparatus according to claim 1, wherein said information recording apparatus has a recording dot density in a subscanning direction of 600 dots/inch, and a printing speed of 4 sheets/min, and a recording time of the small pixel is set to fall within a range between 90 nsec and 4 nsec.

15. The apparatus according to claim 1, wherein said information recording apparatus has a recording dot density in a subscanning direction of 600 dots/inch, and a printing speed of 8 sheets/min, and a recording time of the small pixel is set to fall within a range between 45 nsec and 4 nsec.

16. The apparatus according to claim 1, wherein said information recording apparatus has a recording dot density in a subscanning direction of 600 dots/inch, and a printing speed of 16 sheets/min, and a recording time of the small pixel is set to fall within a range between 23 nsec and 4 nsec.

17. An image recording apparatus comprising:
information signal generation means for generating bit information signals;
means for receiving a command for switching a printing dot resolution;
means for switching printing dot resolution in response to the command;
temporary storage means for temporarily storing at least some of the bit information signals generated by said information signal generation means;
feature detection means for detecting whether or not a feature of the bit information signals stored in said temporary storage means coincides with one feature of a plurality of predetermined features; and
information change means for, when said feature detection means detects that a feature of the bit information signals stored in said temporary storage means coincides with said one feature of the plurality of predetermined features, changing printing information for a specific pixel of interest in the stored bit information signals stored in said temporary storage means;
wherein said information change means converts information on one pixel into information for a plurality of small pixels, and changes an algorithm for conversion of the information on one pixel into the information for the plurality of small pixels, based on the printing dot resolution switching command received by said means for receiving, so as to obtain an appropriate smoothing effect.

18. An image recording apparatus comprising:
information signal generation means for generating bit information signals;
means for receiving a command for switching a printing density, and for switching the printing density in response to the command;
temporary storage means for temporarily storing at least some of the bit information signals generated by said information signal generation means;
feature detection means for detecting whether or not a feature of the bit information signals stored in said temporary storage means coincides with one feature of a plurality of predetermined features; and information change means for, when said feature detection means detects that a feature of the bit information signals stored in said temporary storage means coincides with said one feature of the plurality of predetermined features, changing printing information for a specific pixel of interest in the bit information signals stored in said temporary storage means;
wherein said information change means converts information on one pixel into information for a plurality of small pixels, and changes an algorithm for conversion of the information on one pixel into the information for the plurality of small pixels, based on the printing density switching command received by said means for receiving, so as to obtain an appropriate effect.

19. An image recording apparatus comprising:
information signal generation means for generating bit information signals;
means for detecting an environmental temperature or humidity;
temporary storage means for temporarily storing at least some of the bit information signals generated by said information signal generation means;
feature detection means for detecting whether or not a feature of the bit information signals stored in said temporary storage means coincides with one feature of a plurality of predetermined features; and
information change means for, when said feature detection means detects that a feature of the bit information signals stored in said temporary storage means coincides with said one feature of the plurality of predetermined features, changing printing information for a specific pixel of interest in the bit information signals stored in said temporary storage means;
wherein said information change means converts information on one pixel into information for a plurality of small pixels, and changes an algorithm for conversion of the information on one pixel into the information for the plurality of small pixels, based on the environmental temperature or humidity detected by said means for detecting so as to obtain an appropriate smoothing effect.

20. A method for recording an image comprising the steps of:
generating bit information signals;
temporarily storing, in temporary storage means, at least some of the bit information signals generated in said generating step;
detecting whether or not a feature of the bit information signals stored in said temporarily-storing step coincides with one feature of a plurality of predetermined features;
changing printing information for a specific pixel of interest in the bit information signals stored in said temporarily-storing step when it is detected that a feature of the bit information signals stored in said temporarily-storing step coincides with said one feature of the plurality of predetermined features;
wherein said changing step includes the steps of:
forming plural patterns for a plurality of small pixels from information on one pixel;
pre-storing a plurality of patterns with respect to one pattern of the plural patterns formed in said forming step;
selecting one of the pre-stored plurality of patterns so as to obtain an appropriate smoothing effect on the specific pixel of interest regardless of changes in printing conditions;

forming changed printing information; and outputting the changed printing information.

21. A method for recording an image comprising the steps of:

generating bit information signals;

receiving a command for switching a printing dot resolution;

switching the printing dot resolution in response to the command;

temporarily storing, in temporary storage means, at least some of the bit information signals generated in said generating step;

detecting whether or not a feature of the bit information signals stored in said temporarily-storing step coincides with one feature of a plurality of predetermined features; and changing printing information for a specific pixel of interest in the bit information signals stored in said temporarily-storing step when it is detected that a feature of the bit information signals stored in said temporarily-storing step coincides with said one feature of the plurality of predetermined features;

wherein said changing step includes the steps of:

converting information on one pixel into information for a plurality of small pixels; and changing an algorithm for conversion of the information on one pixel into the information for the plurality of small pixels, based on the printing dot resolution switching command received in said step of receiving, so as to obtain an appropriate smoothing effect.

22. A method for recording an image comprising the steps of:

generating bit information signals;

receiving a command for switching a printing density;

switching the printing density in response to the received command;

temporarily storing, in temporary storage means, at least some of the bit information signals generated in said generating step;

detecting whether or not a feature of the bit information signals stored in said temporarily-storing step coincides with one feature of a plurality of predetermined features; and changing printing information for a specific pixel of interest in the bit information signals stored in said temporarily-storing step when it is detected that a feature of the bit information signals stored in said temporarily-storing step coincides with said one feature of the plurality of predetermined features;

wherein said changing step includes the steps of:

converting information on one pixel into information for a plurality of small pixels; and changing an algorithm for conversion of the information on one pixel into the information for the plurality of small pixels, based on the printing density switching command received in said step of receiving, so as to obtain an appropriate smoothing effect.

23. A method for storing an image comprising the steps of:

generating bit information signals;

detecting an environmental temperature or humidity;

temporarily storing, in temporary storage means, at least some of the bit information signals generated in said generating step;

detecting whether or not a feature of the bit information signals stored in said temporarily-storing step coincides with one feature of a plurality of predetermined features; and changing printing information for a specific pixel of interest in the bit information signals stored in said temporarily-storing step when it is detected that a feature of the bit information signals stored in said temporarily-storing step coincides with said one feature of the plurality of predetermined features;

wherein said changing step includes the steps of:

converting information on one pixel into information for a plurality of small pixels; and changing an algorithm for conversion of the information on one pixel into the information for the plurality of small pixels, based on the environmental temperature or humidity detected in said step of detecting, so as to obtain an appropriate smoothing effect.

* * * * *

UNITED STATES PATENT AND TRADEMARK OFFICE
CERTIFICATE OF CORRECTION

PATENT NO. : 5,652,660

DATED : July 29, 1997

INVENTOR(S) : KAORU SETO ET AL.

It is certified that error appears in the above-identified patent and that said Letters Patent is hereby corrected as shown below:

COLUMN 1

Line 5, "continuation-in-part" should read
      --continuation--.
    Line 21, "has" should read --have--.

COLUMN 2

Line 21, "by" should read --in--.

COLUMN 3

Line 11, "region—of" should read --region made up
      of--.

COLUMN 5

Line 3, "some" should be deleted.

COLUMN 7

Lines 50-52, "FIG. 24 is a view showing patterns for
      use in explaining a smoothing effect for a lateral
      line inclined in this embodiment" should be deleted.

COLUMN 13

Line 6, "feedings" should read --feeding--.
    Line 16, "wherein" should read --where--.

UNITED STATES PATENT AND TRADEMARK OFFICE
CERTIFICATE OF CORRECTION

PATENT NO. : 5,652,660

DATED : July 29, 1997

INVENTOR(S) : KAORU SETO ET AL.

It is certified that error appears in the above-identified patent and that said Letters Patent is hereby corrected as shown below:

COLUMN 17

Line 28, "4d, 4d," should read --4d, 4e,--.

COLUMN 22

Line 8, "Output" should read --output--.

COLUMN 23

Line 24, "FIG. 35-f." should read --FIG. 39-f.--.

COLUMN 28

Line 23, "plify" should read --plifies--.

COLUMN 31

Line 36, "signnals" should read --signals--.

COLUMN 34

Line 4, "a" should be deleted.
　　Line 13, "set a" should read --set in a--.

COLUMN 35

Line 50, "section." should read --sections.--.

UNITED STATES PATENT AND TRADEMARK OFFICE
CERTIFICATE OF CORRECTION

PATENT NO. : 5,652,660

DATED : July 29, 1997

INVENTOR(S) : KAORU SETO ET AL.

It is certified that error appears in the above-identified patent and that said Letters Patent is hereby corrected as shown below:

<u>COLUMN 38</u>

```
Line 40, "n≤3," should read --n≥3,--.
Line 58, "time" should read --time of--.
```

Signed and Sealed this

Twenty-fourth Day of February, 1998

Attest:

BRUCE LEHMAN

Attesting Officer        Commissioner of Patents and Trademarks